United States Patent [19]

Yamashita et al.

[11] Patent Number: 5,901,121
[45] Date of Patent: May 4, 1999

[54] OPTICAL STORAGE APPARATUS HAVING IMPROVED ECCENTRICITY CORRECTION ABILITIES

[75] Inventors: Tomonori Yamashita, Kato; Shigenori Yanagi, Kawasaki, both of Japan

[73] Assignee: Fujitsu Limited, Kawasaki, Japan

[21] Appl. No.: 09/005,326

[22] Filed: Jan. 9, 1998

Related U.S. Application Data

[62] Division of application No. 08/749,144, Nov. 14, 1996.

[30] Foreign Application Priority Data

Apr. 22, 1996 [JP] Japan .................................. 8-099923

[51] Int. Cl.⁶ ...................................................... G11B 7/00
[52] U.S. Cl. .............................................. 369/44.28; 369/32
[58] Field of Search ............................ 369/44.28, 44.29, 369/44.35, 32, 50, 54, 44.32

[56] References Cited

U.S. PATENT DOCUMENTS

| | | |
|---|---|---|
| 4,365,324 | 12/1982 | Michaelis . |
| 4,564,929 | 1/1986 | Yonezawa et al. . |
| 4,661,942 | 4/1987 | Yoshimoto et al. . |
| 4,761,775 | 8/1988 | Murakami . |
| 4,775,966 | 10/1988 | Miura et al. . |
| 4,985,882 | 1/1991 | Tanaka et al. ............... 369/44.32 |
| 5,073,885 | 12/1991 | Ito et al. . |
| 5,134,599 | 7/1992 | Baas . |
| 5,146,440 | 9/1992 | Yamaguchi et al. . |
| 5,181,195 | 1/1993 | Kume et al. . |
| 5,182,736 | 1/1993 | Yanagi . |
| 5,235,584 | 8/1993 | Yoshio et al. . |
| 5,241,522 | 8/1993 | Yanagi . |
| 5,258,966 | 11/1993 | Yanagi ........................ 369/44.28 |
| 5,289,447 | 2/1994 | Kobayashi et al. ............ 369/44.28 |
| 5,307,333 | 4/1994 | Ikeda et al. . |
| 5,351,222 | 9/1994 | Ikeda et al. . |
| 5,351,223 | 9/1994 | Park . |
| 5,623,464 | 4/1997 | Tani . |

FOREIGN PATENT DOCUMENTS

| | | |
|---|---|---|
| 372650 | 6/1990 | European Pat. Off. . |
| 457567 | 11/1991 | European Pat. Off. . |
| 1-19538 | 1/1959 | Japan . |
| 652935 | 3/1985 | Japan . |
| 61-009876 | 1/1986 | Japan . |
| 62-140250 | 6/1987 | Japan . |
| 62-200540 | 9/1987 | Japan . |
| 63-293721 | 11/1988 | Japan . |
| 1-300437 | 12/1989 | Japan . |
| 3127334 | 5/1991 | Japan . |
| 3194732 | 8/1991 | Japan . |
| 528515 | 2/1993 | Japan . |
| 5250691 | 9/1993 | Japan . |
| 668494 | 3/1994 | Japan . |
| 8153332 | 6/1996 | Japan . |

Primary Examiner—Thang V. Tran
Attorney, Agent, or Firm—Greer, Burns & Crain Ltd.

[57] ABSTRACT

When an access of a 1-track seek is instructed from an upper apparatus, a 1-track seek period is divided into predetermined accelerating period and decelerating period. A decelerating current is determined in accordance with a difference between sample points before and after a zero-cross point of a tracking error signal E2, namely, a beam velocity with respect to the decelerating period and is supplied. With regard to a fine seek as well, the decelerating current is determined from the beam velocity obtained from the difference between the sample points before and after the zero-cross point just before a target track and is supplied.

8 Claims, 38 Drawing Sheets

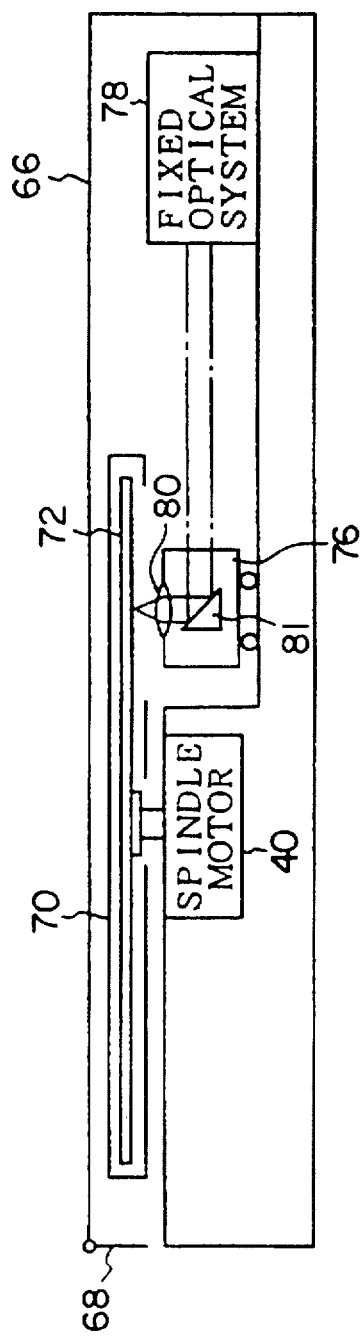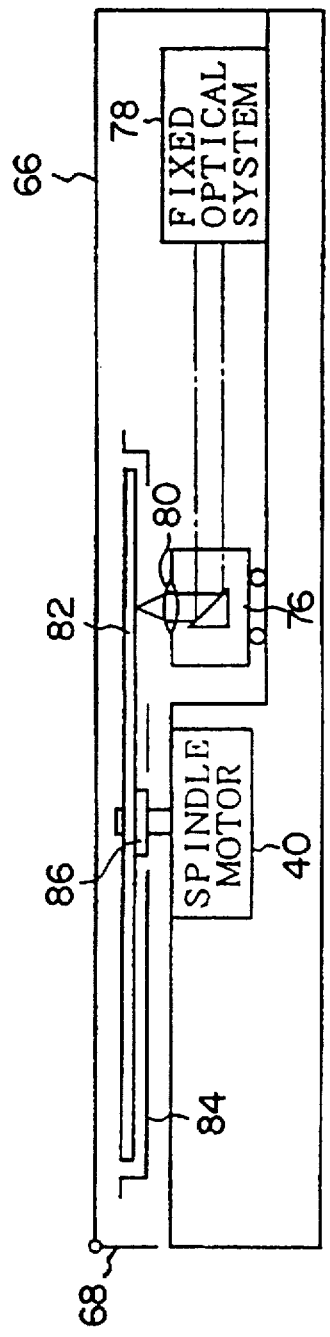

FIG. 4B
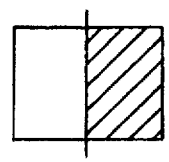
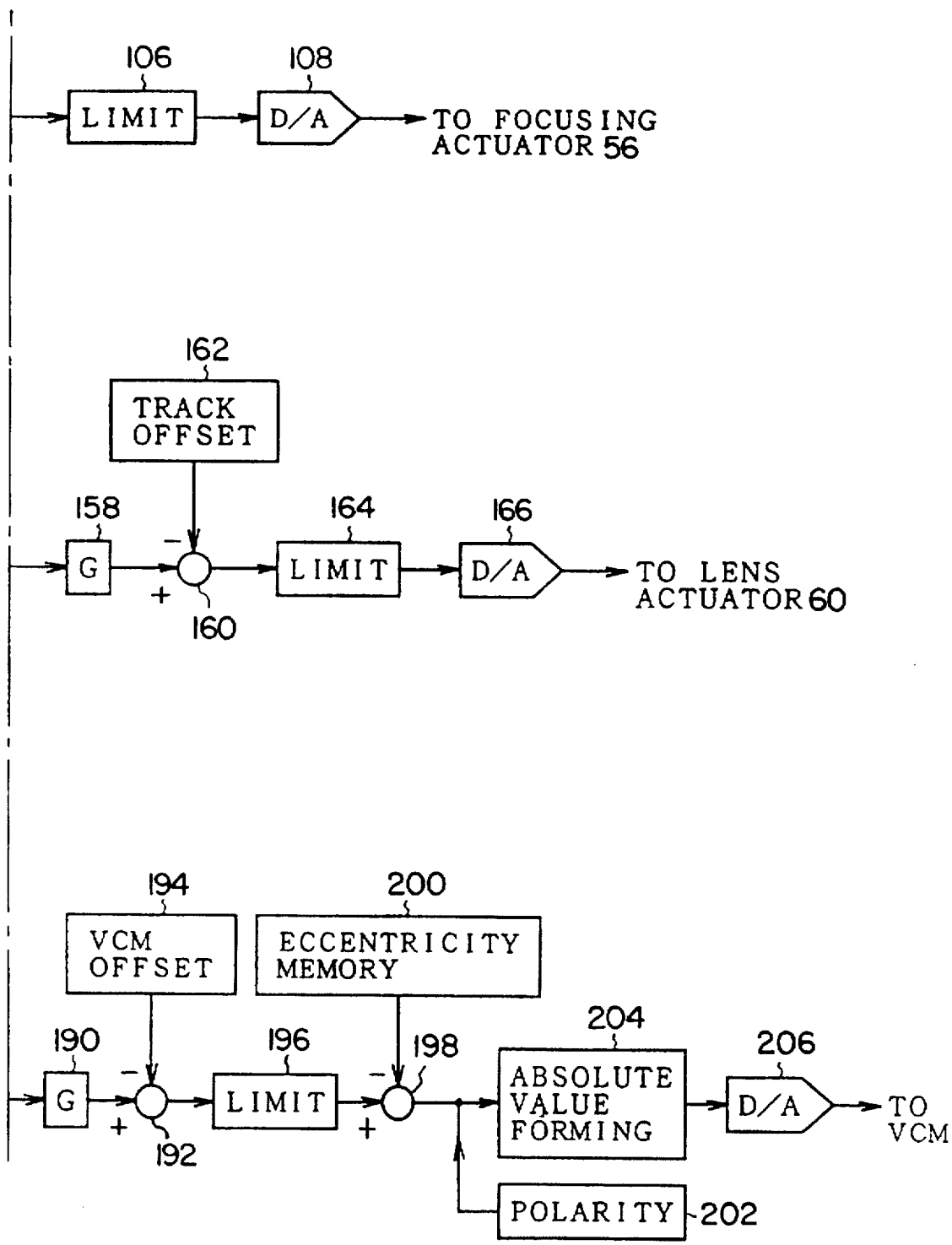

FIG. 5

| CONTROL MODE | CONTROL STATES OF SWITCHES ||||||
|---|---|---|---|---|---|---|
| | SW98 | SW118 | SW142 | SW156 | SW186 | SW178 |
| FOCUSING OFF | 0 | 0 | 0 | 1 | 0 | 0 |
| TRACK OFF | 1 | 0 | 0 | 1 | 0 | 0 |
| TRACK ON | 1 | 0 | 1 | 0 | 1 | 0 |
| FINE SEEK | 1 | 1 | 0 | 0 | 1 | 1 |
| POSITION SEEK | 1 | 0 | 0 | 1 | 0 | 1 |

FIG. 6

| CONTROL MODE | CONTROL CONTENTS |
|---|---|
| FOCUSING OFF | FOCUSING SERVO IS TURNED OFF AND THE LENS ACTUATOR IS CONTROLLED TO THE ZERO POSITION BY THE LENS POSITION SIGNAL. |
| TRACK OFF | FOCUSING SERVO IS TURNED ON AND THE LENS ACTUATOR IS CONTROLLED TO THE ZERO POSITION BY THE LENS POSITION SIGNAL. |
| TRACK ON | FOCUSING SERVO IS TURNED ON AND THE LENS ACTUATOR IS ON-TRACK CONTROLLED BY THE TRACKING ERROR SIGNAL. |
| FINE SEEK | FOCUSING SERVO IS TURNED ON. THE LENS ACTUATOR IS SPEED CONTROLLED. THE VCM IS FEED-FORWARD CONTROLLED. THE VCM IS CONTROLLED TO THE LENS ZERO POSITION BY THE LENS POSITION SIGNAL (DOUBLE SERVO). |
| POSITION SEEK | FOCUSING SERVO IS TURNED ON. THE LENS ACTUATOR IS CONTROLLED TO THE ZERO POSITION BY THE LENS POSITION SIGNAL. POSITION OF THE HEAD IS CONTROLLED TO A TARGET TRACK BY THE VCM. |

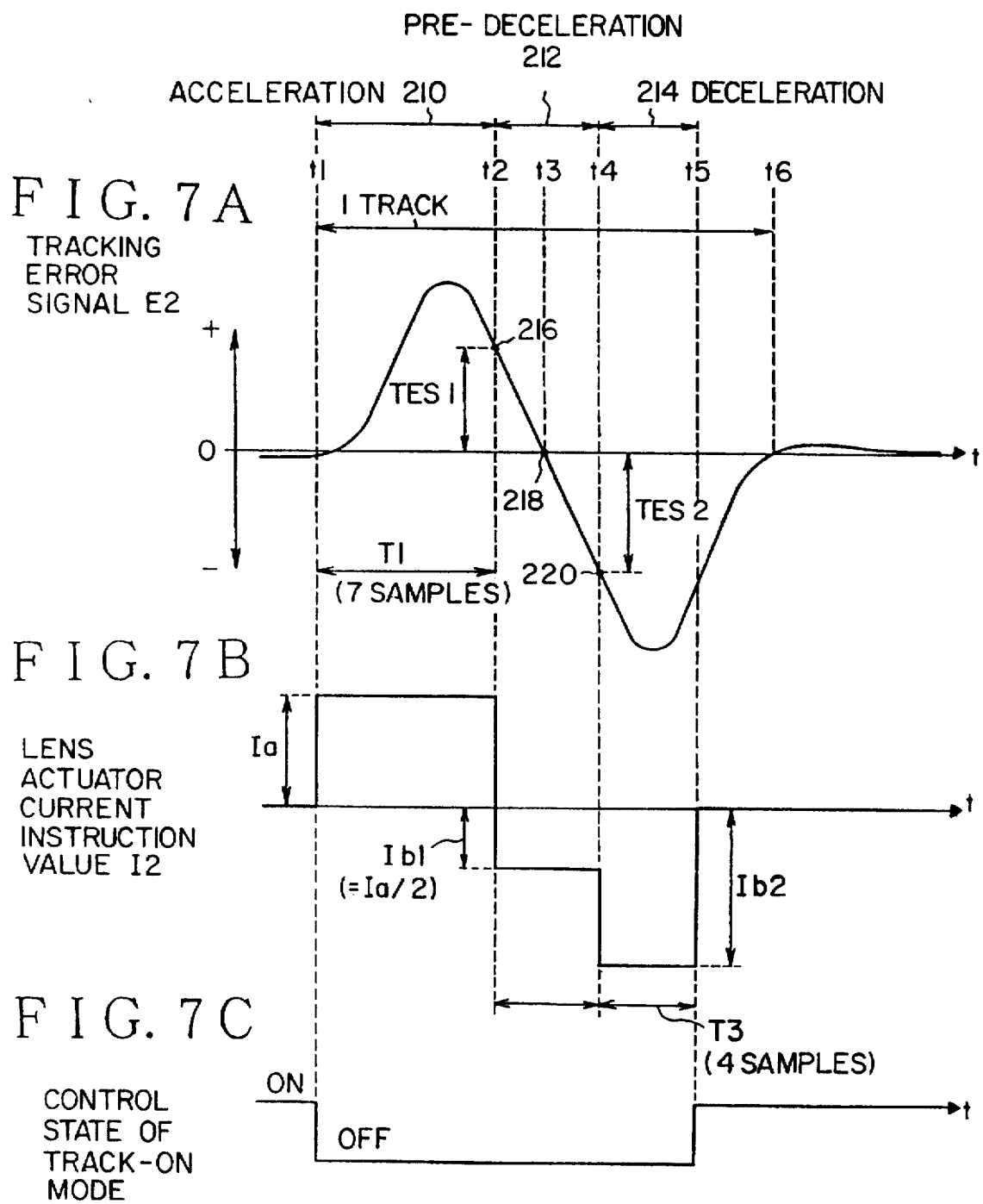

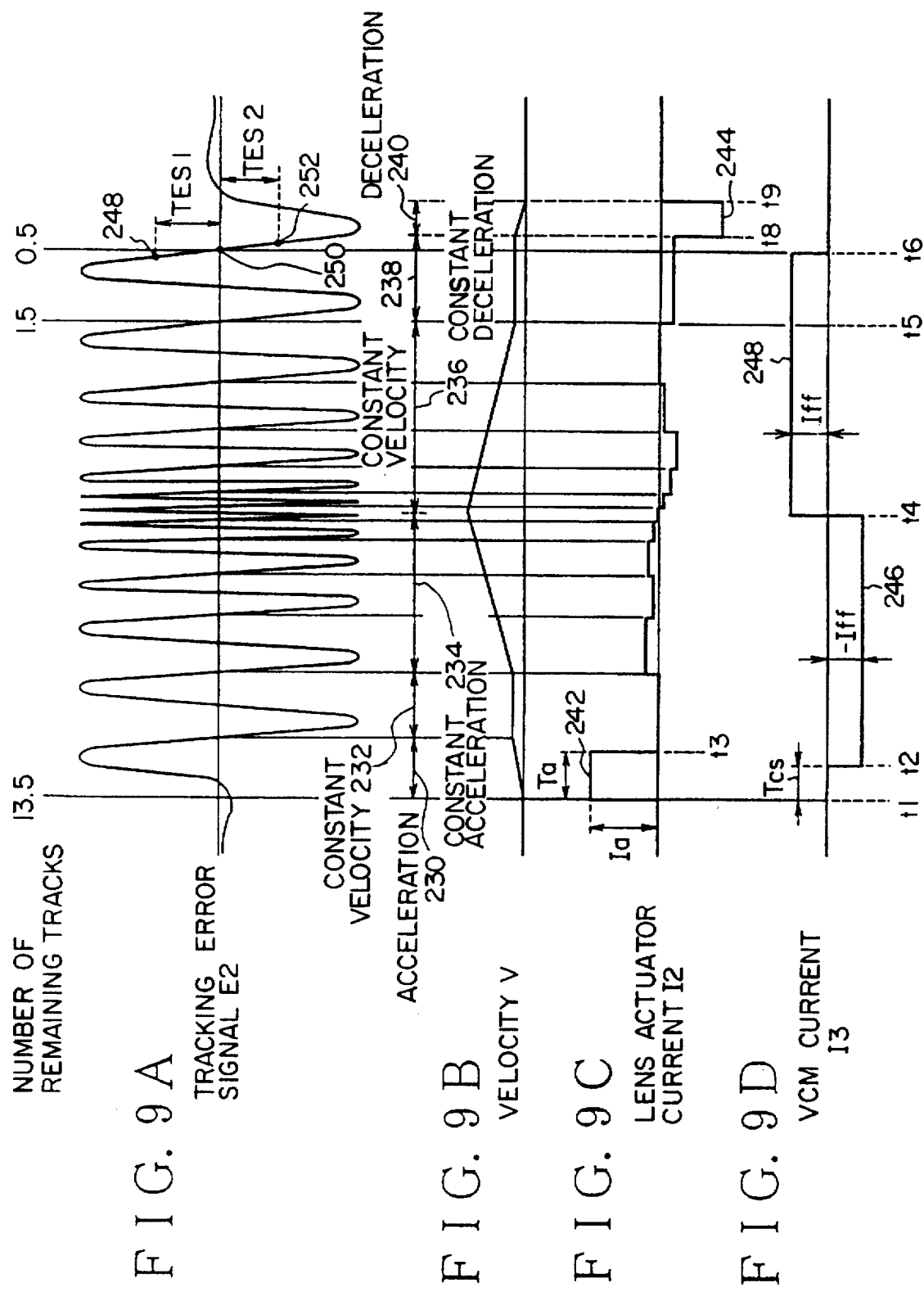

MO MEDIUM TRACKING ERROR SIGNAL E3

LENS ACTUATOR CURRENT I2

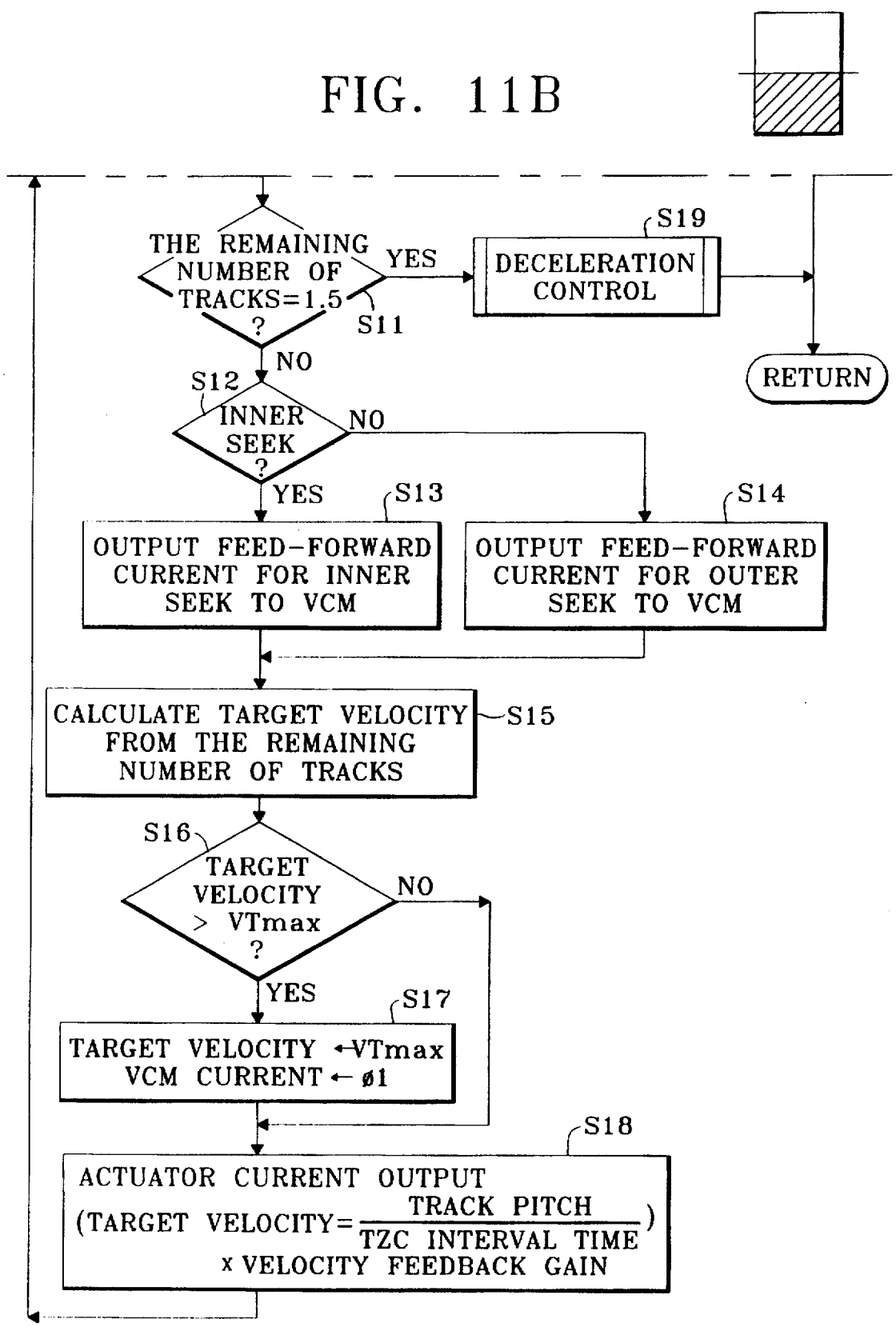

THE REMAINING
NUMBER OF TRACKS

CD MEDIUM
TRACKING
ERROR
SIGNAL E30

LENS
ACTUATOR
CURRENT I2

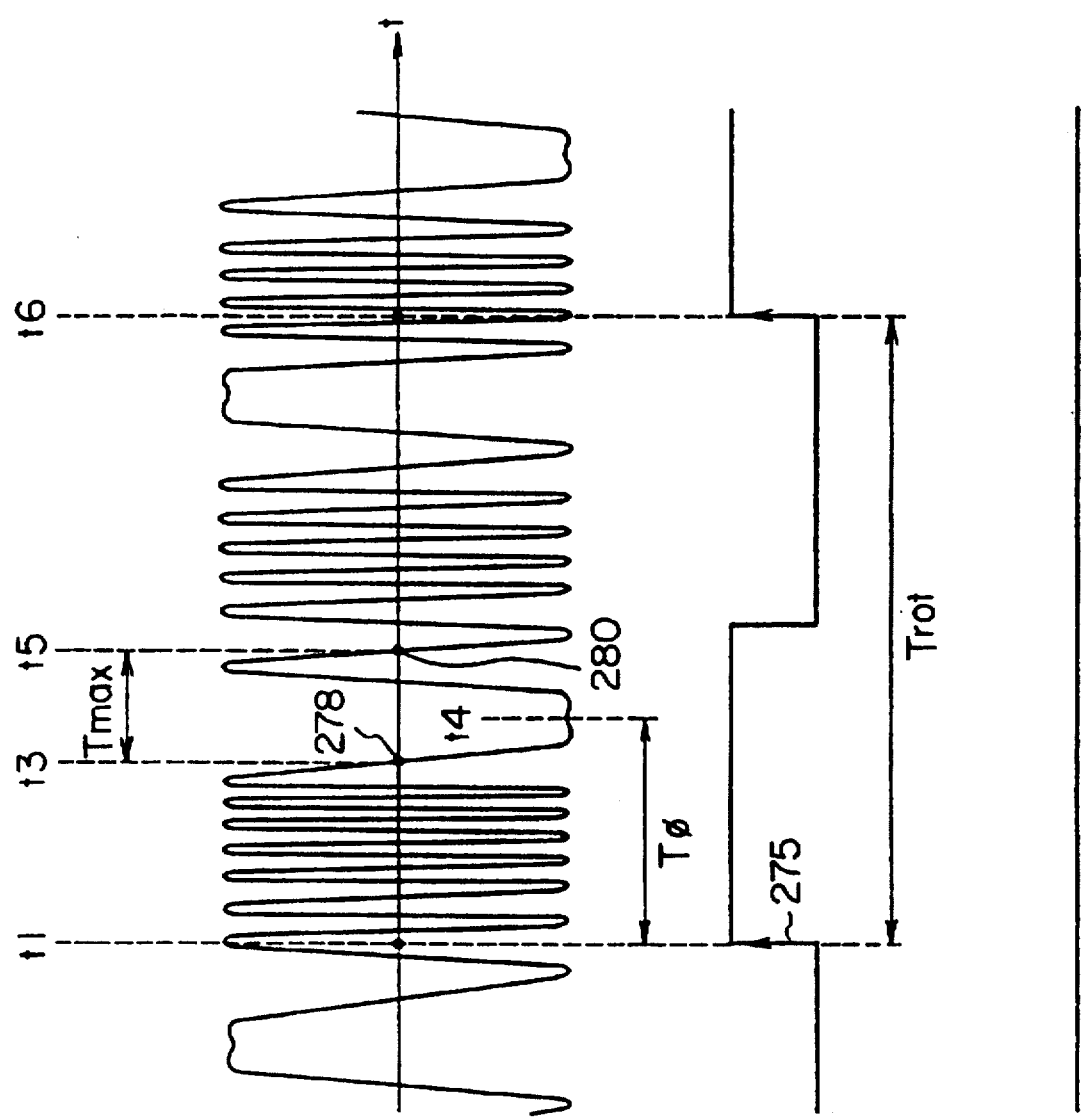

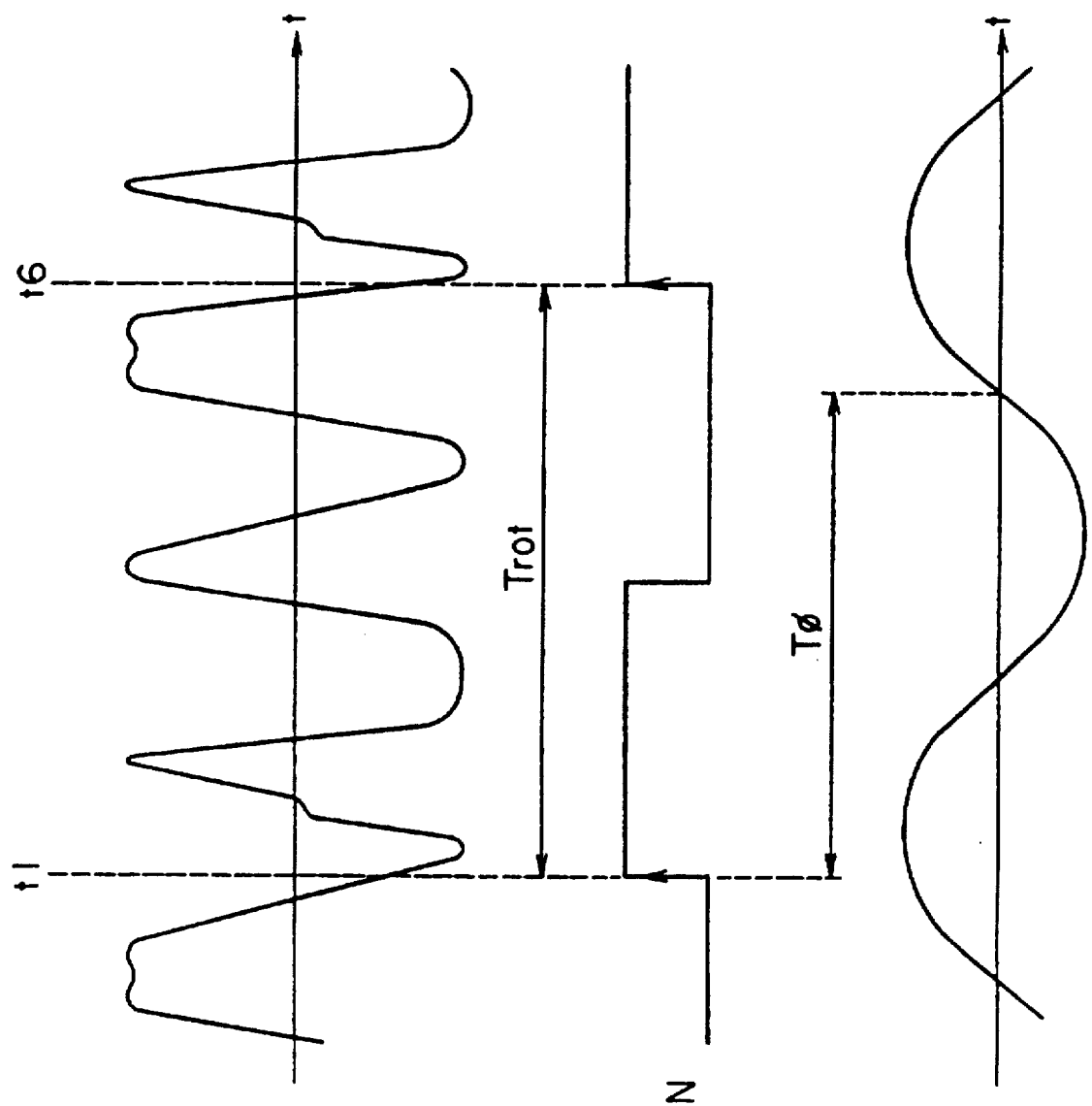

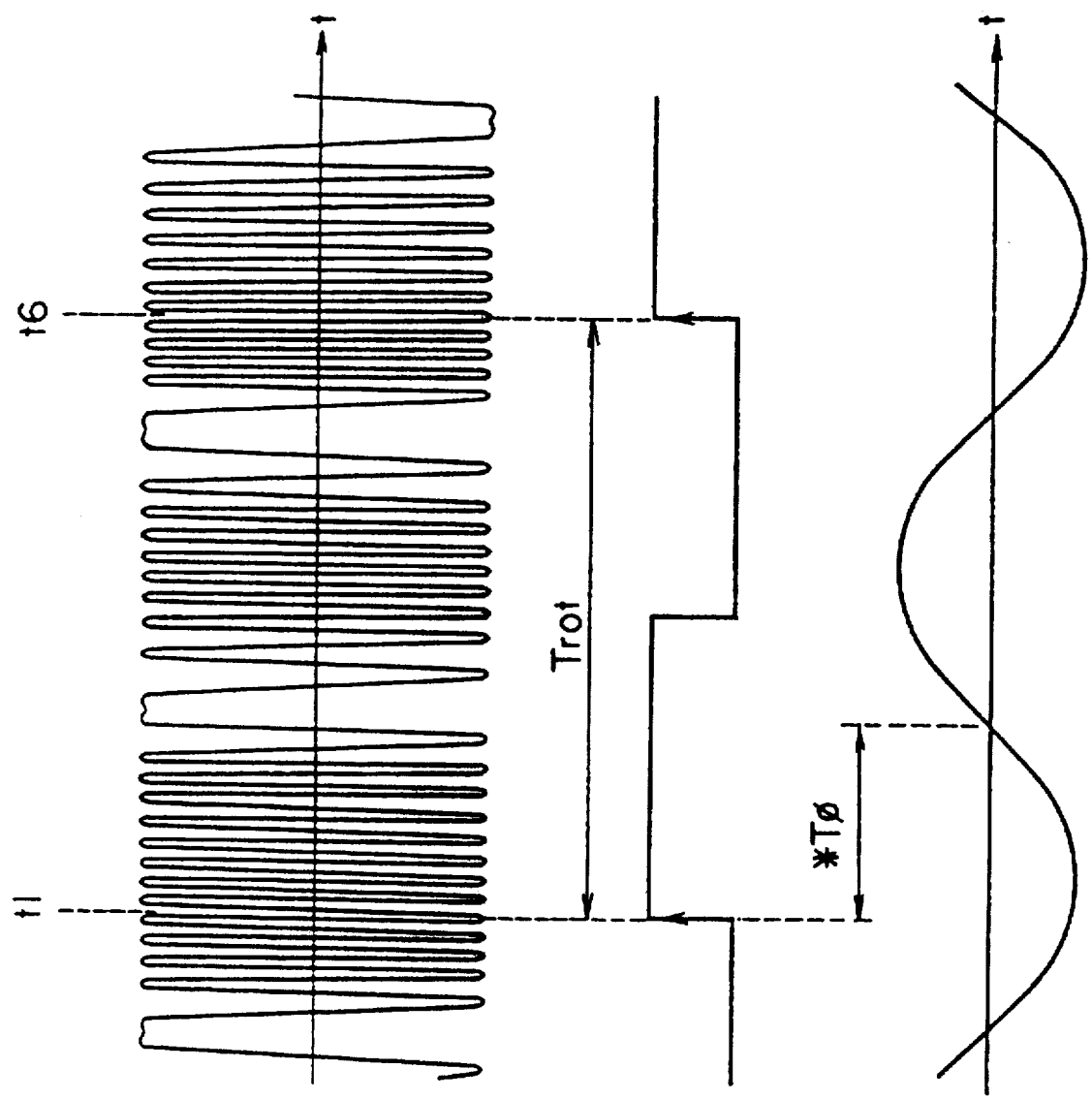
F I G. 1 9 A  TRACKING ERROR SIGNAL E2
F I G. 1 9 B  ROTATION DETECTION SIGNAL E4
F I G. 1 9 C  VCM CURRENT I3 (ECCENTRICITY CORRECTION ON)

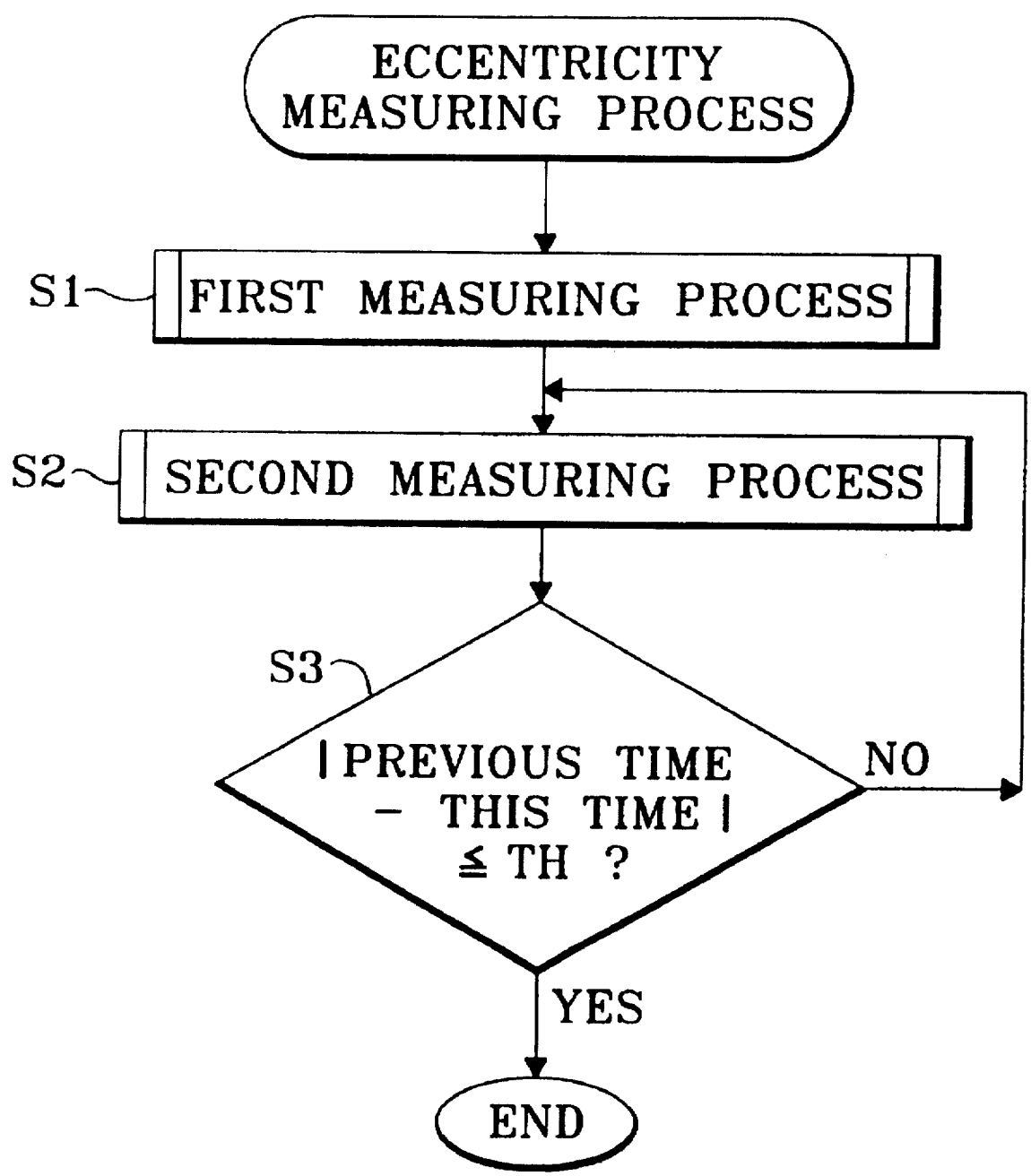

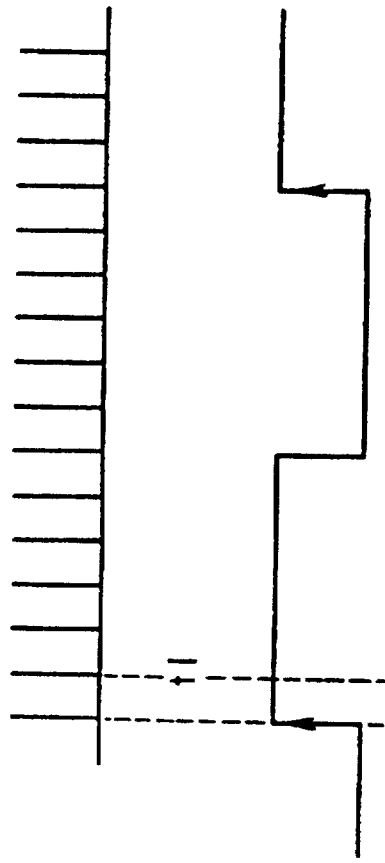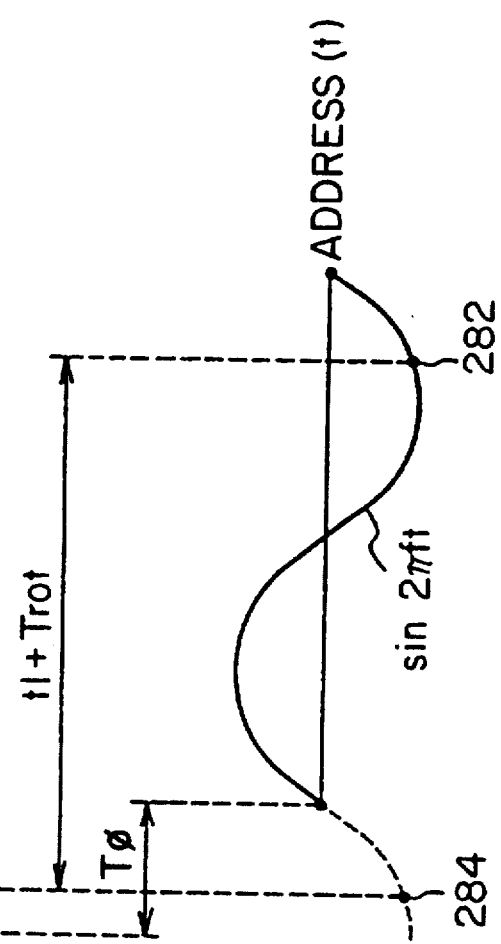
FIG. 23A SAMPLING CLOCK
FIG. 23B ROTATION DETECTION SIGNAL E4
FIG. 23C ECCENTRICITY MEMORY 200

FIG. 30A INPUT
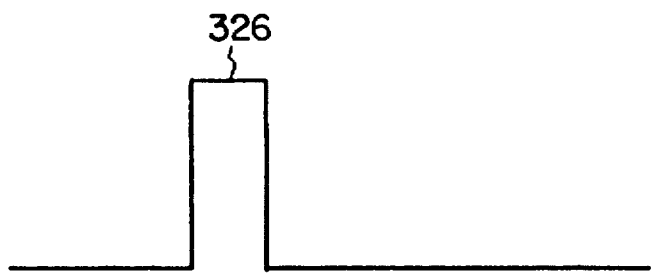
FIG. 30B OUTPUT
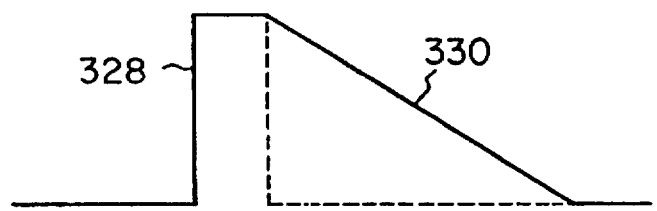
FIG. 30C OUTPUT
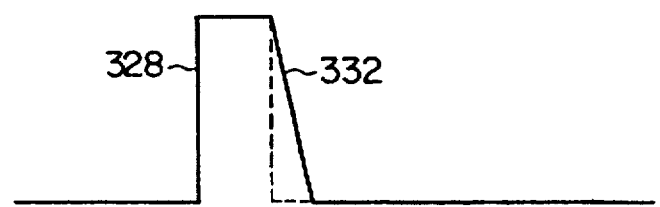
FIG. 31A
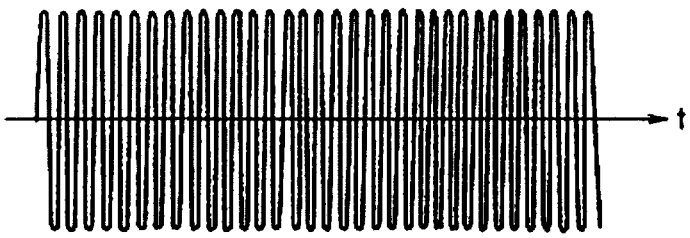
FIG. 31B

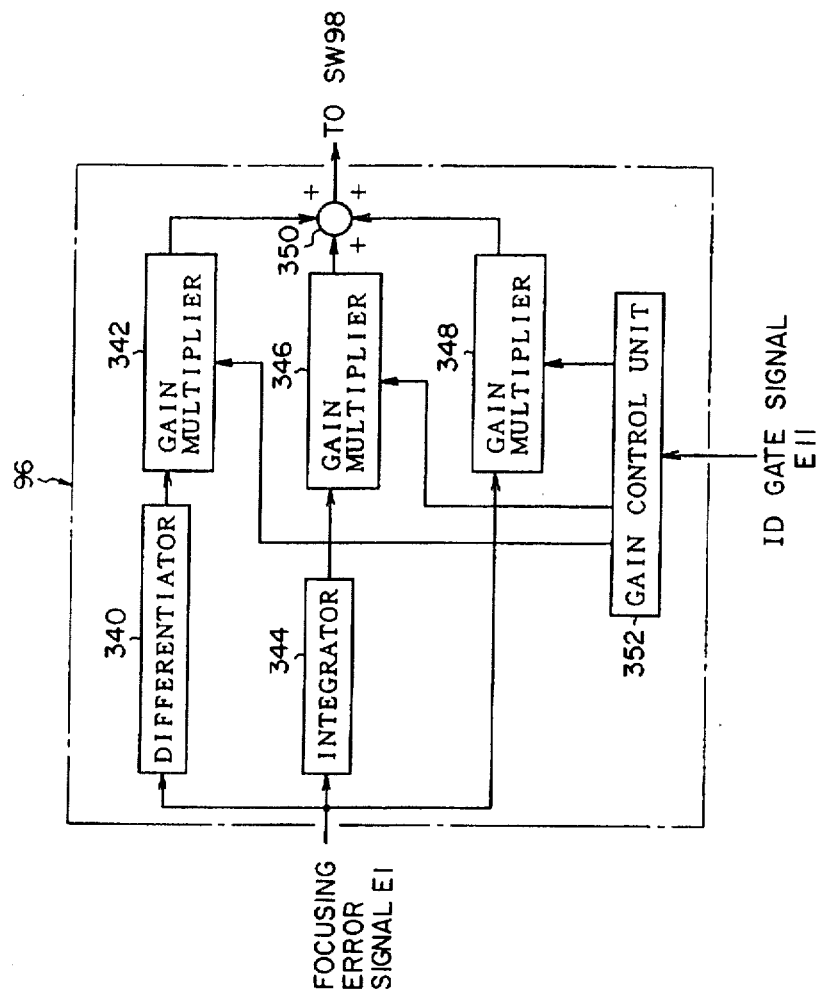
F I G. 34

F I G. 3 5 A  TRACK
F I G. 3 5 B  FOCUSING ERROR SIGNAL E1
F I G. 3 5 C  FOCUSING ACTUATOR CURRENT I1
F I G. 3 5 D  LENS POSITION

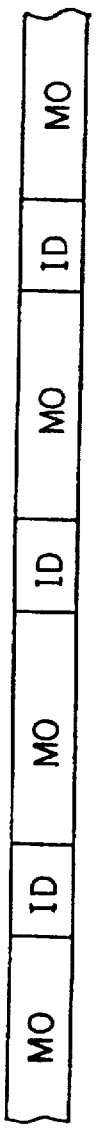
FIG. 36A TRACK
FIG. 36B FOCUSING ERROR SIGNAL EI
FIG. 36C ID GATE SIGNAL EII
FIG. 36D DIFFERENTIATION GAIN
FIG. 36E FOCUSING ACTUATOR CURRENT II
FIG. 36F LENS POSITION

OPTICAL STORAGE APPARATUS HAVING IMPROVED ECCENTRICITY CORRECTION ABILITIES

This is a divisional, of application Ser. No. 08/749,144, filed Nov. 14, 1996.

BACKGROUND OF THE INVENTION

The invention relates to an optical storage apparatus using a rewritable medium such as CD or MO cartridge and, more particularly, to an optical storage apparatus which can further improve an accessing performance to a high density recording medium.

Attention is paid to an optical disk as a memory medium as a main stream of multimedia which has rapidly been developed in recent years. For example, when considering an MO cartridge of 3.5 inches, in addition to the conventional MO cartridges of 128 MB and 230 MB, in recent years, a high density recording medium of 540 MB or 640 MB is being provided. Therefore, as an optical disk drive, it is demanded that it can use all of the media of 180 MB, 230 MB, 540 MB, and 640 MB which are at present available. In a personal computer which has rapidly been spread recently, a reproducing function of a compact disc (CD) known as a read only medium is indispensable. From viewpoints of a space and costs, it is difficult to install not only an optical disk drive for a CD but also an optical disk drive for an MO cartridge as a rewritable optical disk apparatus. In recent years, therefore, an optical disk drive which can use both of an MO cartridge and a CD has also been developed. According to the optical disk drive of the CD/MO sharing type, with respect to an optical system, a mechanical structure, and a controller circuit unit, they are commonly constructed as much as possible so that they can be used for both of the CD and the MO cartridge.

In an optical disk drive of 540 MB or 640 MB which enables a high density recording medium to be used, in association with an improvement of a recording density, a track pitch of the medium is narrowed and it is necessary to improve a seeking precision in order to move a beam of an optical head to a target track and to position the beam. To improve a seeking precision, by suppressing a seeking speed, the beam can be stably pulled in the target track. Ordinarily, in the seek control to a target track, for example, so long as a short seek of 50 tracks or less, the seek control by a lens actuator mounted on a carriage which is driven by a VCM is performed. As for a long seek exceeding 50 tracks, the seek control is performed by both of a carriage drive by the VCM and a carriage drive by the lens actuator. In such a seek control, first, a target velocity according to the number of remaining tracks to the target track is generated and a speed control is executed. When the number of remaining tracks up to the target track reaches a value just before one or two tracks by the speed control, a predetermined decelerating current is supplied, thereby performing a decelerating control. When the deceleration is finished, a control mode is switched to a position servo control, thereby pulling the apparatus into an on-track state. In such a seek control, in order to raise a seeking performance in the high density recording medium of 540 MB or 640 MB, it is necessary to decelerate a moving velocity of the beam to a value near the zero velocity by a predetermined decelerating current at a position just before the target track and to control so as to stably pull in the on-track state.

In such a conventional seek control of the optical disk drive, however, when the target velocity of the speed control is set to a slightly high velocity in order to reduce the seek time, the deceleration of the latter half by the speed control is rapidly executed, so that there is a possibility such that a pull-in speed just before the target track largely fluctuates. Therefore, in the decelerating control by a predetermined fixed decelerating current, the deceleration is insufficient and the beam overruns the target track or the deceleration is excessively performed and the beam is reversely returned, so that there is a problem such that it takes a time until the beam is settled to the target track. Although a pull-in speed just before the target track can be stabilized by suppressing the target velocity of the speed control, since the target velocity is low, it takes a time for the speed control. Even if the settlement time can be reduced, the whole seek time becomes long.

Such a problem also occurs with respect to a one-track seek control in which the adjacent track is set to a target track and the beam is moved. In the conventional 1-track seek control, a one-track seek period is equivalently divided into three periods, for example, an accelerating period, a current-zero period, and a decelerating period every $\frac{1}{3}$, and a feed-forward control such that predetermined fixed accelerating current and decelerating current are sequentially supplied to the lens actuator is executed. However, accelerating characteristics and decelerating characteristics of the beam by the lens actuator are variable every optical disk drive. When the accelerating current or decelerating current lacks, therefore, the seek time becomes long and, on the contrary, when the accelerating current or decelerating current is too large, the settlement time becomes long, so that there is a problem such that an enough 1-track seek performance cannot be expected.

In the optical disk drive using a changeable medium such as magnetooptic disk, CD, or the like, a track eccentricity amount of the loaded medium differs every medium. The eccentricity amount of the medium is measured at a stage of an initializing process after the medium was loaded and an eccentricity offset current is supplied to a VCM synchronously with the medium rotation so as to set off the measured eccentricity amount. When the track is regarded as a straight line, the medium eccentricity draws a sine curve. Therefore, what is called an eccentricity memory such as an RAM or the like in which sine values using a rotational angle of a predetermined resolution as an address have previously been stored is prepared. A corresponding sine value is read out from the eccentricity memory synchronously with the actual medium rotating position and an eccentricity amount is obtained on the basis of an amplitude measured as eccentricity information and a phase for a rotation reference position. An offset current is supplied so as to set off the eccentricity amount. In the conventional measurement of the eccentricity amount which is executed in the initializing process after the medium was loaded, for example, a lens position sensor to detect a position of an objective lens mounted on a carriage is used and an eccentricity amplitude and a phase are measured from a lens position signal which is obtained by one rotation of the medium in an on-track control state by the lens actuator. Since the lens position sensor, however, is inherently used for a position servo of a lens locking operation to keep the objective lens mounted on the carriage to a zero position (neutral position), a linearity and a resolution of a detection signal for the position are not so high. Since the signal is an analog signal, an error is mixed even when an A/D conversion is performed. There is a problem such that the eccentricity information cannot be sufficiently measured at a high reliability.

In the conventional optical disk drive, a return light from the medium is detected by a 2-split detector and a tracking error signal is obtained from a difference between two photosensitive signals. In this case, in an ID portion of the medium, a zone number, a track number, and the like are recorded by embossed portions called pits, the return light is attenuated by the pits of the ID portion, a fluctuation which drops like noises appears in the tracking error signal, such a fluctuation erroneously becomes a zero-cross point in a low amplitude portion, and the number of tracks is erroneously counted. To suppress the fluctuation by the return light in the ID portion, therefore, by detecting an envelope, a profile of the tracking error signal is smoothed. However, although no problem occurs in the MO cartridge medium of 540 MB or 640 MB for high density recording, in an MO cartridge medium of 128 MB which has conventionally been used, a mirror portion of a mirror surface structure is formed between the ID portion and an MO recording portion of the medium surface. In an MO cartridge medium of 230 MB, a mirror portion is similarly left in an area other than a user region. Therefore, in case of enabling an MO cartridge of a capacity in a range from 128 MB to 640 MB to be used by one optical disk drive, when an MO cartridge of 128 MB or 230 MB is loaded, if an envelope is detected at the time of formation of the tracking error signal, by obtaining a difference between the photosensitive signals of the mirror portions having the same level, the tracking error signal drops in the mirror portion. Further, a signal dropout of an amount corresponding to a discharge time constant due to the envelope detection occurs, the tracking error signal is largely deformed, and the track counting operation by the zero-cross point is certainly erroneously performed. Moreover, in any medium, when the envelope is detected, at the time of a high speed seek in which a zero-cross time interval of the tracking error signal is short, upper and lower peak levels of the tracking error signal itself are envelope detected by the envelope detection, so that there is a problem such that the tracking error signal is lost.

Further, the conventional optical disk drive has a focusing servo to in-focus control the objective lens mounted on the carriage so as to be focused onto the medium surface. In the focusing servo, a focusing error signal is formed on the basis of the photosensitive output of the return Light from the medium. However, since the ID portion on the track of the MO cartridge medium has the physical pits, an in-focus position of the objective lens differs from those of the recording surface of the MO portions on both sides. Thus, the focusing error signal changes step by step in front and rear boundary portions of the ID portion for the MO portion and an unnecessary focusing control is performed. For example, in case of the MO cartridge medium of 540 MB, an outer track has 84 sectors and an inner track has 54 sectors and there are ID portions of the number corresponding to the number of sectors. Therefore, the focusing servo frequently operates in the on-track state and there is a problem such that a current consumption due to the focusing servo increases. Although it is sufficient to turn off the focusing servo with respect to the ID portion, if the focusing servo is turned on and off at a high speed in an interlocking manner with the ID portion, it results in that a large disturbance is exerted on the servo system and an automatic focusing function is lost.

SUMMARY OF THE INVENTION

According to the invention, there is provided an optical storage apparatus which can improve a seeking performance by realizing both of a high speed seek and a reduction in settlement time with respect to each of an ordinary seek control and a 1-track seek control.

First, according to an optical storage apparatus (hereinafter, referred to as an "optical disk drive") of the invention, a carriage can be freely moved by a VCM as a carriage actuator in a direction which transverses tracks of a medium, an optical unit is mounted on a carriage and is constructed by a movement optical system having an objective lens and a fixed optical system fixedly arranged on a casing side, and the optical unit records and reproduces information to/from the tracks of the medium by using a light beam. The objective lens of the movement optical system mounted on the carriage moves the light beam from the fixed optical system by the driving of a lens actuator in the direction which transverses the tracks of the medium. A tracking error signal forming circuit forms a tracking error signal according to the position of the light beam in the direction which transverses the tracks on the basis of a photosensitive output of a return light from the medium which is derived by the optical unit. An access control unit such as a DSP or the like moves the light beam to a target track by controlling both of the VCM and the lens actuator so as to be positioned on the track when an access to the target track is instructed from an upper apparatus.

1-track seek

According to the invention, first, a 1-track seek control unit is provided for such an optical disk drive. For example, when an access of 1-track seek to move the beam to the target track of one track ahead from the present track is instructed from the upper apparatus, the 1-track seek control unit of the invention divides a 1-track seek period into a predetermined accelerating period and a decelerating period. In the accelerating period, a predetermined accelerating current is supplied to the lens actuator. On the other hand, in the decelerating period, a value of the decelerating current is determined from a difference (TES1–TES2) between two points of the tracking error signal, namely, a value that is proportional to a velocity and the decided decelerating current is supplied. A pre-decelerating period is provided between the accelerating period and the decelerating period in the 1-track seek control and a difference (TES1–TES2) of the tracking error signals is obtained at two points of a starting time point and an end time point of the pre-decelerating period. It has experimentally confirmed that almost the half of the accelerating current is optimum as a pre-decelerating current in the pre-decelerating period. In the 1-track seek control, in order to normalize a detecting sensitivity of a tracking error signal E2, a correction value obtained for every medium is multiplied, thereby correcting. The 1-track seek control unit sufficiently accelerates for the accelerating period which is set to a period exceeding ⅓ of one seek period, thereby reducing a seek time. More specifically speaking, when a control period is defined by the number of samples of a tracking error signal E3, the accelerating period is set to 7 samples, the pre-decelerating period is set to 2 samples, and the decelerating period is set to 4 samples. Thus, the control period is set to total 13 samples. In the 1-track seek control, when the difference (TES1–TES2) between two points of the tracking error signal exceeds a predetermined upper limit value, namely, when a seek velocity by the acceleration is too high, an instruction value of the decelerating current is fixed to a predetermined maximum value. On the contrary, when the difference (TES1–TES2) between two points of the tracking error signal is lower than a predetermined lower limit value, namely, when the seek velocity by the acceleration is too low, the instruction value of the decelerating current is fixed to a predetermined minimum value. An abnormality of the difference between two points of the tracking error signal occurs when a vibration is applied upon seeking. e.g., the medium is inclined due to a carrying or the like. Such an abnormality is eliminated by the decelerating control using the upper limit or lower limit of the decelerating current. According to such a 1-track seek control, even if the velocity at the start of the deceleration after the end of the acceleration fluctuates, the decelerating current in the decelerating period is changed to a value corresponding to the actual beam velocity, so that the beam can be stably positioned to the target track.

Fine seek

According to the invention, there is provided an optical storage apparatus such that, with respect to the control for moving the light beam to the target track by using the lens actuator as a main apparatus, namely, what is called a track jump control, even if there is a variation in velocity when starting the decelerating control which is performed just before the target track, it is possible to perform the stable pull-in to the on-track state.

To enable the stable pull-in to the on-track state in the track jump control, the invention is characterized by providing the decelerating control unit for controlling in a manner such that when the light beam is moved to the target track by using the lens actuator as a main apparatus, the decelerating current Ib is determined from the difference between two points of the tracking error signal at the track zero-cross position which is one track before the target track and supplied to the lens actuator from the upper apparatus by the access control unit. Specifically speaking, the decelerating current Ib is determined from the difference (TES1–TES2) between the sample values TES1 and TES2 of the tracking error signal before and after the zero-cross position just before the target track. Since a sampling period Ts is constant, the difference (TES1–TES2) between the sample values of the tracking error signal before and after the zero-cross position just before the target track has a value that is proportional to the velocity V. That is, the actual velocity just before the target track is detected and the decelerating current is determined in accordance with the detected velocity. Therefore, even if there is a variation in beam velocity at the start of the deceleration, the optimum decelerating current is always determined, an overshoot which occurs due to the lack of decelerating current or a delay which occurs due to the excessive decelerating current is prevented, and the stable on-track to the target track can be guaranteed. The decelerating control unit multiplies the correction value obtained every medium whose detecting sensitivity is normalized to the sampled tracking error signal, thereby correcting. Thus, the amplitude of the tracking error signal which differs every medium is normalized and the stable on-track is realized. When the decelerating current, determined from the difference between two points of the tracking error signal exceeds a predetermined upper limit value, the decelerating control unit regards that the values of two points indicate an abnormality due to a vibration, noises, or the like. In this case, the decelerating current is fixed to a predetermined maximum value, thereby performing a decelerating control. On the contrary, when the decelerating current determined from the difference between the two points of the tracking error signal is lower than a predetermined lower limit value, the decelerating control unit also similarly regards that the values of the two points indicate an abnormality due to a vibration, noises, or the like. In such a case, the decelerating current is fixed to a predetermined minimum value, thereby performing a decelerating control. On the basis of a deceleration start velocity V0 which is obtained as a reciprocal number of a time (zero-cross time interval) T0 from the zero-cross position that is two tracks before the target track to the zero-cross position that is one track before the target track, the decelerating control unit determines a deceleration starting time T1 from the sample point (sample point of TES2) just after the zero-cross point to the start of the deceleration and subsequently decides a decelerating time T2. In this case, when the deceleration start velocity V0 is equal to or less than a limit velocity Vth at which the pull-in control to the on-track can be performed, the deceleration starting time T1 is changed in accordance with the deceleration start velocity V0. The decelerating time T2 is set to a predetermined fixed time. The decelerating current Ib determined from the difference (TES1–TES2) between the sample values of the tracking error signal before and after the zero-cross position just before the target track is supplied to the lens actuator for the fixed decelerating time T2. On the contrary, when the deceleration start velocity V0 exceeds the limit velocity Vth at which the pull-in control to the on-track can be performed, the deceleration starting time T1 is set to zero, the decelerating time T2 is decided in accordance with the deceleration start velocity V0, and the decelerating current of a predetermined maximum value is supplied to the lens actuator. The deceleration control unit determines a target velocity by setting the number of remaining tracks for the target cylinder to zero with regard to the speed control between the zero-cross position that is two tracks before the target track and the zero-cross position that is one track before the target track, thereby reducing a servo gain of the speed control and performing the pre-deceleration. To perform the pre-deceleration, it is desirable to reduce the servo gain of the speed control into ½.

When a medium such as an MO cartridge enclosed medium or the like which has grooves for tracking and records information between the grooves is used as a medium, the position of the groove is set to the zero-cross position and a tracking error signal is detected. Therefore, the zero-cross position that is one track before the target track in the speed control is set to a position that is 0.5 track before. The zero-cross position that is two tracks before the target track is set to a position which is 1.5 tracks before. When a read-only medium such as a CD or the like on which information has been recorded by pits is used as a medium, the position of the pit is set to the zero-cross position and a tracking error signal is detected. Therefore, the zero-cross position that is one track before the target track in the decelerating control is set to a position of 1.0 track before. The zero-cross position which is two tracks before the target track is set to a position of 2.0 tracks before. The control to move the light beam to the target track by using the lens actuator of the access control unit as a main apparatus is a speed control for supplying a current to the lens actuator so that the deviation between the target velocity which is generated in accordance with the number of remaining tracks for the target track and the actual velocity which is obtained from the tracking error detection signal is set to zero. The control to move the light beam to the target track by using the VCM of the access control unit as a sub apparatus is a feed-forward control such that the accelerating current and the decelerating current are supplied to the VCM on the basis of the position deviation between the target track and the present track and the carriage is accelerated at a constant acceleration and, after that, it is decelerated.

Eccentricity correction

According to the invention, an optical storage apparatus which efficiently accurately measures eccentricity information that is necessary for an eccentricity correction and optimizes the eccentricity correction when a medium is loaded is provided.

Therefore, the invention has: an eccentricity measuring unit for measuring an eccentricity amplitude Eamp and an eccentricity phase T$\Phi$ for a rotation reference position on the basis of the detection of the zero-cross point of the tracking error signal as eccentricity information in a state in which the driving of the carriage and the lens by a positioner is stopped; an eccentricity memory in which sine values corresponding to one rotation have been stored in correspondence to the rotating position of the medium; and an eccentricity correcting unit for obtaining sine value amount read out from the eccentricity memory and a medium eccentricity amount from the eccentricity measurement information by the measuring unit and for controlling the positioner so as to set off the eccentricity amount. The eccentricity correcting unit obtains the eccentricity amplitude Eamp by multiplying a track pitch TP to the half of the number of zero-cross points of the tracking error signal corresponding to one rotation of the medium obtained synchronously with a medium detection signal indicative of one rotation of the medium. A time from the start position of one rotation of the rotation detection signal to a middle point of the maximum zero-cross interval time of the tracking error signal is obtained as an eccentricity phase T$\Phi$. When a difference (tx–T$\Phi$) between an elapsed time tx at the present rotating position for the rotation reference position and the eccentricity phase T$\Phi$ is negative, the eccentricity measuring unit reads out a sine value $\sin 2\pi f(tx-T\Phi+Trot)$ which is obtained from a time (tx–T$\Phi$+Trot) obtained by adding one rotating time Trot to the difference (tx–T$\Phi$) from the eccentricity memory, thereby correcting. f denotes an eccentricity period which is determined by a rotational speed of the medium. When the difference (tx–T$\Phi$) is equal to 0 or a positive value, the eccentricity measuring unit reads out the sine value $\sin 2\pi f(tx-T\Phi)$ which is obtained by the difference (tx–T$\Phi$) from the eccentricity memory, thereby correcting.

The eccentricity measuring unit is characterized in that the number of zero-cross points corresponding to one rotation is measured in the eccentricity correction state by the eccentricity correcting unit based on the measured eccentricity information and, when the number of zero-cross points due to the eccentricity correction exceeds the number of zero-cross points at the time of the measurement, the eccentricity phase T$\Phi$ obtained by the measuring process is corrected to an opposite phase. As for a correction in case of the opposite phase, it is sufficient to set an eccentricity opposite phase (T$\Phi$+Trot/2) obtained by adding the half time of one rotating time Trot to the measured phase T$\Phi$. Namely, in one measuring process, whether the eccentricity phase for the start position of one rotation is correct or is an opposite phase that is deviated by 180° or not cannot be judged. Therefore, the eccentricity correction based on the measured eccentricity information is executed and if the number of zero-cross points per rotation is reduced by the correction, it will be understood that the eccentricity phase is correct. If the number of zero-cross points is increased by the correction, since this means that the eccentricity phase is an opposite phase, it is corrected. Thus, the correct eccentricity phase can be always set as a measurement result. The eccentricity measuring unit executes the measurement of the eccentricity information and the eccentricity correction after the measurement twice and compares the numbers of zero-cross points corresponding to one rotation after completion of the eccentricity correction. When a difference of them exceeds a threshold value, the measurement of the eccentricity and the correction are repeated until the difference is equal to or less than the threshold value. Thus, even if the erroneous eccentricity measurement is performed because a vibration or the like is added during the eccentricity measurement, the measurement result of the correct eccentricity information is always obtained without being influenced by such vibration or the like. The sine values per rotation of the number which is determined by the predetermined reading period set by the number of samples or the like of the DSP and the medium rotational speed has been stored in the eccentricity memory. When the medium rotational speed changes, the sine value is updated to the sine value of one rotation of the number that is determined by the medium rotational speed after it was changed. For example, assuming that the MO medium rotates at 3600 rpm and there are 36 data (sine value of every rotational angle of 10°), when the CD medium rotates at 2400 rpm, there are 54 data (sine value of every rotational angle of about 6.7°).

Envelope servo

According to the invention, an optical storage apparatus which can properly form a tracking error signal even with respect to the presence or absence of a mirror portion due to a difference of a medium or a high speed seek.

Therefore, according to the invention, with respect to a tracking error detecting circuit of an optical storage apparatus in which a tracking error signal according to the position of a light beam in the direction which transverses the tracks was formed on the basis of a photosensitive output of the return light derived by irradiating the light beam from an optical unit to a medium, there are provided: a 2-split detector for receiving the return light from the medium into electric signals; a subtractor for forming a tracking error signal from a difference between the photosensitive signals from the 2-split detector and outputting; a peak holding circuit for detecting envelopes of the photosensitive signals from the 2-split detector and outputting to the subtractor; and a switching control circuit for on-off controlling the envelope detecting function by the peak holding circuit as necessary. When recognizing the loading of a medium having a mirror portion on the medium surface, for example, an MO cartridge medium of 128 MB, the envelope detecting function of the peak holding circuit is turned off. In the case where a medium having a mirror portion on a part of the medium surface, for example, an MO cartridge medium of 230 MB having a mirror portion in a non-user region is loaded, when an access to a track area having a mirror portion is recognized, the envelope detecting function of the peak holding circuit is turned off. Therefore, with regard to the medium having the mirror portion, since the envelope detection is turned off, the occurrence of a large distortion of the tracking error signal by the return light of the mirror portion at the time of the envelope detection can be suppressed. A dropout of the amplitude depending on the pit occurs in the tracking error signal of the ID portion. However, in the low density recording, since a track pitch is relatively large, even if there are slight noises, the seek control and the on-track control can be sufficiently performed. Further, when recognizing the high speed seek in which the seek velocity obtained from the tracking error signal exceeds the predetermined velocity, the switching control circuit turns off the envelope detecting function of the peak holding circuit. Even if the envelope detection is turned on in the MO cartridge of 640 MB or 540 MB having no mirror portion, since the envelope detection is turned off at the time of the high speed seek. Therefore, a situation such that the tracking error signal is masked by the envelope detection and is lost is certainly prevented and the high speed seek can be performed.

Focusing servo

According to the invention, an optical storage apparatus which can eliminate a vain motion of a focusing servo by an ID portion without losing the function of the focusing servo is provided.

For this purpose, the invention is characterized in that with respect to a focusing servo circuit of an optical storage apparatus for controlling an objective lens of the positioner to an in-focus position on the basis of a photosensitive output of a return light obtained by irradiating a light beam from an optical unit to a medium, there are provided: a PID operation control unit having a proportional device, an integrator, and a differentiator; and a controller for stopping a function of the differentiator of the PID operation control unit for a period of time during which a gate signal indicative of an ID portion of the medium is obtained. The controller can further stop a function of the proportional device of the PID operation control unit. The controller further sets gains of the differentiator and the proportional device of the PID operation control unit to zero and stops the functions. The gate signal indicative of the ID portion of the medium is ordinarily formed by a formatter. The ID gate signal is fetched in a focusing servo which is realized by a DSP or the like. The function of at least the differentiator of the PID operation unit for the focusing servo is stopped by setting the gain to 0. Therefore, even when there is a change in return light due to a micro pit of the ID portion, it is not reflected to the control of the focusing servo. On the contrary, an integration control strongly functions and even if the focusing error signal fluctuates due to the ID portion, the focusing control in which the objective lens is stably set into an in-focus state of the MO portion can be performed.

The above and other objects, features, and advantages of the present invention will become more apparent from the following detailed description with reference to the drawings.

BRIEF DESCRIPTION OF THE DRAWINGS

FIG. 2 is a schematic explanatory diagram of a structure of an apparatus of the invention using an MO cartridge;

FIG. 3 is a schematic explanatory diagram of a structure of an apparatus of the invention using a CD;

FIG. 5 is an explanatory diagram of ON/OFF operations of a servo control mode by analog switches in FIG. 4;

FIG. 6 is an explanatory diagram of the servo control mode in FIG. 5;

FIGS. 7A to 7C are explanatory diagrams of one track seek according to the invention;

FIGS. 9A to 9D are explanatory diagrams of a fine seek control according to the invention using the MO cartridge in which a lens actuator and a VCM are simultaneously driven;

FIGS. 11A and 11B are flowcharts for a fine seek control according to the invention;

FIGS. 13A to 13D are explanatory diagrams of the deceleration control for moving the head to the target track in case of using a CD;

FIGS. 17A to 17C are time charts of a tracking error signal, a rotation detection signal, and a VCM current when measuring an eccentricity;

FIGS. 18A to 18C are time charts of the tracking error signal, rotation detection signal, and VCM current when correcting the eccentricity by using a measurement result of the eccentricity;

FIGS. 19A to 19C are time charts of the tracking error signal, rotation detection signal, and VCM current at the time of the eccentricity correction when a rotational phase is inverted;

FIG. 20 is a generic flowchart for a measuring process by an eccentricity measuring unit in FIG. 14;

FIGS. 23A to 23C are explanatory diagram of an output process of a correction value synchronized with a sampling clock by the reading from an eccentricity memory;

FIGS. 27A to 27D are signal waveform diagrams of a photosensitive signal and a TES signal when the envelope servo is turned off and the TES signal when the envelope servo is turned on;

FIGS. 29A to 29C are signal waveform diagrams of the photosensitive signal and TES signal by the mirror portion of FIG. 26 when the envelope servo is turned on;

FIGS. 30A to 30C are explanatory diagrams of an output waveform by the ON/OFF operations of the envelope servo of the peak holding circuit of FIG. 25 corresponding to a rectangular input;

FIGS. 31A and 31B are explanatory diagrams of the TES signal at the time of a high speed seek for the ON/OFF operations of the envelope servo;

FIG. 33 is a flowchart for the ON/OFF control of the envelope servo according to the invention during the seek;

FIGS. 35A to 35D are time charts of a focusing control in the ID portion when controls of differentiation, integration, and proportion in FIG. 34 are made valid; and FIGS. 36A to 36F are time charts of a focusing control in the ID portion when the differentiation control is turned off and the integration and proportion controls are made valid in FIG. 34.

DETAILED DESCRIPTION OF THE PREFERRED EMBODIMENT

Apparatus construction

Figure 1A:
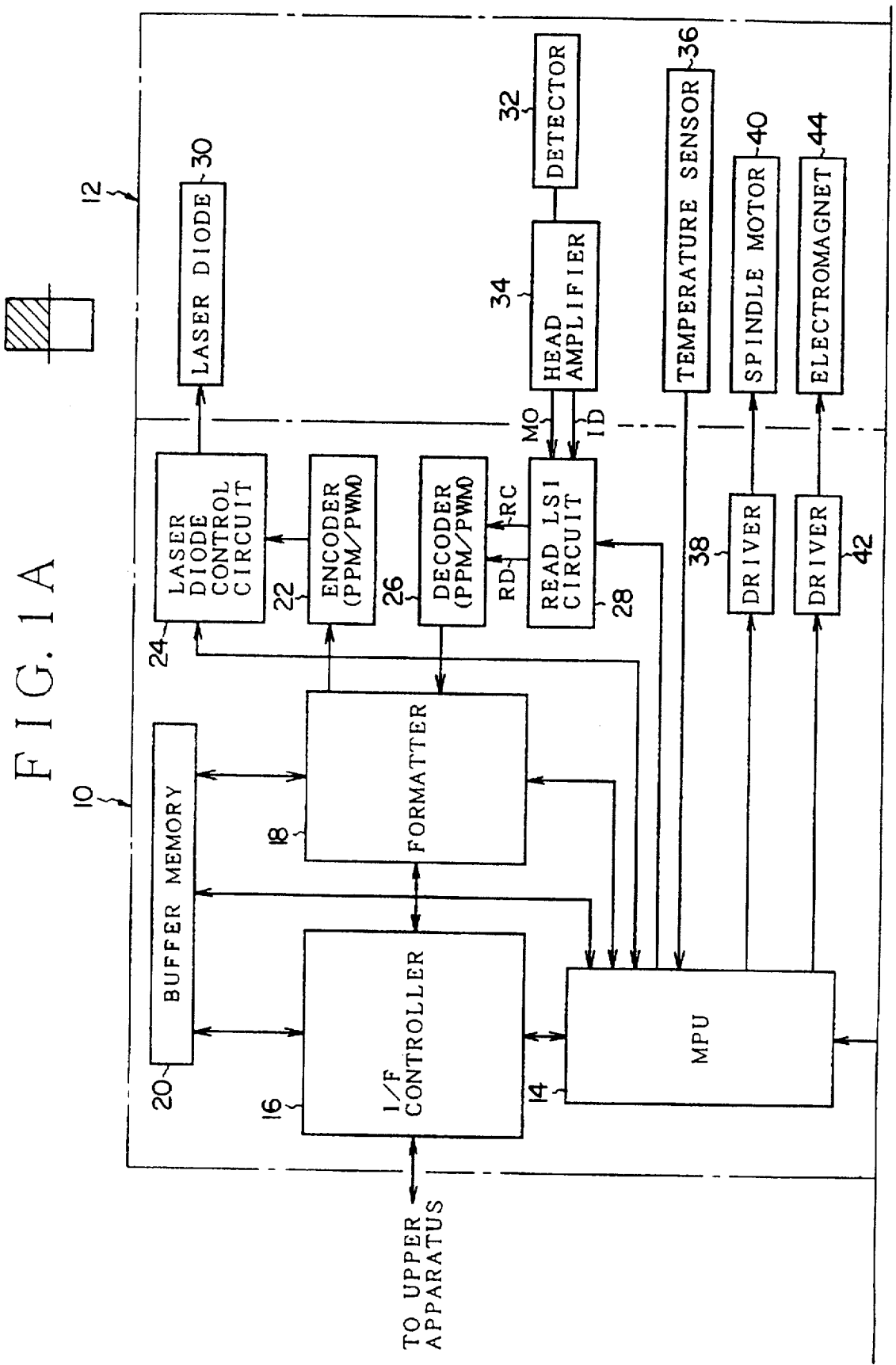
FIG. 1 is a block diagram of an optical disk drive according to the invention.
Figure 1B:
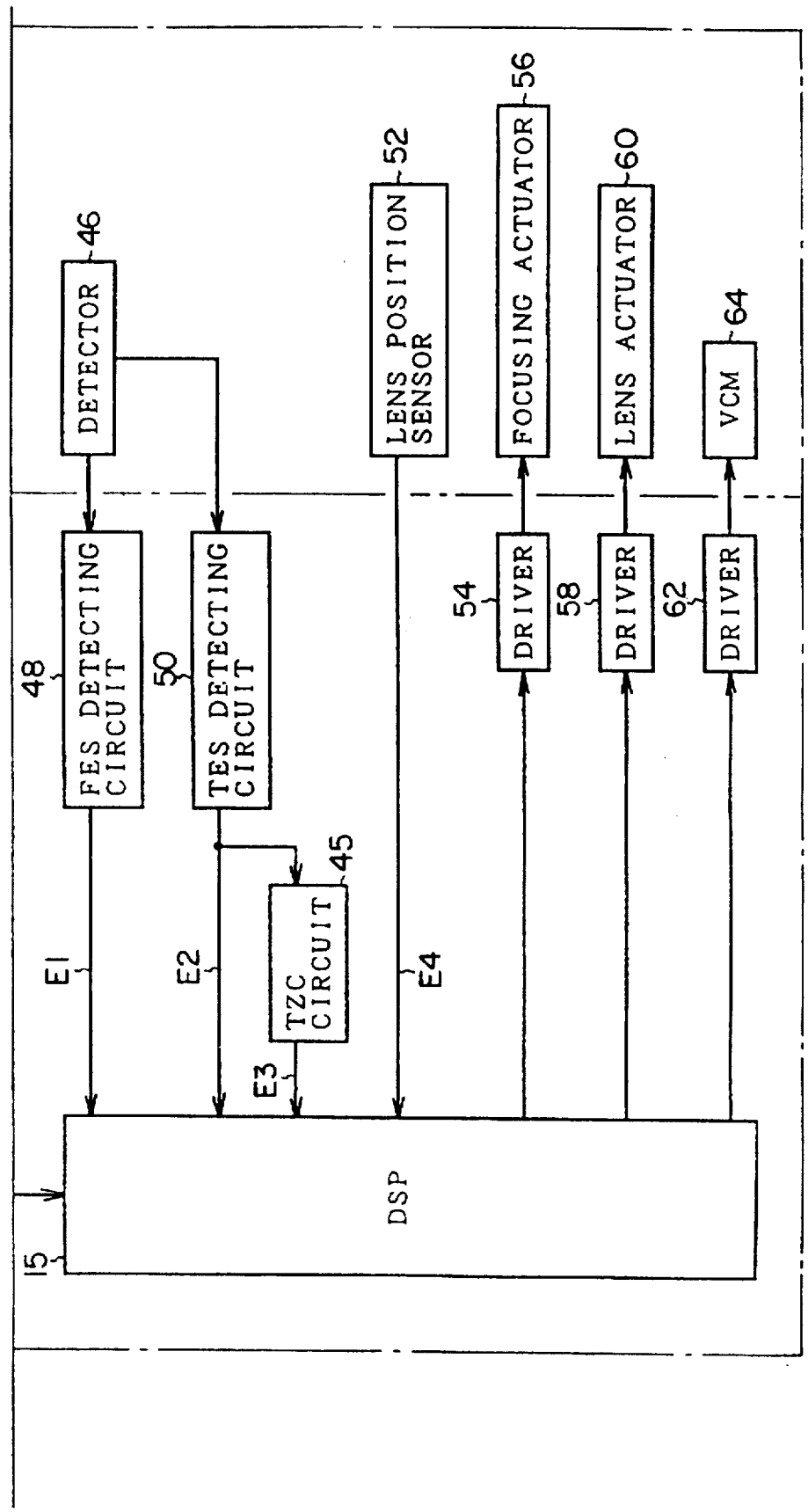

FIG. 1 is a circuit block diagram of an optical disk drive of the invention. The optical disk drive of the invention is constructed by a controller 10 and an enclosure 12. The controller 10 includes: an MPU 14 for performing a whole control of the optical disk drive; an interface controller 16 for transmitting and receiving commands and data to/from an upper apparatus; a formatter 18 for performing processes which are necessary to read or write data from/onto an optical disk medium; and a buffer memory 20 which is commonly used by the MPU 14, interface controller 16, and formatter 18. An encoder 22 and a Laser diode control circuit 24 are provided as a writing system for the formatter 18. A control output of the laser diode control circuit 24 is supplied to a laser diode 30 provided for an optical unit on the enclosure 12 side. As an optical disk for which the recording and reproduction are performed by using the laser diode 30, namely, as a rewritable MO cartridge medium, any one of disks of 128 MB, 230 MB, 540 MB, and 640 MB can be used in the embodiment. Among them, with respect to the MO cartridge media of 128 MB and 230 MB, a pit position recording (PPM recording) for recording data in accordance with the presence or absence of a mark on the medium is used. Regarding the MO cartridge media of 540 MB and 640 MB to which a high-density recording is performed, a pulse width recording (PWM recording) for making edges of a mark, namely, a front edge and a rear edge correspond to data is used. In this instance, a difference of memory capacities between 640 MB and 540 MB depends on a difference of sector capacities. Therefore, in case of a sector capacity of 2 kB, the memory capacity is equal to 640 MB and, in case of 512 MB, it is equal to 540 MB. As mentioned above, the optical disk drive of the invention can correspond to an MO cartridge having any one of the memory capacities of 128 MB, 230 MB, 540 MB, and 640 MB. Therefore, when the MO cartridge is loaded in the optical disk drive, an interval of ID portions on the medium is measured from a signal indicative of the existence of a pit, the kind of medium is recognized from the ID interval by the MPU 14, and a recognition result of the kind is notified to the formatter 18. Thus, in case of the medium of 128 MB or 230 MB, a formatting process corresponding to the PPM recording is performed and, in case of the medium of 540 MB or 640 MB, the formatting process according to the PWM recording is performed. As a reading system for the formatter 18, a decoder 26 and a read LSI circuit 28 are provided. A photosensitive signal of a return light of a beam from the laser diode 30 by a detector 32 provided for the enclosure 12 is supplied as an ID signal and an MO signal to the read LSI circuit 28 through a head amplifier 34. The read LSI circuit 28 has circuit functions such as AGC circuit, filter, sector mark detecting circuit, synthesizer, PLL, and the like, forms a read clock and read data from the supplied ID signal and MO signal, and transmits them to the decoder 26. Since a zone CAV is used as a recording method of the medium by a spindle motor 40, for the read LSI circuit 28, a switching control of a clock frequency corresponding to a zone is performed to a built-in synthesizer by the MPU 14. A modulating method of the encoder 22 and a demodulating method of the decoder 26 are switched in accordance with the kind of medium by the formatter 18. Namely, with respect to the media of 128 MB and 230 MB, those methods are switched to the modulating and demodulating methods of the PPM recording. Regarding the media of 540 MB and 640 MB, the methods are switched to the modulating and demodulating methods of the PWM recording. A detection signal of a temperature sensor 36 provided on the enclosure 12 side is supplied to the MPU 14. On the basis of an environment temperature in the apparatus detected by the temperature sensor 36, the MPU 14 controls a light emitting power for each of the reading, writing, and erasing operations in the laser diode control circuit 24 to an optimum value. The MPU 14 controls the spindle motor 40 provided on the enclosure 12 side by a driver 38. Since the recording/reproducing operations of the MO cartridge are performed by a zone CAV method, the spindle motor 40 is rotated at a constant velocity of, for example, 3600 rpm. The MPU 14 also controls an electromagnet 44 provided on the enclosure 12 side through a driver 42. The electromagnet 44 is arranged on the side opposite to the beam irradiation side of the MO cartridge loaded in the apparatus and supplies an external magnetic field to the medium at the time of the recording and erasing operations. The DSP 15 realizes a servo function for positioning a beam from the laser diode 30 to the medium. For this purpose, a 2-split detector 46 for receiving a light in a beam mode from the medium is provided for the optical unit on the enclosure 12 side and an FES detecting circuit (focusing error signal detecting circuit) 48 forms a focusing error signal E1 from photosensitive outputs of the 2-split detector 46 and supplies to the DSP 15. A TES detecting circuit (tracking error signal detecting circuit) 50 forms a tracking error signal E2 from the photosensitive outputs of the 2-split detector 46 and supplies to the DSP 15. The tracking error signal E2 is supplied to a TZC circuit (track zero-cross detecting circuit) 45. The TZC circuit 45 forms a track zero-cross pulse E3 and sends to the DSP 15. A lens position sensor 52 for detecting a lens position of an objective lens to irradiate a laser beam to the medium is further provided on the enclosure 12 side and supplies a lens position detection signal (LPOS) E4 to the DSP 15. The DSP 15 controls a focusing actuator 56, a lens actuator 60, and a VCM 64 through drivers 54, 58, and 62 in order to position a beam.

FIG. 2 shows a schematic diagram of the enclosure. The spindle motor 40 is provided in a housing 66. By inserting an MO cartridge 70 from the side of an inlet door 68 to a hub of a rotational axis of the spindle motor 40, a loading such that an MO medium 72 in the MO cartridge 70 is attached to a hub of the rotational axis of the spindle motor 40 is performed. A carriage 76 which can be freely moved in the direction across a medium track by the VCM 64 is provided on the lower side of the MO medium 72 of the loaded MO cartridge 70. An objective lens 80 is mounted on the carriage 76. A beam from a semiconductor laser provided for a fixed optical system 78 enters the objective lens 80 through a prism 81, thereby forming a beam spot onto the medium surface of the MO medium 72. The objective lens 80 is controlled so as to move in the optical axial direction by the focusing actuator 56 of the enclosure 12 in FIG. 1 and can be also moved by the lens actuator 60 in the radial direction across the medium track by a distance within, for example, tens of tracks. The position of the objective lens 80 mounted on the carriage 76 is detected by the lens position sensor 52 in FIG. 1. The lens position sensor 52 sets the lens position detection signal to 0 at a neutral position at which an optical axis of the objective lens 80 directing vertically upward and generates the lens position detection signals E4 corresponding to moving amounts of different polarities for the movements to the outside and inside.

The optical disk drive of the invention can also use a read only CD other than the MO cartridge as an optical disk medium. FIG. 3 shows a state in which a CD is loaded in place of the MO cartridge 70 in FIG. 2. In case of using the CD, according to the embodiment, a CD medium 82 is mounted on a prepared tray 84 and is loaded into the housing 66 from the inlet door 68. The tray 84 has a turntable 86 to previously load the CD medium 82 onto the spindle motor 40. For this purpose, the CD medium 82 is mounted on the tray 84 in a state in which a hole of the center portion of the CD medium 82 is fit to the turntable 86, thereby loading the medium into the optical disk drive. As a turntable 86 which is used for the tray 84, there is used a turntable constructed in a manner such that a structure on the CD medium 82 side has the same CD loading structure as that of an ordinary CD disk drive corresponding to the center hole of the CD medium 82 and a structure on the spindle motor 40 side of the turntable 86 has the same structure as that of the hub which is used for the MO cartridge 70 in FIG. 2. By using such a turntable 86, even in case of the CD medium 82 as an exposed medium having quite different shape and dimensions, the medium can be loaded to the spindle motor 40 by using the tray 84 in a manner similar to the MO cartridge 70. As mentioned above, in order to cope with the loading of the CD medium 82, in the controller 10 in FIG. 1, when the MPU 14 recognizes that the loaded medium is the CD medium 82, the formatter 18, read LSI circuit 28, and decoder 26 are switched to the circuit function corresponding to the CD. It is also possible to provide a circuit of a reading system only for the CD medium and to switch the reading system of the MO cartridge to the reading system of the CD medium. At the same time, since a medium rotation control by the spindle motor 40 is performed by a constant linear velocity method (CLV method) in the CD medium 82, in order to set the read clock obtained from the reading system of the CD to a reference constant linear velocity, the MPU 14 sets the spindle motor 40 to a CLV control mode to change a rotational speed through the driver 38 in accordance with the track position. The invention can be also obviously applied to an optical disk drive only for the MO cartridge 70 in FIG. 2 having no reproducing function of the CD medium 82 as shown in FIG. 3.

Figure 4A:
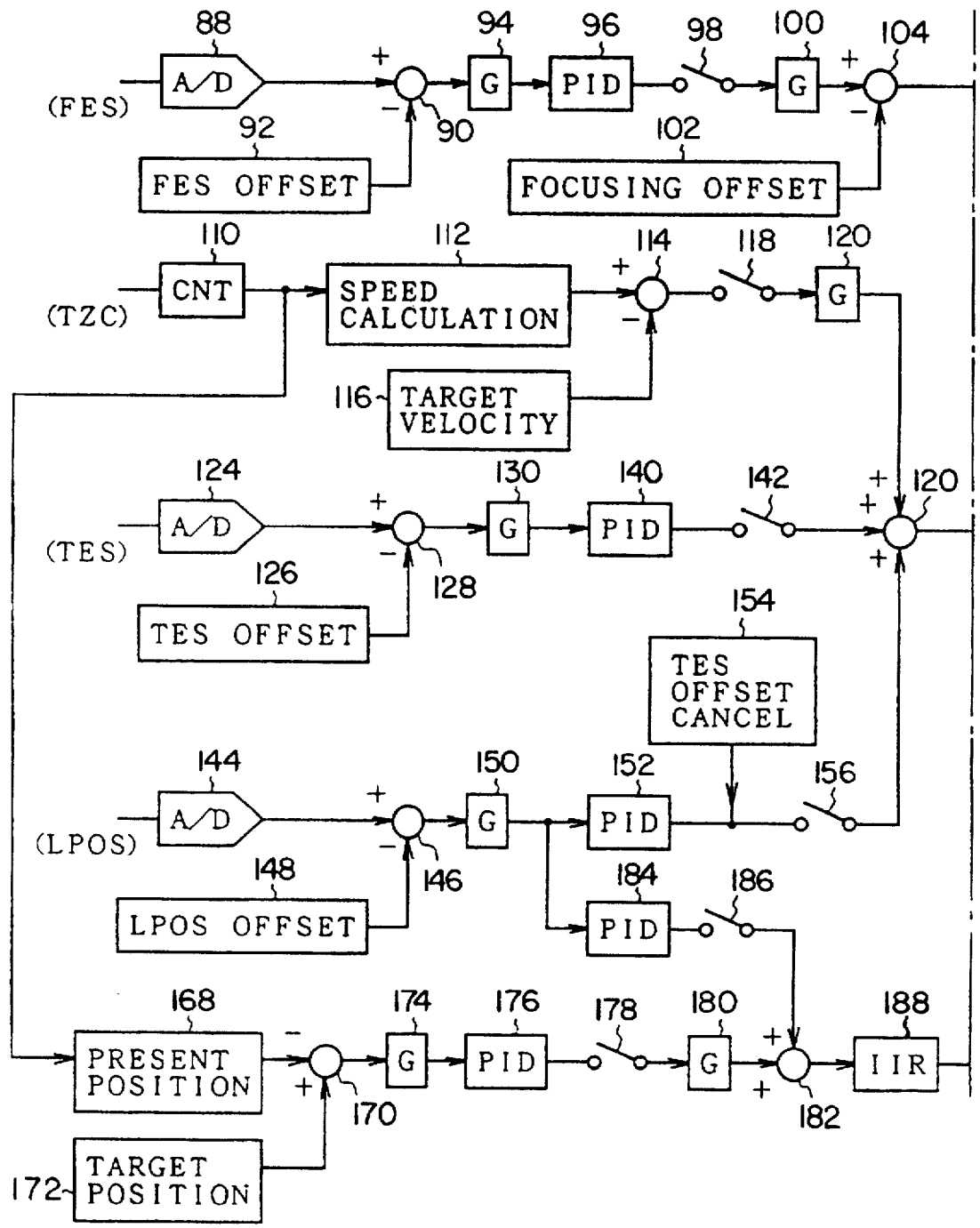
FIG. 4 is a functional block diagram of a servo system which is realized by a DSP in FIG. 1.

FIG. 4 is a functional block diagram of the focusing servo, lens servo, and VCM servo which are realized by the DSP 15 provided for the controller 10 in FIG. 1. First, in the focusing servo system, the focusing error signal E1 is converted into digital data by an A/D converter 88 and is fetched, the data is corrected by an FES offset which was set in a register 92 at an addition point 90, the corrected data is subjected to a phase compensation for raising a gain with respect to a predetermined high frequency band by a phase compensator 94, and proportional integral and differential arithmetic operations are performed to a focusing error signal by a PID arithmetic operating unit 96. Further, after the signal was phase compensated by a phase compensator 100, a focusing offset of a register 102 is compensated at an addition point 104. An output signal of the addition point 104 is converted to an analog signal by a D/A converter 108 through a limiter 106, thereby generating a current instruction value to the focusing actuator 56. A servo switch 98 is provided between the PID arithmetic operating unit 96 and phase compensator 100, thereby enabling the ON/OFF operation of the focusing servo to be controlled. A lens servo system for the lens actuator 60 will now be described. The lens servo system can be divided into three systems of a speed control system, a tracking servo system, and a lens position servo system. First, according to the speed control system, the track zero-cross signal E3 is supplied to a counter 110, a time of a track zero-cross interval is obtained by counting clocks, and a beam velocity is obtained by a speed calculator 112. A deviation between an output of the speed calculator 112 and a target velocity from a register 116 is obtained at an addition point 114. A phase compensation with respect to the velocity deviation is performed by a phase compensator 120 through a servo switch 118 and, after that, the resultant data is supplied to an adder 122. In the tracking servo system of the lens servo, the tracking error signal E2 is converted into digital data by an A/D converter 124 and is fetched, a correction of a TES offset which has been set by a register 126 is performed at an addition point 128, and a phase compensation is performed by a phase compensator 130. After that, proportional integral and differential arithmetic operations are performed by a PID arithmetic operating unit 140 and the resultant data is supplied to the adder 122 through a servo switch 142. Further, according to the lens position servo system, the lens position detection signal E4 is converted into digital data by an A/D converter 144 and is fetched as digital data, a correction of an LPOS offset by a register 148 is performed by an adder 146, and a phase compensation is performed by a phase compensator 150. After that, proportional integral and differential arithmetic operations are performed by a PID arithmetic operating unit 152 and the resultant data is supplied to the adder 122 through a servo switch 156. A TES offset cancellation can be applied to the input side of the servo switch 156 by a register 154. The velocity deviation signal of the speed servo system, the tracking error signal of the tracking servo system, and further, the lens position deviation signal of the lens position servo system as mentioned above are added by the adder 122 and the resultant signal is phase compensated by a phase compensator 158. After that, it is subjected to a correction of a track offset by a register 162 at an addition point 160, the corrected signal is subsequently converted to an analog signal by a D/A converter 166 and is outputted as a current instruction value for the lens actuator 60 to the driver side. The servo system of the VCM 64 will now be explained. The servo system of the VCM 64 constructs a servo system of a feed-forward control based on a deviation between the target track position at the time of the seek and the present track position. First, the present position of the beam detected by the counter 110 based on the track zero--cross signal E3 by a register 168 is compared with a target track position in a register 172 by an adder 170, thereby forming a position deviation signal corresponding to the number of remaining tracks for the target track position. An output of the adder 170 is phase compensated by a phase compensator 174. After that, the resultant data is subjected to proportional integral and differential arithmetic operations by a PID arithmetic operating unit 176, is further phase compensated by a phase compensator 180 through a servo switch 178, and is supplied to an IIR 188 through an adder 182. Further, after completion of the phase compensation by a phase compensator 190, a correction according to a VCM offset by a register 194 is performed in an adder 192. The resultant data is supplied to an adder 198 through a limiter 196. An eccentricity correction of the medium is performed by the adder 198 by reading out data from an eccentricity memory 200. Different polarities corresponding to the seek in the inner direction and the seek in the outer direction are set by a register 202 to the position deviation signal of the VCM servo subjected to the eccentricity correction by the adder 198. Further, an absolute value of the resultant signal is formed by an absolute value forming circuit 204. The absolute value signal is converted into an analog signal by a D/A converter 206, is converted to a VCM current instruction value by the VCM 64, and is outputted to the driver side. Further, an output of the phase compensator 150 of the lens position servo system provided for the lens servo system is branched and supplied to the adder 182 of the VCM servo system through a PID arithmetic operating unit 184 and a servo switch 186. Thus, when the lens is sought by driving the objective lens by the lens actuator 60 in the ON state of the servo switch 186, the lens position deviation signal formed by the adder 146 on the basis of the lens position detection signal at this time is added as a position deviation signal to the adder 182 of the VCM position servo system through the PID arithmetic operating unit 184 and servo switch 186. Therefore, the VCM 64 controls the position of the carriage so as to set a lens position offset to zero by driving the lens actuator 60. Since such a servo control based on the deviation signal of the lens position detection signal by the lens actuator is added to the servo system of the VCM 64, such a control is called a double servo.

FIG. 5 shows a control mode by the servo system in FIG. 4 and the ON/OFF states of the servo switches 98, 118, 142, 156, 178, and 186. The control mode of the servo system are divided into five modes of a focusing off mode, a track off mode, a track on mode, a fine seek mode, and a position seek mode. The control contents of the modes are as shown in FIG. 6. First, the focusing off mode indicates a state in which a track access of the beam is stopped. The focusing servo is turned off by turning off the servo switch 98 and only the servo switch 156 is turned on, thereby controlling the objective lens on the carriage to the zero position by the lens actuator 60. In the track off mode, the focusing servo is made valid by turning on the servo switch 98, the servo switch 156 is turned on, thereby controlling the objective lens to the zero position by the lens actuator 60. In the track off mode, therefore, only the focusing of the beam to the medium can be performed in a stop state of the beam. According to the track on mode, the focusing servo is made valid by turning on the servo switch 98 and the servo switch 142 is turned on, thereby performing the on-track control of the lens actuator 60 by the driving by the tracking error signal. Further, by turning on the servo switch 186, a position servo by the lens position detection signal is applied to the VCM servo system, thereby enabling the VCM offset or eccentricity offset to be compensated. According in the fine seek mode, when an access to a target cylinder is instructed by an upper apparatus, the beam is moved to the target position by the speed control of the lens actuator 60 and the feed-forward control of the VCM 64. That is, in a state in which the focusing servo is made valid by turning on the servo switch 98, the speed control of the lens actuator 60 is performed by turning on the servo switch 118. Further, the feed-forward control corresponding to a deviation between the target and present track positions is performed by turning on the servo switch 178. Further, by turning on the servo switch 186, the double servo for controlling the beam so as to be moved to a lens zero position by driving the VCM 64 is applied on the basis of a position deviation of the lens position detection signal E4. The position seek mode indicates a Lens position control by the lens actuator 60. In a state in which the lens in held to the zero position, the position control of the VCM 64 is performed so that the beam is moved to the target track by the position deviation signal corresponding to the number of tracks at the present track position for the target track position. Namely, in a state in which the focusing servo is made valid by turning on the servo switch 98, the servo switch 156 is turned on, thereby performing a lens locking operation to hold the lens to the zero position by the lens actuator 60. In this state, the carriage is moved by the VCM 64 so that the deviation for the target track position is set to zero by turning on the servo switch 178, thereby controlling the position of the beam to the target track.

One-track seek control

FIGS. 7A to 7C are time charts for the tracking error signal E2, D/A converter for driving the lens actuator, a current instruction value I2, and control state in the track-on mode in the seek control when the 1-track seek command in which a neighboring track on the inside or outside of the present track is set to the target track is received from the upper apparatus. According to the 1-track seek control in the optical disk drive of the invention, as shown by the tracking error signal E2 of FIG. 7A, a seek control period is divided into three periods of an accelerating period 210, a pre-decelerating period 212, and a decelerating period 214. Further, a difference between a value TES1 at a sampling point 216 of the tracking error signal E2 at time t2 when the accelerating period 210 is finished and a value TES2 at a sampling point 220 of the tracking error signal E2 at time t4 when the decelerating period 214 is started is obtained as information indicative of a beam moving speed. A value Ib2 of a decelerating current in the decelerating period 214 in FIG. 7B is decided from the difference (TES1–TES2) between the two sampling points 216 and 220, thereby enabling the beam to be stably positioned on the track by a one-track seek. The accelerating period 210, pre-decelerating period 212, and decelerating period 214 in the one-track seek period of the DAC current instruction value I2 in FIG. 7B have been predetermined at a stage of design. An accelerating time T1, a pre-decelerating time T2, and a decelerating time T3 are fixedly decided by an adjustment such as a simulation or the like of the apparatus. According to the embodiment, when it is assumed that the number of sampling times of the D/A converter for fetching the tracking error signal E2 is set to one hour unit, in the MO cartridge media of 540 MB and 640 MB of a high-density recording in which a track pitch is equal to 1.1 μm, as an optimum value, a time of seven samples is obtained in the accelerating time T1, a time of two samples is obtained in the pre-decelerating time T2, and a time of four samples is obtained in the decelerating time T3, respectively. That is, according to the 1-track seek control in the invention, seven samples in the period of total 13 samples are allocated to the first accelerating period 210 and a period which exceeds the half of the 1-track seek period is set to the accelerating period 210. By supplying a predetermined accelerating current Ia to such an accelerating period, even in case of the 1-track seek, a sufficient acceleration is performed. This number of samples is the number when a sampling frequency of the A/D converter 124 in FIG. 4 is set to 68 kHz. On the other hand, a speed-zero period and a decelerating period corresponding to the accelerating period and the pre-decelerating period in the conventional 1-track seek control are set to almost ½. Even when the same accelerating current Ia as that in FIG. 7B is used, since the conventional accelerating period is so short to be ⅕ of the whole period, the acceleration of the beam is lower as compared with that in the 1-track seek of the invention. Therefore, in the 1-track seek according to the invention, by performing the seek for the accelerating period 210 corresponding to ⅕ of the conventional accelerating period, actually, a period of the time T1 (=seven samples) which exceeds the half of the conventional accelerating time, the beam moving velocity is sufficiently accelerated, thereby reducing the 1-track seek time. In the next pre-decelerating period 212, a preliminary deceleration is performed prior to the final decelerating period 214. It is sufficient that a value of a decelerating current Ib which is used for the pre-decelerating 212 is decided by multiplying a predetermined coefficient of 1 or less to the accelerating current Ia. According to experiments of the inventors et al. of the present invention, when the half current of the accelerating current is set to a pre-deceleratincy current Ib1, an optimum 1-track control can be performed. Therefore, it is desired to use a value near the half value of the accelerating current Ia as a pre-decelerating current Ib1 to be used for the pre-decelerating period 212. With respect to the decelerating current, Ib2 in the decelerating period 214 subsequent to the pre-decelerating period 212, a velocity V is obtained as follows from the difference (TES1−TES2) between the values of TES1 and TES2 of the tracking error signals E2 detected at the sampling points 216 and 220 at time t2 at the end of the acceleration and time t4 at the start of the acceleration and the pre-decelerating time T2.

$$V=(TES1-TES2)/T2$$

On the basis of the velocity V obtained from a change in actual tracking error signal E2 as mentioned above, the decelerating current Ib2 is obtained as follows.

$$Ib2=(T3/V) \times (\text{brake gain } Gb)$$

By supplying the current Ib2 to the lens actuator for a period of the decelerating time T3, the beam can be stably positioned on the track when the 1-track seek is finished. In a control state of the track-on mode of FIG. 7C, the tracking servo is turned off by the start of the 1-track seek control at time t1 and the tracking servo is turned on by the end of the deceleration at time t6, so that the beam can be stably positioned on the target track which is one-track ahead at time t6. As mentioned above, in the 1-track seek control of the invention, since the value of the decelerating current Ib2 in the decelerating period is decided by detecting an actual velocity from the tracking error signal E2 in the 1-track seek control, even when a variation occurs in the velocity after completion of the acceleration, the optimum decelerating current Ib2 depending on the velocity at that time can be instructed. Thus, even when a different optical disk drive is used, the stable on-track of the 1-track seek can be realized.

Figure 8A:
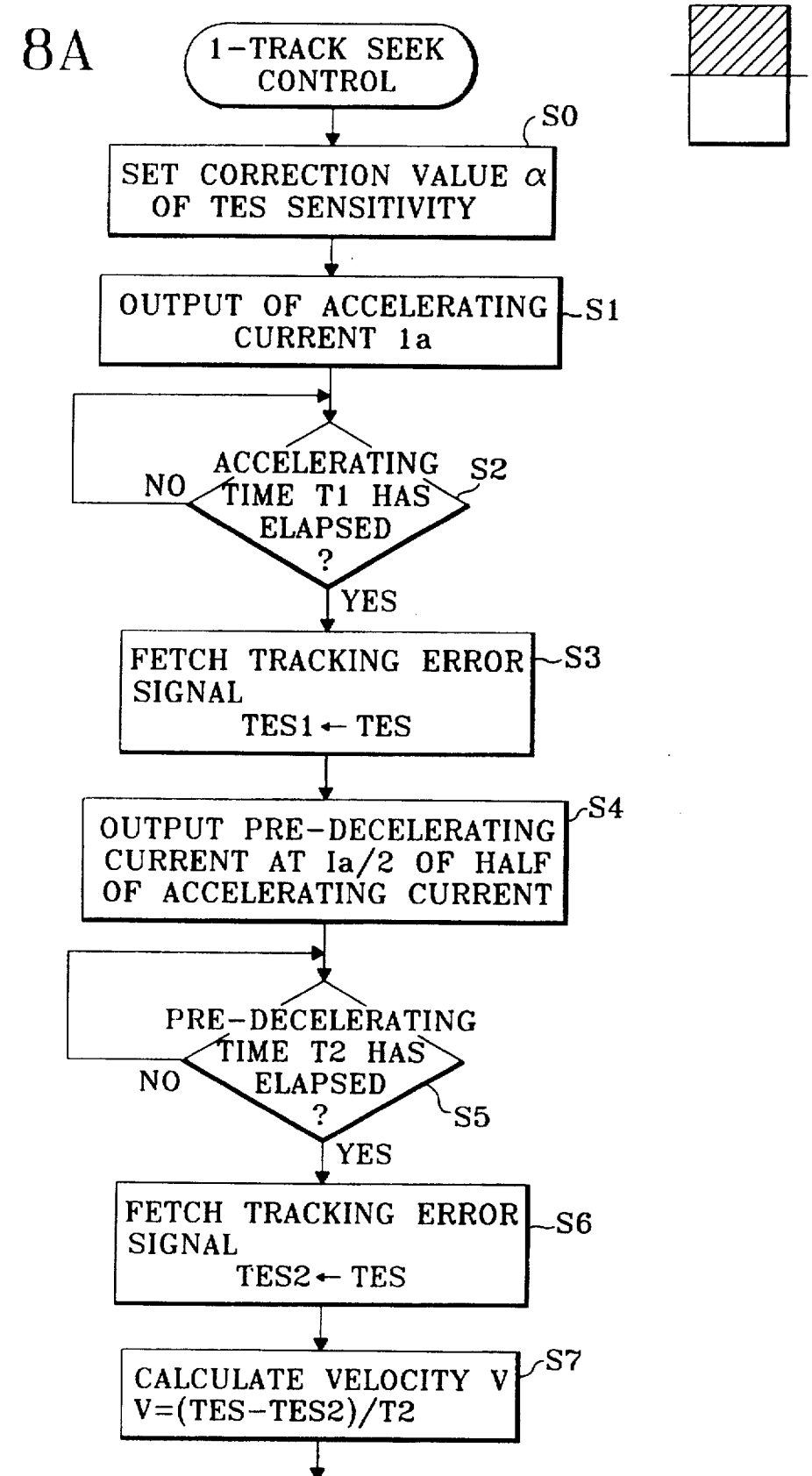
FIG. 8 is a flowchart for a one-track seek control according to the invention.
Figure 8B:
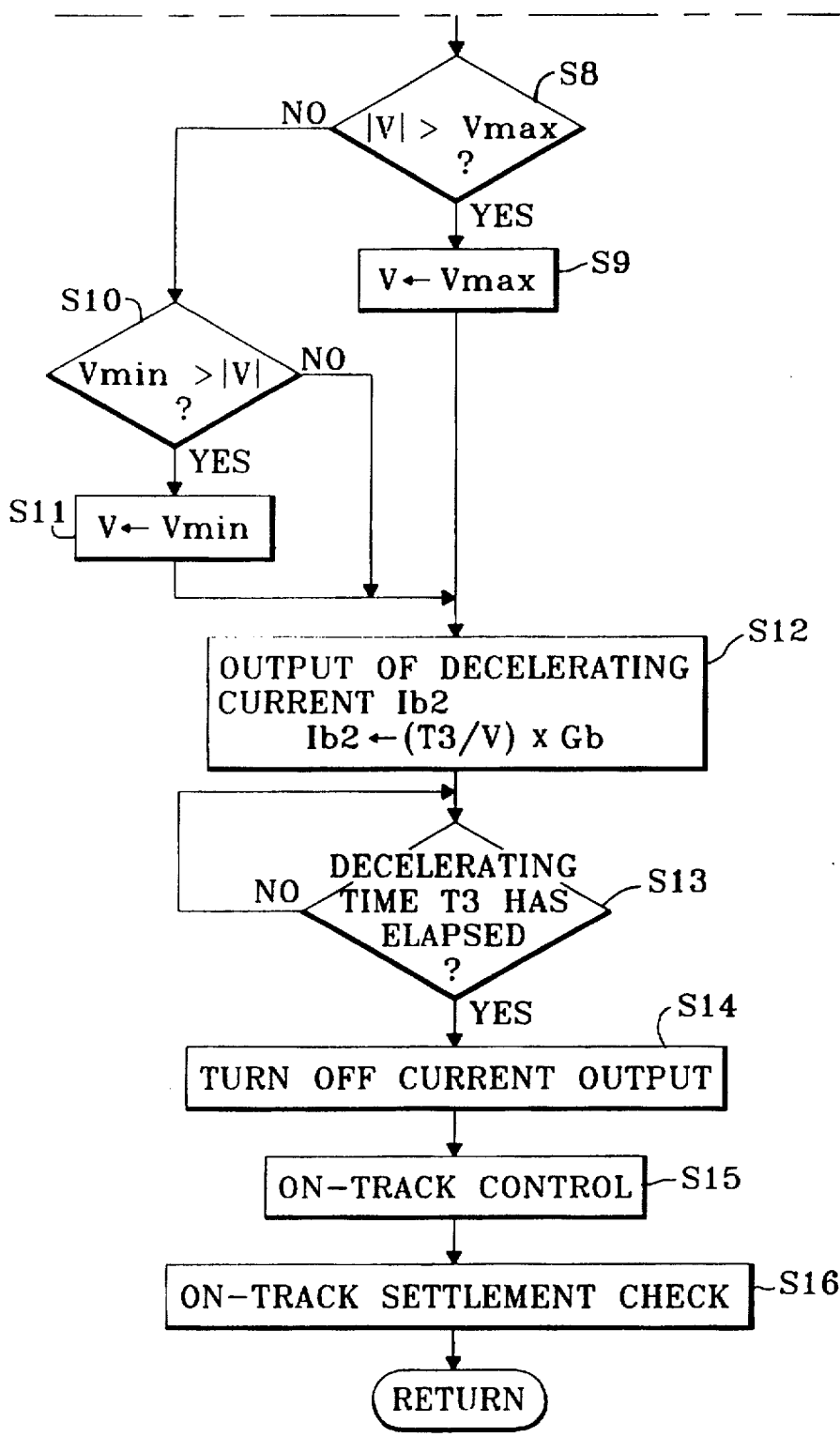

FIG. 8 is a flowchart for a control process to realize the 1-track seek control in FIG. 7. When a command of the 1-track seek from the upper apparatus to the MPU 14 in FIG. 1 is decoded, the control process is executed by instructing the DSP 15 to perform the 1-track seek. First in step S0, a TES sensitivity correction value to normalize upper and lower peak values of the tracking error signal E2 to predetermined values is set. The correction value to normalize the TES sensitivity is obtained in a manner such that at the time of an initializing process when the MO cartridge is loaded into the optical disk drive, the tracking error signal is fetched by slowly moving the beam at a predetermined velocity by the VCM or lens actuator, and a vertical amplitude value of the signal is measured, thereby obtaining the correction value from a ratio between the measured value and a predetermined specified amplitude value. For example, when it is assumed that a specified value of the vertical amplitude is set to Aref and a difference of the upper and lower peak values which were actually measured is set to A, a correction value a of the TES sensitivity which is actually obtained and is used to normalize the tracking error signal to a specified value is obtained by an equation α=(Aref/A). As mentioned above, the correction value α to normalize the TES sensitivity obtained by the initializing process when the medium is loaded is fetched in step S0. When fetching the tracking error signal in the following 1-track seek process, the value normalized by multiplying the correction value α is always used. In step S1, a current instruction value for the A/D converter to supply the accelerating current Ia to the lens actuator is outputted. Thus, the lens actuator 60 accelerates and moves the beam toward the neighboring track. In step S2, whether the predetermined accelerating time T1 has elapsed or not is judged. If YES, the tracking error signal TES at that time is sampled and set to TES1 in step S3. With respect to TES1, a correction by multiplying the correction coefficient a to normalize the TES sensitivity is performed. In step S4, for example, the half pre-decelerating current Ia/2 which is equal to ½ of the accelerating current Ia is supplied to the lens actuator, thereby instructing to output the current to perform the pre-deceleration. As for the pre-decelerating state, a check is made in step S5 to see if the predetermined pre-decelerating time T2 has elapsed. If YES, in step S6, the tracking error signal E2 is again sampled and set to TES2. In step S7, the velocity V is obtained by using the predetermined pre-decelerating time T2 from the values TES1 and TES2 of the tracking error signals fetched in steps S3 and S6. In step S8, a check is made to see whether the absolute value of the velocity V obtained in step S7 is larger than a predetermined maximum velocity Vmax or not. If YES, step S9 follows and it is judged that an abnormal acceleration due to a vibration, an inclination of the optical disk drive, or the like has been applied. In this case, the velocity V is fixed to the maximum velocity Vmax. On the other hand, when the absolute value of the velocity V is equal to or smaller than the maximum velocity Vmax in step S8, step S10 follows and the absolute value of the velocity V is compared with a predetermined minimum velocity Vmin. In this case, when the absolute value is smaller than the minimum velocity Vmin, it is judged that an erroneous velocity has been calculated by fetching an erroneous tracking error signal due to a factor such as a vibration or the like at a timing when the signal is fetched in step S3 or S6, so that the velocity V is fixed to the minimum velocity Vmin in step S11. When the velocity V is decided as mentioned above, in step S12, the decelerating current Ib2 is obtained by dividing the decelerating time T3 by the velocity V and multiplying the brake gain Gb to the resultant value and it is instructed to supply the decelerating current Ib2 corresponding to the velocity V to the lens actuator 60. In step S13, a check is made to see whether the predetermined decelerating time T3 has elapsed or not. If YES, the output of the decelerating current to the lens actuator is turned off in step S14. In step S15, the control of the on-track mode which is in the OFF state is turned on for performing the on-track control. Consequently, after the beam was pulled to the adjacent track, in step S16, when an on-track settlement condition, for example, a fact that the beam has been settled within a predetermined offset for the track center is recognized, the completion of the on-track is notified to the MPU 14, thereby finishing a series of 1-track seek control. In the on-track control state after completion of the 1-track seek control, the MPU 14 records or reproduces data to/from the medium track according to an access command transferred subsequent to the 1-track seek command of the upper apparatus.

In this instance, the numbers of samples shown as optimum values of the accelerating time T1 in the accelerating period 210, the pre-decelerating time T2 in the pre-decelerating period 212, and the decelerating time T3 in the decelerating period 214 in the 1-track seek control in FIGS. 7A to 7C are the numbers indicated which are obtained in the case where the sampling frequency of the A/D converter 124 in FIG. 5 in which the tracking error signal E2 has been fetched is set to 68 kHz. In case of the sampling frequency of 68 kHz, a period of time of one sample is equal to about 15 μsec. In case of 13 samples, it is sufficient to set to time of 195 μsec. Even when a settlement time for a period of time between t5 and t6 is included, the on-track of the 1-track seek can be performed for a short time of 250 to 300 μsec. Further, according to the 1-track seek control of the invention, when the number of tracks to, for example, a target cylinder is smaller than a predetermined value, for example, in case of several tracks, the seek is performed by repeating the 1-track seek control in FIGS. 7A to 7C a number of times corresponding to the number of tracks to the target track. Specifically speaking, the process for a period of time from t1 to t6 is repeated every track with respect to the seek exceeding the number of tracks to the target track by the repetition of the 1-track seek control, the seek control according to the fine seek mode in FIG. 6 is performed.

Fine seek

In FIG. 1, in the optical disk drive of the invention, when the MPU 14 recognizes that the access command to the target track corresponding to the number of tracks exceeding the 1-track seek control has been received from the upper apparatus through the interface controller 16, the MPU 14 instructs the DSP 15 to perform the fine seek in which a target track address is designated. By receiving a fine seek command by the MPU 14, the DSP 15 performs the fine seek control as shown in time charts in FIGS. 9A to 9D. The fine seek control is a control such that the lens actuator 60 for moving the objective lens 80 mounted on the carriage 76 in FIG. 2 is used as a main apparatus and simultaneously performs a control such that the VCM 64 for driving the carriage 76 is used as a sub apparatus.

In the fine seek control in FIGS. 9A to 9D, the tracking error signal E2, beam velocity V, current I2 of the lens actuator 60, and a current I3 of the VCM 64 for a period of time from the start of the seek to the end of the seek are shown. The seek control of the lens actuator 60 performs a speed control for controlling so as to set to a target velocity based on the number of remaining tracks from the present track to the target track. As shown in FIG. 9B, the speed control is performed in an accelerating interval 230, a constant velocity interval 232, and a decelerating interval 240 subsequent to a constant velocity interval 238 just before the target cylinder. On the other hand, as shown in FIG. 9D, in the control of the carriage by the VCM 64, the feed-forward control for generating the accelerating current and decelerating current, accelerating the carriage at a constant accelerating velocity, and after that, decelerating in accordance with the position deviation of the decelerating track for the target track at the time of the start of the seek. Specifically speaking, as a VCM current I3, an accelerating current 246 is supplied in the former half of the seek control and a decelerating current 248 is supplied in the latter half of the seek control. By the constant accelerating control by the feed-forward control of the VCM 64, as for the beam velocity V of FIG. 9B, a constant accelerating interval 234 by the feed-forward control of the VCM occurs in the middle of the constant velocity interval 232 by the speed control of the lens actuator. When the beam passes the position corresponding to the half distance to the target track, the beam velocity V enters a constant decelerating interval 236 by the decelerating current of the feed-forward control of the VCM 64. When the decelerating current in the constant decelerating interval 236 of the VCM is lower than that at a target velocity of the constant speed control by the speed control of the lens actuator 60, the beam velocity V appears as a constant velocity interval 238. Further, when considering the speed control of the lens actuator 60 in detail, a specified accelerating current 242 is supplied to the lens actuator 60 at the start of the seek at time t1. This accelerating current has a current value Ia and is supplied for the predetermined time T1. Consequently, the lens actuator 60 is accelerated at a predetermined constant velocity. When the acceleration is ended at time t3, the control mode enters the constant speed control in which a constant velocity is held so as to set to the target velocity. When passing a zero-cross point 250 of one track before the target track of the tracking error signal E2 in FIG. 9A, a decelerating current 244 based on the difference (TES1–TES2) between the values TES1 and TES2 of the tracking error signal E2 obtained at sample points 248 and 252 before and after the zero-cross point 250 is supplied for a period of time from time t8 to time t9. When the deceleration is finished at time t9, the on-track servo is made valid, thereby positioning the beam on the track of the target cylinder. On the other hand, in the control of the VCM 64 in FIG. 9D, at time t2 when a zero-cross point count starting time Tcs just before a time point until the first zero-cross point of the tracking error signal E2 is obtained has elapsed from the start of the seeking operation at time t1, a feed-forward current -Iff for accelerating is supplied to the VCM 64, thereby performing the accelerating control in the direction of the target cylinder. When the beam reaches a track position corresponding to the half distance to the target cylinder at time t4 by counting the zero-cross points of the tracking error signal E2, the current is switched to a decelerating current Iff at this time point, thereby performing the decelerating control of the constant acceleration. The decelerating current of the VCM 64 is turned off at a timing at time t6 corresponding to a zero-cross point 250 at a position of 0.5 track just before the target track, thereby finishing the feed-forward control.

In this instance, the tracking error signal E2 in FIG. 9A is the tracking error signal in the fine seek in case of loading the MO cartridge. As for the MO cartridge medium, since the zero-cross point of the tracking error signal E2 is obtained at adjacent track boundaries, the track positions of the zero-cross points have a scale such as 0.5, 1.5, 2.5, . . .

Figures 10A, 10B:
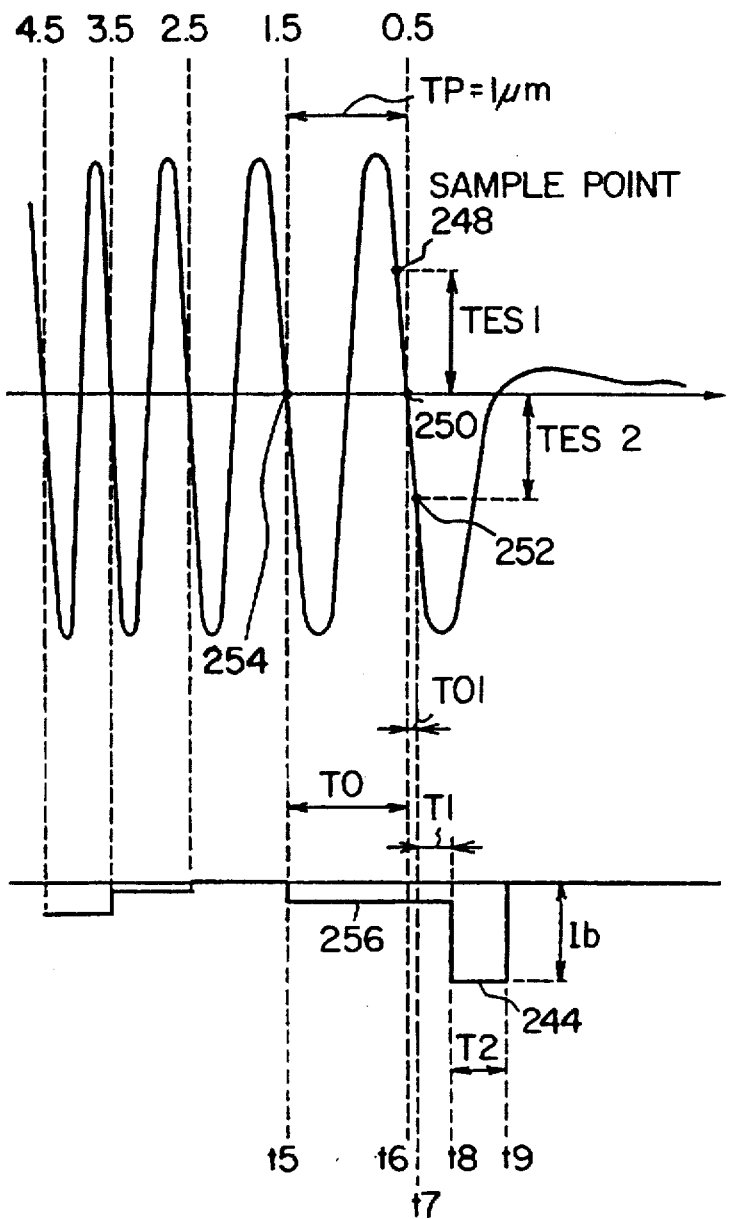
FIGS. 10A and 10B are detailed explanatory diagrams of a deceleration control for moving a head to a target track in FIGS. 9A to 9D.

FIGS. 10A to 10B show the details of the decelerating control while extracting the tracking error signal E2 and beam velocity V with respect to the constant velocity interval 238 and decelerating interval 240 just before the target track in FIGS. 9A to 9D. As shown in FIG. 10A, the values TES1 and TES2 of the tracking error signal E2 are fetched at the sample points 248 and 252 before and after the zero-cross point 250 which is 0.5 track before the target track and is a zero-cross point just before the target track, respectively. On the basis of the difference (TES1–TES2) between them, the deceleration starting time T1 until the deceleration is started after time t7 at the sample point 252, decelerating time T2, and decelerating current Ib are decided with respect to the decelerating current which is supplied to the lens actuator 60 in FIG. 10B. That is, the difference (TES1–TE2) of the tacking error signal E2 at the sample points 248 and 252 indicates a beam movement amount of a sampling period Ts. Therefore, the beam velocity V is obtained as follows.

$$V = (TES1 - TES2)/Ts$$

According to the decelerating control of the invention, the decelerating current Ib which is supplied for a period of the decelerating time T2 fixedly decided is determined on the basis of the beam velocity V. That is, the decelerating current Ib is obtained by the following expression.

$$Ib=(T2/V) \times (\text{brake gain } Gb)$$

Such a decelerating control by deciding the decelerating current Ib according to the beam velocity V is valid when the beam velocity before the start of the deceleration lies within a range of a limit velocity at which the beam can be pulled in to the on-track state. In order to discriminate the beam velocity at the start of the deceleration, according to the invention, time T0 between the zero-cross point 254 which is two tracks before the target track and the zero-cross point 250 which is one track before the target track in FIG. 10A, namely, time T0 between the position of 1.5 track before the target track and a position of 0.5 track before the target track is measured, thereby obtaining a deceleration starting velocity V0 as follows.

$$V0=(2 \times \text{track pitch } TP)/T0.$$

When the deceleration starting velocity V0 obtained as mentioned above lies within a range of the limit velocity at which the beam can be pulled in to the on-track state, the deceleration starting time T1 in FIG. 10B is decided as follows.

$$T1=T0/256$$

In this instance, 256 of the denominator indicates a predetermined default value. As such a value, a proper value can be used as necessary. At a timing when the deceleration starting time T1 elapses, the decelerating current Ib is decided from the velocity V obtained from the difference (TES1-TES2) between the sample points 248 and 252 before and after the zero-cross point 250 just before the target track, decelerating time T2, and brake gain Gb and is supplied for the decelerating time T2 fixedly determined. On the other hand, when the deceleration starting velocity V0 obtained on the basis of time T0 a position of 1.5 track before and a position of 0.5 track before exceeds the limit velocity at which the beam can be pulled into the on-track state, the deceleration starting velocity V0 is too high. In this case, the determination of the decelerating current Ib by the beam velocity V according to the difference (TES1-TES2) between the sample points 248 and 252 before and after the zero-cross point 250 just before the target track is not performed. When it is assumed that the deceleration starting time T1 is set to 0 (T1=0) and the decelerating current Ib is set to a predetermined maximum decelerating current value Imax, the decelerating time T2 is obtained by the following expression.

$$T2=(2 \times \text{track pitch } TP)/T0$$

As mentioned above, in case of an overvelocity, by supplying the maximum decelerating current Imax for the decelerating time T2, the velocity can be certainly decelerated to a velocity near zero at which the beam can be stably pulled into the target track.

Figure 11A:
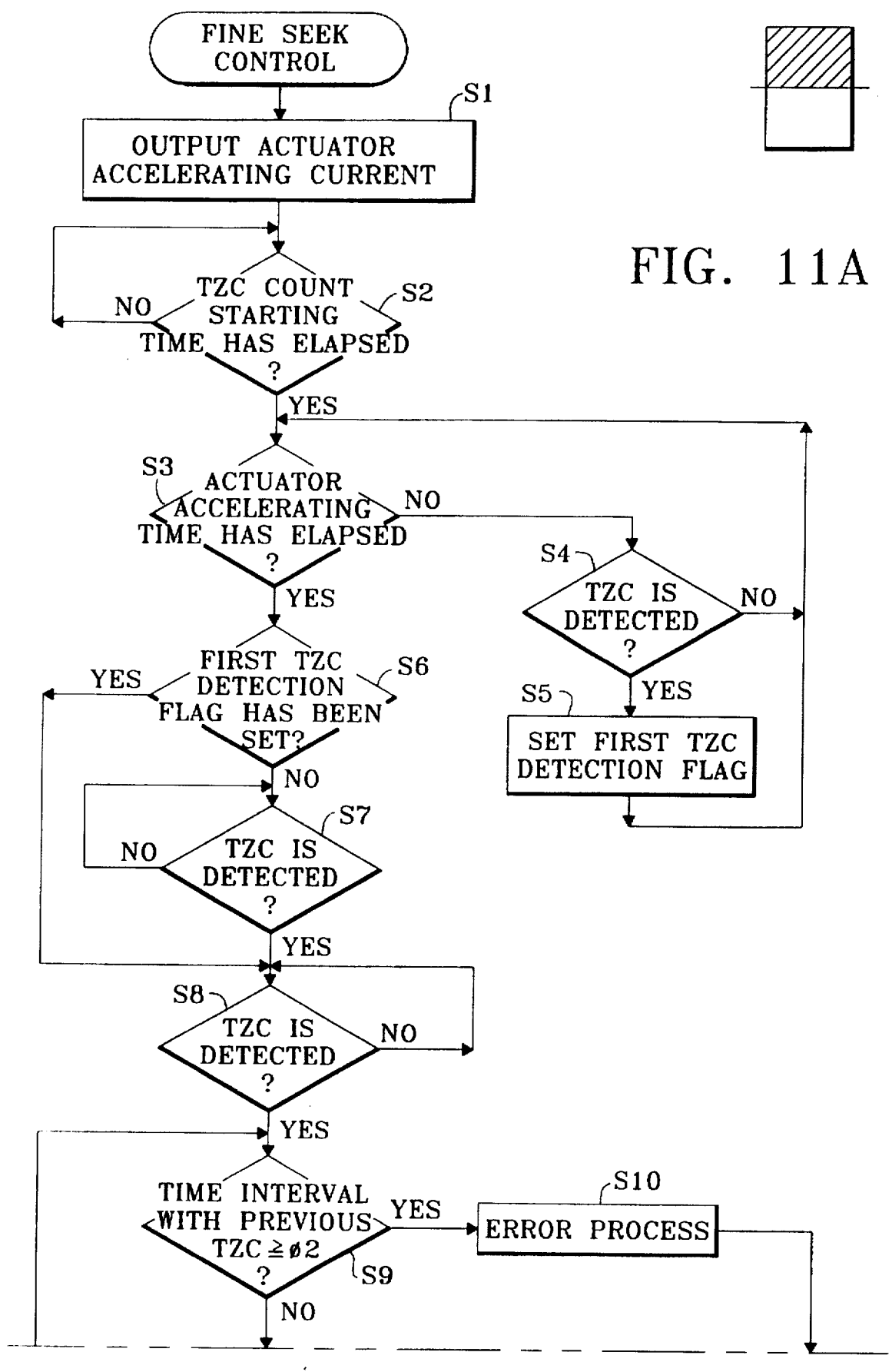

FIGS. 11A and 11B are flowcharts for the fine seek control in FIGS. 9A to 9D. The decelerating control just before the target track is shown in detail in FIGS. 12A and 12B. FIG. 11A shows a main control of the lens actuator 60 in the fine seek control. First in step S1, the accelerating current Ia is outputted to the lens actuator 60 as shown in FIG. 9C in association with the seek start. As shown in FIG. 9D, a check is made in step S2 to see whether the starting time Tcs of the predetermined zero-cross counting has elapsed. If YES, a check is made in step S3 to see if the accelerating time Ta of the actuator has elapsed. Until the actuator accelerating time Ta elapses, a check is made in step S4 to see whether the first track zero-cross point has been detected or not. If YES, step S5 follows and a first TZC detection flag is set. When the actuator accelerating time Ta elapses in step S3, a check is made in step S6 to see whether the first TZC detection flag in step S5 has been set or not. If YES, step S8 follows. If NO, namely, when the first tracking zero-cross point is not detected, a check is made in step S7 to see if the track zero-cross point has been detected. When the track zero-cross point is detected, step S8 follows. When the beam velocity is obtained from the time elapse of the zero-cross point of the tracking error signal E2, since the velocity cannot be detected at the first zero--cross point at the time of the seek start and can be first obtained at the second time, the detection of the first track zero-cross point in steps S4 to S7 indicates a process for skipping the first zero-cross point detection from targets of the arithmetic operation of the velocity. In step S8, after the seek was started, when the second detection of the track zero-cross point is performed, the beam velocity is first obtained from the time interval between two zero-cross points at this time, thereby enabling the actuator velocity control in step S9 and subsequent steps to be performed. Therefore, when the second track zero-cross point detection is performed in step S8, the beam is located at a position which is moved to the target cylinder side away from the seek start position by 1.5 tracks. In step S9, the time interval between the preceding track zero-cross point and the present track zero-cross point is obtained and is compared with a predetermined time Φ2 corresponding to a hardware failure of the lens actuator. If the time interval exceeds the abnormal time Φ2, an error process is performed in step S10. If the time interval between the track zero-cross points is normal, step S11 follows and it is judged whether the number of remaining tracks for the target track has reached 1.5 tracks or not. Until the number of remaining tracks reaches 1.5 tracks before the target track, the velocity control process in step S12 and subsequent steps is performed. In step S12, a check is made to see if the seeking direction is the inner direction. If YES, step S13 follows and the VCM 64 is allowed to generate a feed-forward current for an inner seek. If it is the outer direction, in step S14, the VCM 64 is allowed to generate a feed-forward current for an outer seek. In step S15, a target velocity is calculated from the number of remaining tracks from the present track to the target track. In step S16 in FIG. 11B, whether the target velocity is equal to a maximum target velocity VTmax or not is judged. When the target velocity is larger than the maximum target velocity VTmax, in step S17, the target velocity is set to the maximum target velocity VTmax and the current to the VCM 65 is decided so as to be equal to a constant accelerating velocity Φ1 corresponding to VTmax. When the calculated target velocity is equal to or smaller than the maximum target velocity VTmax, the process in step S17 is not executed. In step S18, an actual velocity, namely, a value obtained by dividing a track pitch TP by the track zero-cross interval is subtracted from the target velocity, a predetermined velocity feedback gain Gv is multiplied to the resultant subtraction value, and the current I2 is outputted to the lens actuator 60. In step S11 in FIG. 11A, when the number of remaining tracks reaches 1.5 tracks, the decelerating control in step S19 is performed. The details of the decelerating control in step S19 are shown in FIGS. 12A and 12B.

Figure 12A:
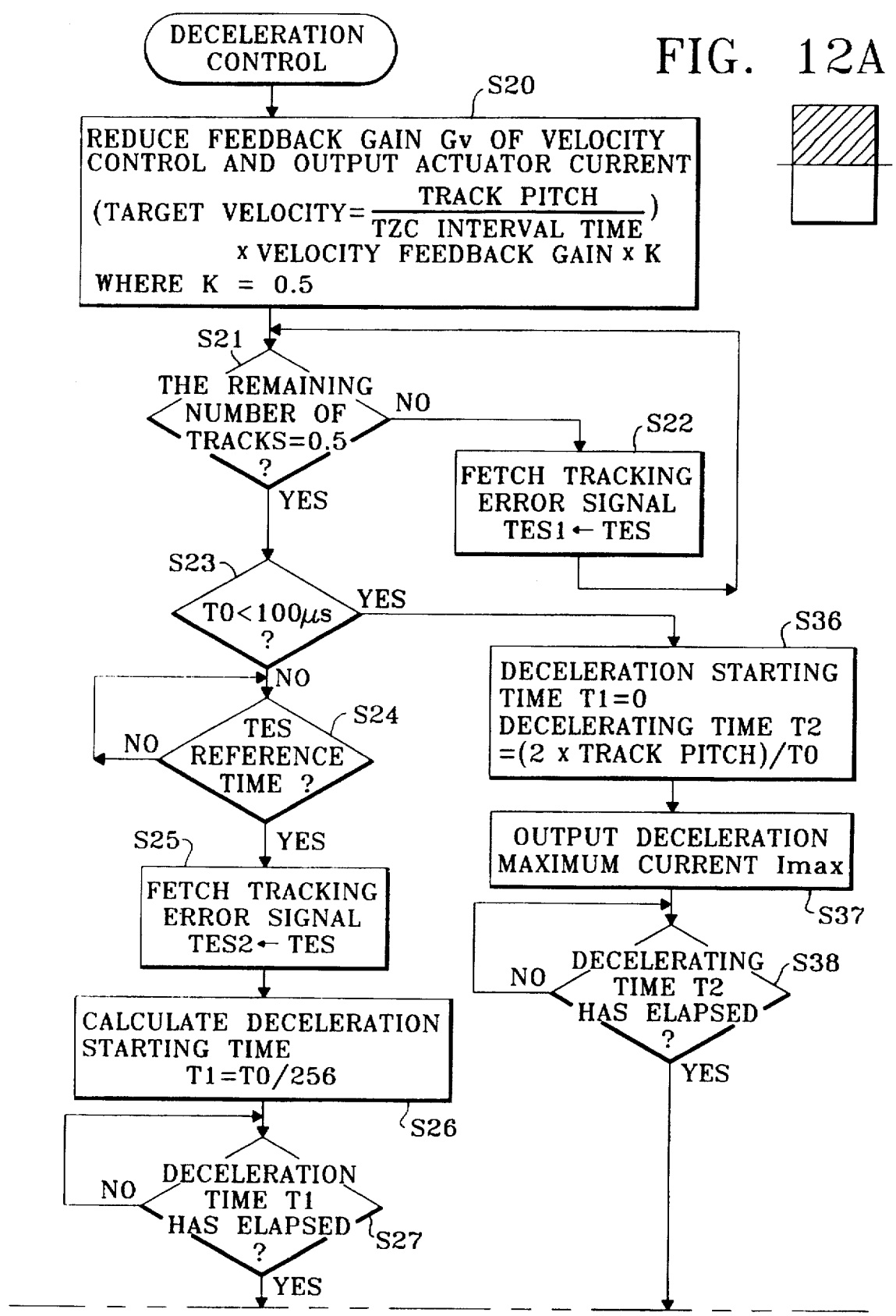
FIGS. 12A and 12B are detailed flowcharts of the deceleration control of FIGS. 11A and 11B.
Figure 12B:
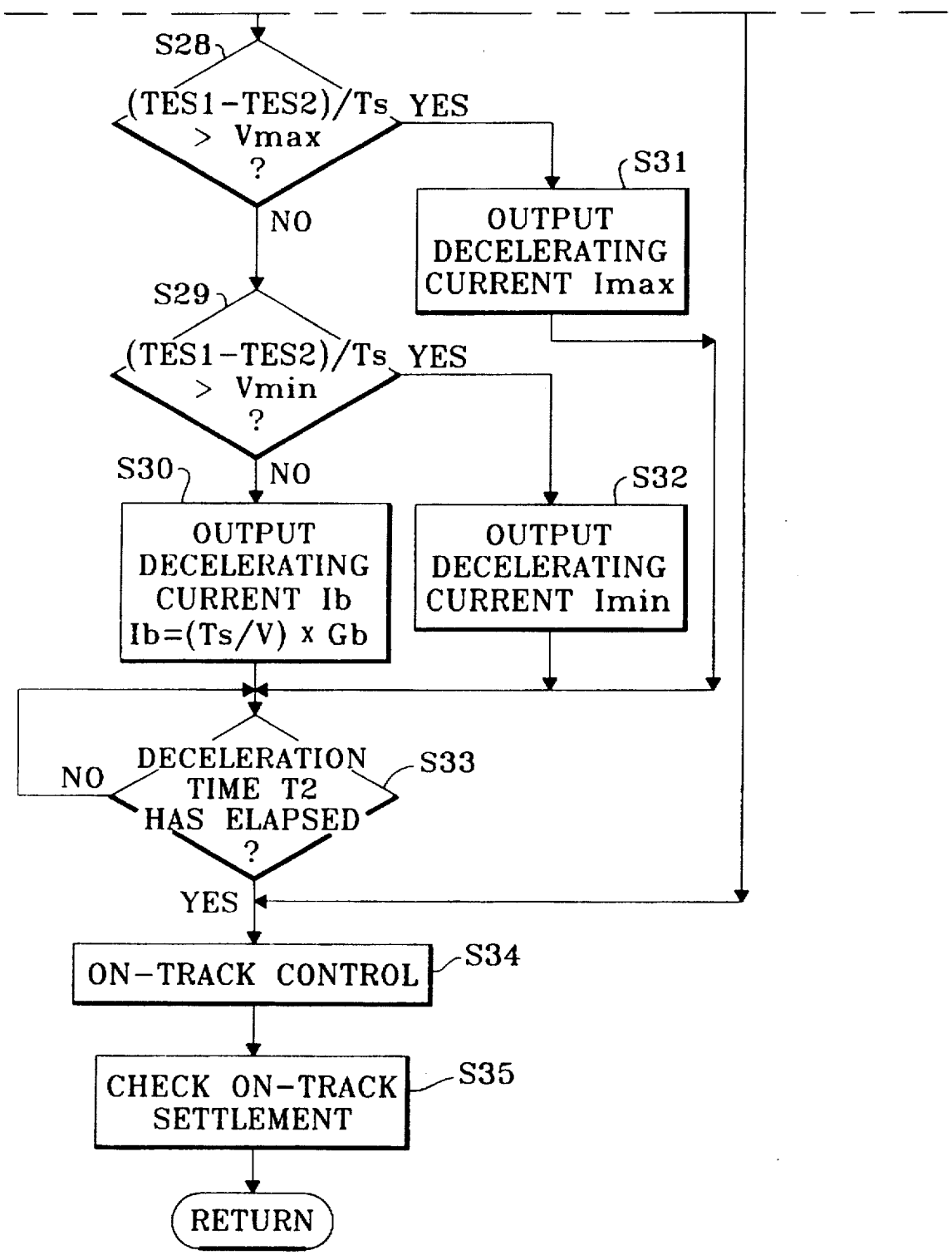

In the decelerating control in FIG. 12A, when the number of remaining tracks reaches 1.5 tracks before the target track, in step S20, the control conditions of the velocity control are changed and the pre-deceleration is performed. According to the pre-deceleration, the feedback gain Gv of the velocity control is reduced and the target velocity is simultaneously set to 0. To reduce the feedback gain Gv, specifically speaking, a correction coefficient K is multiplied. As a correction coefficient K, (K=0.5) is experimentally optimum. As mentioned above, by setting the target velocity to 0 and reducing the feedback gain Gv to the half, a value of (track pitch TP)/(TZC time interval) serving as a beam velocity at that time has a minus value. A pre-decelerating current 256 obtained by multiplying the value corresponding to the half of the velocity feedback gain Gv to the above minus value is supplied to the lens actuator 60 from a position that is 1.5 cylinders before the target track as shown in FIG. 10B. By the pre-decelerating control before the decelerating control of the target cylinder in step S20 as mentioned above, the beam velocity can be controlled to an optimum deceleration starting velocity. In step S21, a check is made to see whether the number of remaining tracks has reached 0.5 track or not. Until the number of remaining tracks reaches 0.5 track, in step S22, each time a sampling value TES of the tracking error signal E2 is obtained, it is fetched as TES1 which is used for the calculation of a velocity proportional value. When the number of remaining tracks reaches 0.5 track in step S21, a check is made in step S23 whether the deceleration starting velocity V0 for a period of time from 1.5 tracks to 0.5 track exceeds a limit velocity Vth or not. Specifically speaking, a threshold time Tth corresponding to the limit velocity Vth is set to 100 μsec. When the TZD time interval T0 for a period of time between 1.5 tracks and 0.5 track is smaller than 100 μsec, it is judged that the velocity V0 exceeds the limit velocity, and the processing routine progresses to processes for the overvelocity in step S36 and subsequent steps. When the TZC time interval is equal to or larger than 100 μsec, it is judged that the velocity V0 is a proper deceleration starting velocity. In step S24, a first sampling timing after the elapse of 0.5 track is judged. When the timing reaches the sampling timing, in step S25, the tracking error signal TES is fetched and set to TES2. In step S26, the deceleration starting time T1 is calculated by using the TZC time interval T0 and default value 256. In step S27, a check is made to see if the deceleration starting time T1 has elapsed. If YES, a check is made in step S28 to see whether the beam velocity V is larger than the predetermined maximum velocity Vmax or not. If the velocity V exceeds the maximum velocity Vmax, in step S31, the maximum decelerating current Imax is outputted for the decelerating time T2 fixedly determined. When the velocity V is equal to or smaller than the maximum velocity Vmax, a check is made in step S29 to see if the velocity V is equal to or smaller than the minimum velocity vmin. When the velocity V is equal to or smaller than the minimum velocity Vmin, in step S32, a minimum decelerating current Imin is outputted for a decelerating time T2 fixedly decided. When the beam velocity V obtained by (TES1−TES2) lies within a proper range between the maximum velocity Vmax and the minimum velocity Vmin, in step S30, the decelerating current Ib is decided from the sampling period Ts, beam velocity V, and brake gain Gb and is supplied for the predetermined decelerating time T2. When the decelerating current is outputted to the lens actuator in step S30, 31, or 32, step 533 in FIG. 12B follows, and a check is made to see if the decelerating time T2 has elapsed. If YES, step S34 follows and the control mode is switched to the on-track control, namely, the track on mode in FIGS. 5 and 6 and the beam is pulled into the target track. When an on-track settlement check is obtained in step S35, a series of processes are finished.

In step S23 in FIG. 12A, when it is judged that the TZC time interval T0 from a position of 1.5 tracks to a position of 0.5 track is smaller than the limit time Tth=100 μsec corresponding to the limit velocity Vth and that the deceleration start velocity exceeds the limit velocity Vth, step S36 follows and the deceleration starting time T1 is set to T1=0 and the decelerating time T2 is obtained as follows.

$$T2 = (2 \times \text{track pitch } TP/T0)$$

Now, assuming that the acceleration in the decelerating direction is set to A and the deceleration start velocity is set to V, the calculation of the decelerating time T2 means that $$T2 = V/A$$

Subsequently, in step S37, the predetermined maximum decelerating current Imax is outputted. In step S38, a check is made to see if the decelerating time T2 calculated in step S36 has elapsed or not. When the decelerating time T2 elapses, the processing routine advances to step S34 in FIG. 12B and the control mode is switched to the on-track control. In step S35, the completion of the on-track settlement is checked. After that, the processing routine is finished.

Figure 13A:
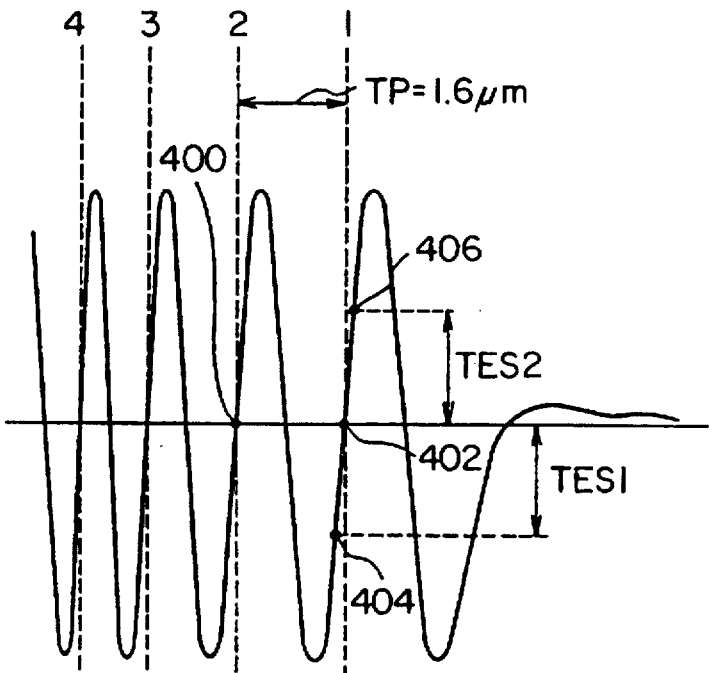
Figure 13B:
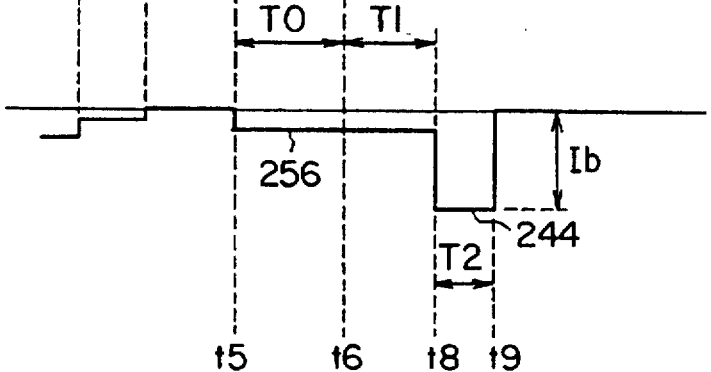

FIGS. 13A and 13B are time charts for the decelerating control just before the target track of the fine seek control when the CD medium 82 in FIG. 3 is loaded into the optical disk drive of the invention. In a manner similar to FIGS. 10A and 10B, FIGS. 13A and 13B show a tracking error signal E30 which is obtained from the CD medium and the current I2 which is supplied to the lens actuator 60 at that time. In the CD medium, the tracking error signal E30 crosses a zero point at the track center. Therefore, the zero-cross point of the tracking error signal in case of the CD medium indicates the track numbers of 0, 1, 2, 3, . . . In the deceleration control just before the target track in the CD medium, therefore, as shown in FIG. 13A, the deceleration start velocity V0 is obtained from the TZC time interval T0 of zero-cross points 400 and 402 in a range from a position that is two tracks before the target track to a position that is one track before the target track. Values of the tracking error signal E30 at sample points 404 and 406 before and after the zero-cross point 402 that is one track before the target track are set to TES1 and TES2 and the beam velocity V is obtained from a difference (TES1−TES2) between them. The other construction is substantially the same as that in case of the MO cartridge medium in FIGS. 10A and 10B. As a track pitch TP in the CD medium, 1.6 μsec which is peculiar to the CD is used. In the MO cartridge medium, the track pitch TP is set to 1.1 μsec with respect to 540 MB and 640 MB, 1.4 μsec with respect to 230 MB, and 1.6 μsec with respect to 128 MB in a manner similar to the CD medium. Therefore, it is sufficient to set a scale of the track number according to the track pitch corresponding to the kind of medium and whether the medium is the MO cartridge medium or the CD medium in correspondence to the recognition result of the medium kind when the MO cartridge or CD is loaded. With respect to the values TES1 and TES2 of the tracking error signal which are used in the deceleration control, it will be obviously understood that a sensitivity correction is performed by multiplying those values by a correction value to normalize the tracking error signal obtained by the initializing process of the medium loading and the corrected values are used.

Correction of the eccentricity amount

Figure 14:
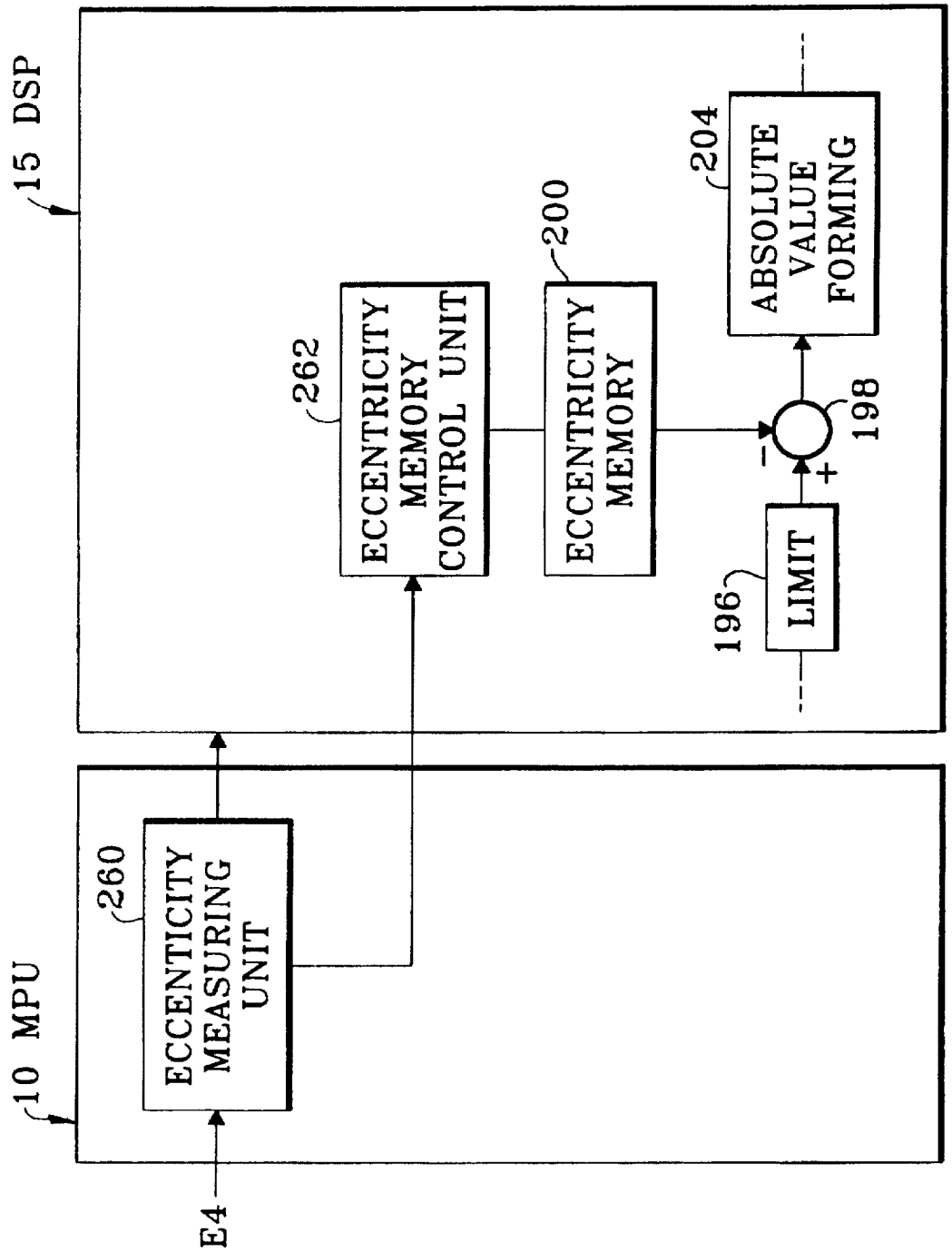
FIG. 14 is a functional block diagram of an eccentricity memory control of the invention.

FIG. 14 is a functional block diagram for measuring an eccentricity amount of the medium and performing an eccentricity correction on the basis of the measurement result in the initializing process after the optical disk medium provided for the optical disk drive in FIG. 1 was loaded. For the eccentricity correction, an eccentricity measuring unit 260 is first provided on the MPU 14 side. An eccentricity memory control unit 262 is provided on the DSP 15 side. An offset correction to correct an eccentricity amount is performed to the servo system of the VCM 64 by using the eccentricity memory 200 on the basis of the measurement result of eccentricity information by the eccentricity measuring unit 260 of the MPU 14. Specifically, the eccentricity offset amount formed on the basis of the eccentricity memory 200 is given to the adder 198 at the output stage of the limiter 196 in the servo system of the VCM 64 in FIG. 4. An eccentricity offset so as to set off the eccentricity amount is given to the current instruction value for the VCM 64 which is inputted to the adder 198.

Figure 15:
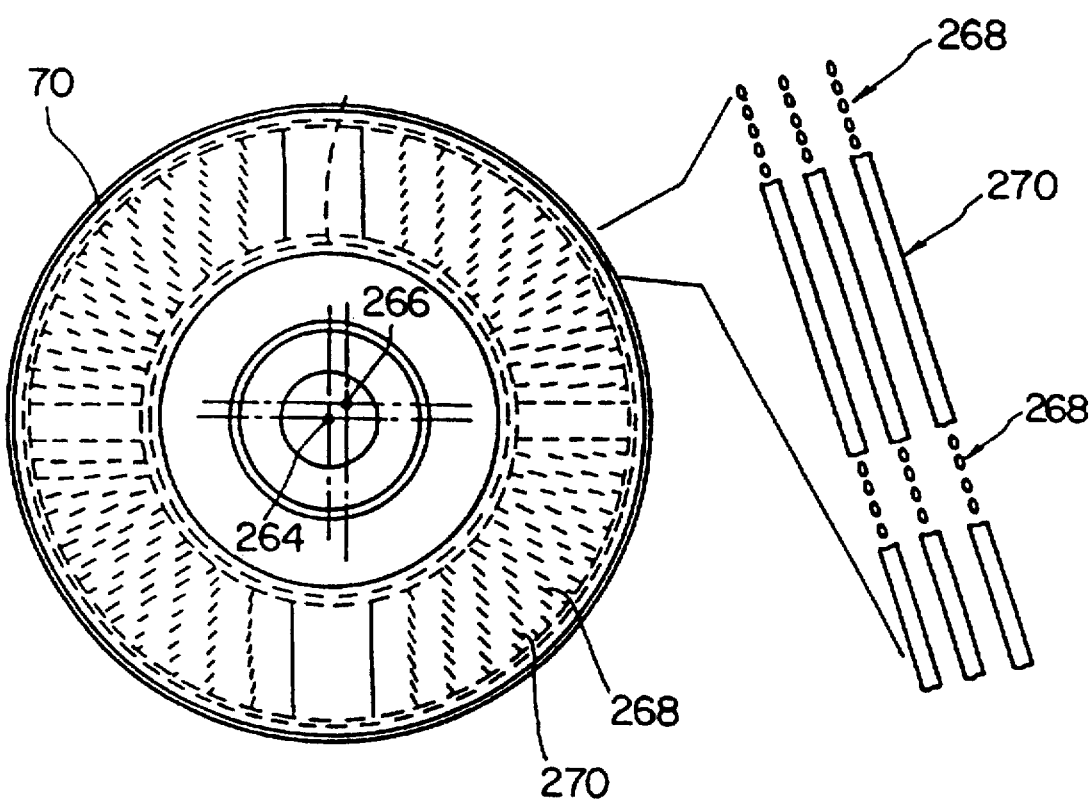
FIG. 15 is an explanatory diagram of an eccentricity in an MO medium.

First, a measuring process of the eccentricity measuring unit 260 provided for the MPU 14 will be described. FIG. 15 shows the MO cartridge medium 70 which is loaded to the optical disk drive of the invention. The MO cartridge medium 70 has a hub which is attached to a rotating shaft of a spindle motor at the center of the medium. A track center 266 formed on the medium surface for a rotation center 264 of the hub ordinarily has an eccentricity of about tens of µm. Therefore, when the MO cartridge medium 70 is loaded and attached to the rotation center 264 of the spindle motor, an eccentricity amount in which one rotation corresponding to the eccentricity amount between the rotation center 264 and the track center 266 is set to one cycle occurs on the track. A recording area of the disk surface of the MO cartridge medium 70 is divided into ten zones from an innermost zone 0 to an outermost zone 9 in the radial direction. Each zone is constructed by a repetition of an ID region 268 and an MO region 270. With respect to the tracks included in the zone, the numbers of sectors divided by the ID region 268 are equal. As shown in an enlarged diagram of three tracks shown on the right side, the ID region is a set of grooves or holes of a unit of information called a pit. A sector mark, a track number, a sector number, a CRC, and the like are written in the ID region. Therefore, by reproducing a signal in the ID region 268, the zone number, track number, sector number, and the like at which the beam is located can be detected. The MO region 270 provided subsequent to the ID region 268 is a region to record and reproduce data.

Figure 16:
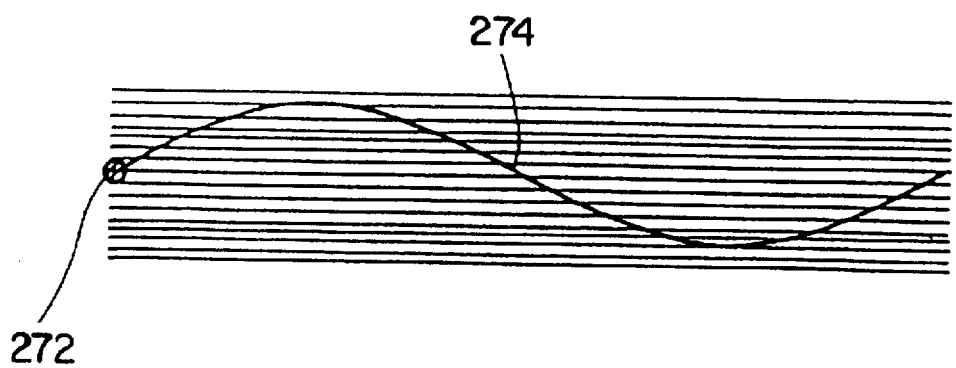
FIG. 16 is an explanatory diagram of a beam locus which traverses the tracks in accordance with a medium eccentricity.

FIG. 16 shows a beam locus 274 for one rotation of the medium when a beam spot 272 is fixed at an arbitrary track position in a state in which the carriage and the lens actuator are stopped. To simplify the explanation, actually, the eccentric medium surface side is fixed and a motion of the beam spot 272 is relatively expressed as a beam locus 274. As shown in FIG. 15, in the MO cartridge medium 70, since an eccentricity of about tens of µm exists between the mechanical rotation center 264 and track center 264, when the beam spot 272 is fixed and the medium is rotated, the beam locus 274 causes a change in position such that one rotation is set to one cycle due to an amplitude of two times as large as the offset. To measure an eccentricity amount in such an optical disk medium, in the eccentricity measuring unit 260 in FIG. 6, only a focusing servo is turned on in a state in which the VCM 64 and lens actuator 60 are stopped, the number of zero-cross points is counted per rotation with respect to the tracking error signal as shown in FIG. 17A. In this instance, as shown in FIG. 17B, a rotation detection signal E4 which changes by using an index on the optical disk medium as a reference position, namely, a start position 275 of one rotation is used. Namely, the rotation detection signal E4 rises at time t1 and from a state in which the start position of one rotation is recognized, the number of zero-cross points of the tracking error signal E2 is counted. The number of zero-cross points until the rotation detection signal E4 again rises at time t6 is also counted. If the number (N) of zero-cross points for one rotating period Trot can be counted as mentioned above, assuming that the track pitch is set to TP, an eccentricity amplitude Eamp can be calculated by $$Eamp=(N/2)TP$$

On the other hand, as for a phase of the eccentricity amount having a profile as a sine wave in which one rotation is set to one cycle as shown in FIG. 16 for the one-rotation start position 275, the maximum time Tmax of the zero-cross interval of the tracking error signal E2 is obtained by setting the one-rotation start position 275 of the rotation detection signal E1 to a reference and a time TΦ until a middle point of Tmax is set to an eccentricity phase. Namely, in FIG. 17A, since the zero-cross time interval between time t3 and time t5 is set to the maximum time Tmax, the time TΦ until the intermediate time t4 is determined as a phase amount from the rotation start position 275 of the rotation detection signal E4 to the origin position where the eccentricity amount having the profile of the sine wave is equal to 0.

As shown in FIGS. 17A to 17C, when the eccentricity amplitude Eamp and phase TΦ can be measured on the basis of the zero-cross points of the tracking error signal E2, the measurement result is set into the eccentricity memory control unit 262 of the DSP 15 in FIG. 14. The sine value corresponding to each rotating position is read out from the eccentricity memory 200 synchronously with the rotation of the medium and is multiplied by the eccentricity amplitude Eamp, thereby obtaining the eccentricity amount. While performing the offset correction by the eccentricity amount, the number of zero-cross points per rotation of the tracking error signal E2 is again measured.

In FIGS. 18A to 18C, the tracking error signal E2 at the time of the eccentricity correction when the phase TΦ obtained by the measurement in FIGS. 17A to 17C coincides with the actual eccentricity phase is shown together with the rotation detection signal E4 and an offset current I3 for eccentricity correction which is supplied to the VCM 64. When the eccentricity phase TΦ measured is correct, by supplying the eccentricity correction current I3 to the VCM 64, the eccentricity of the beam to the track is corrected. In this instance, the number of zero-cross points of the tracking error signal E2 which are obtained per rotating period Trot is remarkably reduced to, for example, 6 times in this case. Since the number of zero-cross points corresponds to the remaining eccentricity amplitude after the eccentricity correction, it is possible to confirm that the correction is performed on the basis of the proper eccentricity measurement result. On the other hand, when the phase TΦ measured in FIGS. 17A to 17C is deviated from the actual phase by 180°, even if the eccentricity correction is performed on the basis of the measurement result, this contrarily results in an increase in eccentricity amount. In such a case, as shown in FIGS. 19A to 19C, the number of zero-cross points of the tracking error signal E2 which are obtained by one rotating period Trot of the rotation detection signal E4 extremely increases. When the number of zero-cross points increases for the measured value as mentioned above, since the measured phase TΦ is deviated by 180°, it is corrected to a phase (TΦ+Trot/2) by adding the half (Trot/2) of one rotating time Trot to the measured phase TΦ. If the phase can be corrected to the correct phase as mentioned above, the optimum eccentricity correction state in which the number of zero-cross points of one rotating period Trot was remarkably reduced as compared with that at the time of the first measurement can be obtained as shown in FIG. 18A by the eccentricity correction by the corrected phase.

FIG. 20 is a generic flowchart for the eccentricity measuring process by the eccentricity measuring unit 260 provided for the MPU 14 in FIG. 14. In the optical disk apparatus of the invention, at the time of the initializing process in which the MO cartridge or CD is loaded, subsequent to the first measuring process shown in step S1, the second measuring process is executed in step S2.

As contents of the measuring processes in steps S1 and S2, as shown in FIG. 19, the eccentricity amplitude Eamp and phase TΦ are measured from the zero-cross points of the tracking error signal. Subsequently, the eccentricity correction is performed by using the measurement result. If the number of zero-cross points increases, the process to correct the phase to the opposite phase is performed. Further, the number of zero-cross points per rotation when the eccentricity correction is executed every measuring process is held. When the second measuring process is finished in step S2, step S3 follows. The absolute value of the difference between the numbers of zero-cross points per rotation of the eccentricity correction based on the measurement results in the first and second measuring processes, namely, in the previous and present measuring processes is obtained. When the absolute value of the difference lies within a predetermined threshold value TH, for example, an allowable eccentricity correction amount, specifically speaking, when it is equal to or less than TH=10, it is regarded that the measurement result is correct. For example, the measurement result in which the number of zero-cross points after the correction is smaller between the measurement results of the first and second measuring processes is used for the eccentricity correction. On the other hand, when the absolute value of the difference between the previous and present measuring processes exceeds the predetermined threshold value TH, the processing routine is again returned to step S2 and the measuring process is again performed. In this case, the measuring process is the third time. In step S3, a check is made to see if the absolute value of the difference between the previous time and the present time, namely, between the second time and the third time is equal to or less than the threshold value TH. In this instance, if the abnormal eccentricity measurement was performed due to a vibration or the like in the first measuring process, the absolute value of the difference between the measurement results in the previous and present measuring processes at the time of the third measurement is equal to or less than the threshold value TH by the comparison, so that the correct measurement result can be used for the eccentricity correction. Therefore, even if a vibration, noises, or the like is added and the erroneous measuring process is executed at the stage of the eccentricity measurement in the initializing process after the optical disk medium was loaded, by repeating the measuring process until the absolute value of the difference between the previous and present measurement results lies within the predetermined threshold value, the use of the measurement result of the wrong eccentricity amount can be automatically eliminated.

Figure 21A:
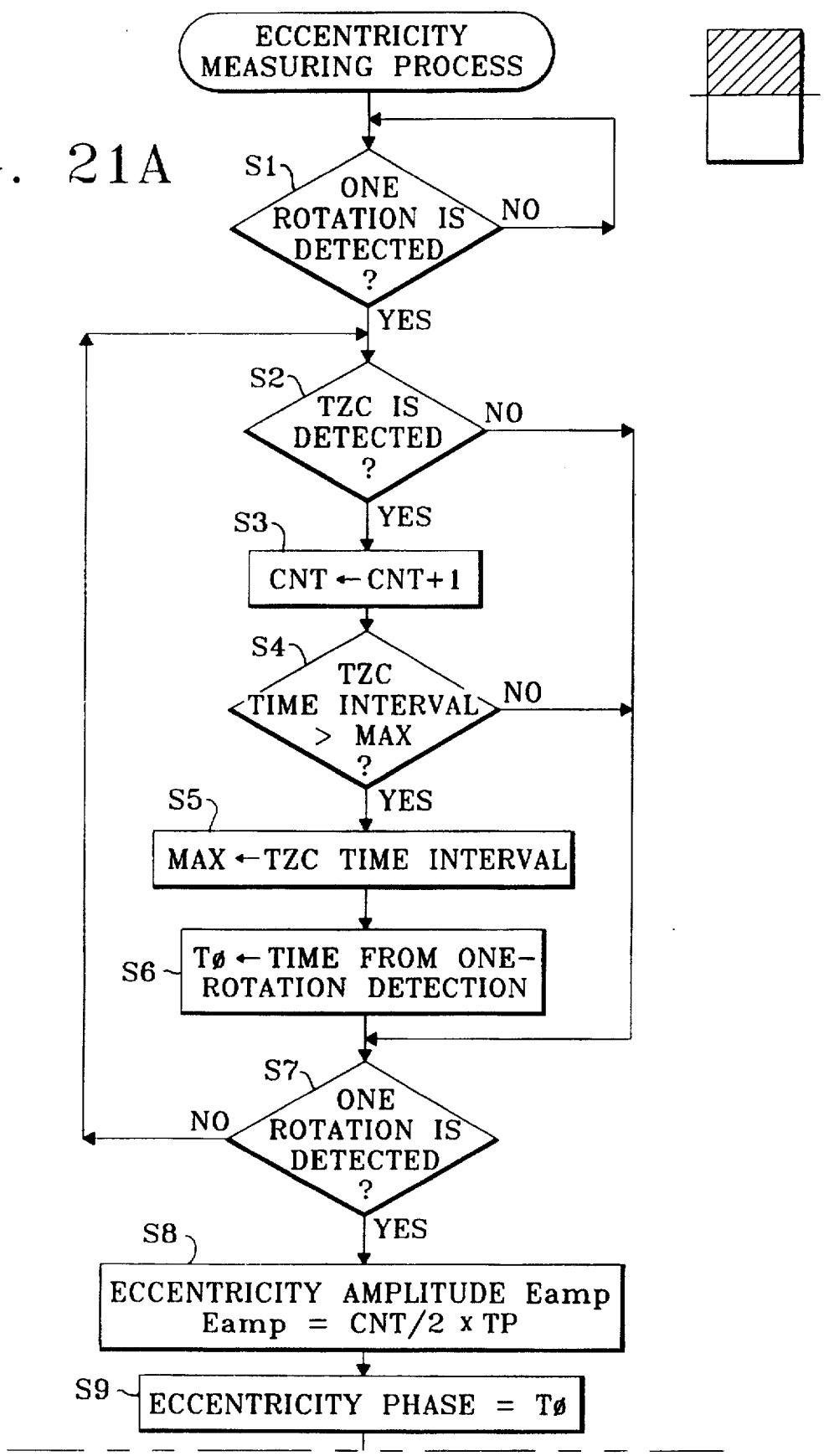
FIG. 21 is a detailed flowchart for the eccentricity measuring process of FIG. 20.
Figure 21B:
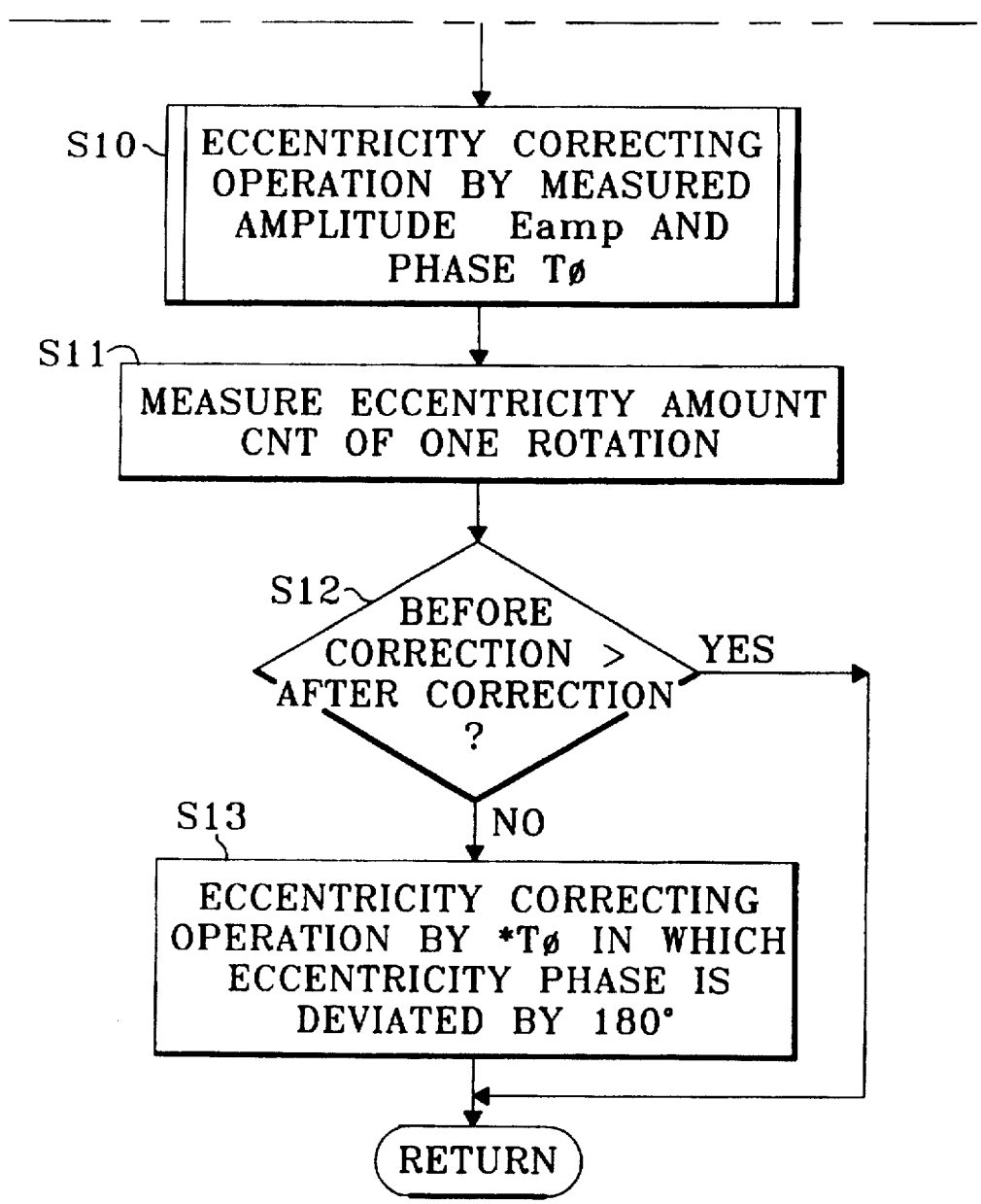

FIG. 21 is a flowchart for the eccentricity measuring process which is executed in each step S1 or S2 in FIG. 20. First in step S1, one rotation in which the rotation detection signal rises is detected, namely, the presence or absence of the rotation start position is detected. When one rotation is detected, step S2 follows and the zero-cross point of the tracking error signal is detected. When the zero-cross point is obtained, a count value of a counter CNT is increased by 1 in step S3. In step S4, a check is made to see if the zero-cross time interval is larger than a maximum value MAX so far. When it is larger than the maximum value MAX so far, the TZC time interval obtained newly is set to the maximum value MAX in step S5. With respect to the TZC time interval as a maximum value MAX, the time from the detection of one rotation is inserted into the phase TΦ in step S6. The above processes are repeated until the next one rotation is detected in step S7. When the phase TΦ is obtained from the count values of the counter CNT corresponding to one rotation and the maximum value of the TZC time interval among them by the detection of one rotation in step S7, the eccentricity amplitude Eamp is calculated in step S8. The eccentricity phase TΦ is obtained in step S9. In step S10, the eccentricity correcting operation is executed on the basis of the measured eccentricity amplitude Eamp and phase TΦ. In step S1, while performing the eccentricity correcting operation, the number of zero-cross points by the eccentricity amount corresponding to one rotation, is measured by the counter CNT. In step S12, the values of the counter CNT before and after the measurement are compared with the value at the zero-cross point. If the value after the correction is reduced as compared with the value at the zero-cross point, the measurement result is determined to be correct and the processing routine is finished. If the value after the correction is increased, the eccentricity phase TΦ is corrected to *TΦ which is deviated by 180° in step S13 and the eccentricity correcting operation is executed.

Figure 22:
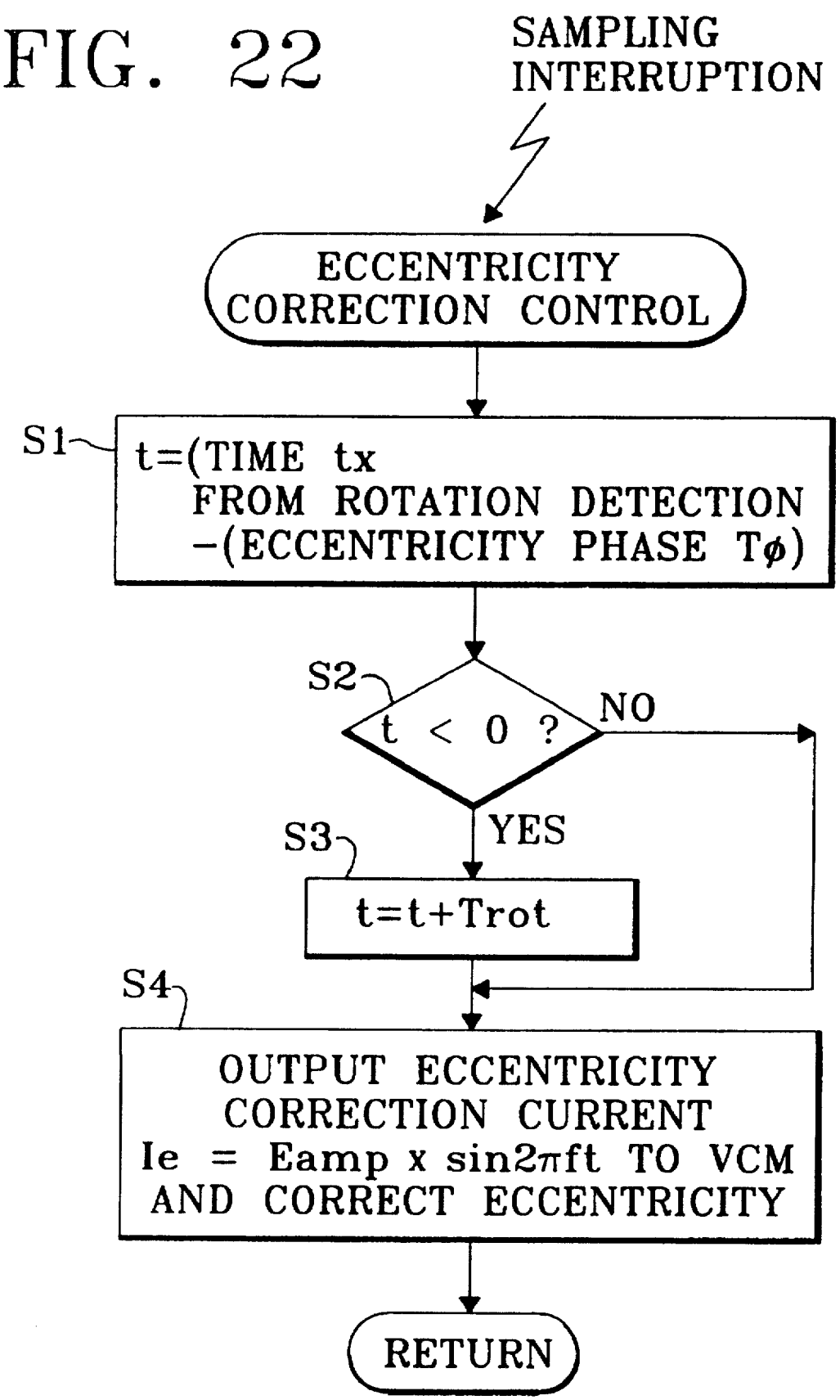
FIG. 22 is a flowchart for an eccentricity correction control based on the eccentricity measurement result.

FIG. 22 is a flowchart for the eccentricity correcting operation by the measured eccentricity amplitude Eamp and phase TΦ in step S10 in FIG. 21. The eccentricity correction control operates every interruption of a predetermined sampling clock. When there is a sampling interruption, the measured eccentricity phase TΦ is subtracted from a time tx from the detection of the rotation in step S1. When a calculation value t is smaller than 0 and is a minus value, step S3 follows and it is corrected by adding one rotating time Trot. The reasons are as shown in time charts of FIGS. 23A to 23C.

FIG. 23A shows a sampling clock. FIG. 23B shows the rotation detection signal E4. Now assuming that the eccentricity correction control of FIG. 22 is executed at a timing of the sampling clock at time t1 subsequent to the leading edge of the rotation detection signal E4, the time t which is calculated in step S1 in this instance is t=t1−TΦ and has a minus value. Therefore, the processing routine advances from step S2 to S3 and the time t is corrected by adding one rotating period Trot of the rotation detection signal E4. Thus, the correction value is equal to (t1+Trot). As an address in the eccentricity memory 200, a position having a delay of the phase TΦ for the rotation start position serving as a leading edge of the rotation detection signal E4 is set to a 0 point and a value of sin 2πft is stored. Therefore, the value (t=t1+Trot) calculated in step S3 is equal to a value at a point 282 in the eccentricity memory 200 in FIG. 23C. Now, assuming that the eccentricity memory 200 also exists on the phase TΦ side, the value at the point 282 is a sine value that is the same as the value at the rotating position corresponding to time t1 serving as a point 282. Therefore, until the elapsed time tx from the rotation start position exceeds the phase TΦ, the reading operation of the eccentricity memory 200 by the correction in step S3 is executed. In step S4, since the time t obtained in step S3 or S1 is used as an address and the value of sin 2πf is read out from the eccentricity memory 200, by multiplying the measured eccentricity amplitude Eamp to the read value, a correction current Ie to correct the eccentricity amount is obtained and added to a drive current to the VCM 64, so that the eccentricity correction can be performed.

Sine data sin θ of every 32 samples by the sampling clock to decide an operation timing of the DSP 15 is stored in the eccentricity memory 200 in FIG. 14. Therefore, in case of a rotational speed 3600 rpm of the MO cartridge medium, the number of sine data corresponding to one rotation to be stored into the eccentricity memory 200 is equal to 36. The sine data of every 10° is stored in the table. Data between the sine data registered in the eccentricity memory 200 is obtained by an approximation calculation by a linear interpolation and outputted. When the CD is loaded, the medium rotational speed of the optical disk drive is changed to 2400 rpm corresponding to the CD. When the rotational speed of the medium changes as mentioned above, since the reading period of the eccentricity memory 200 is constant to be 32 samples, the number of data which is stored into the eccentricity memory 200 changes. In case of 2400 rpm, the number of data of the sine value necessary for the eccentricity correction of one rotation is equal to 54 and the sine data of every about 6.7° is necessary. Therefore, when the change in rotational speed is recognized from the loaded medium, the eccentricity memory 200 is updated so as to store the sine data adapted to the changed rotational speed.

Envelope servo

Figure 24:
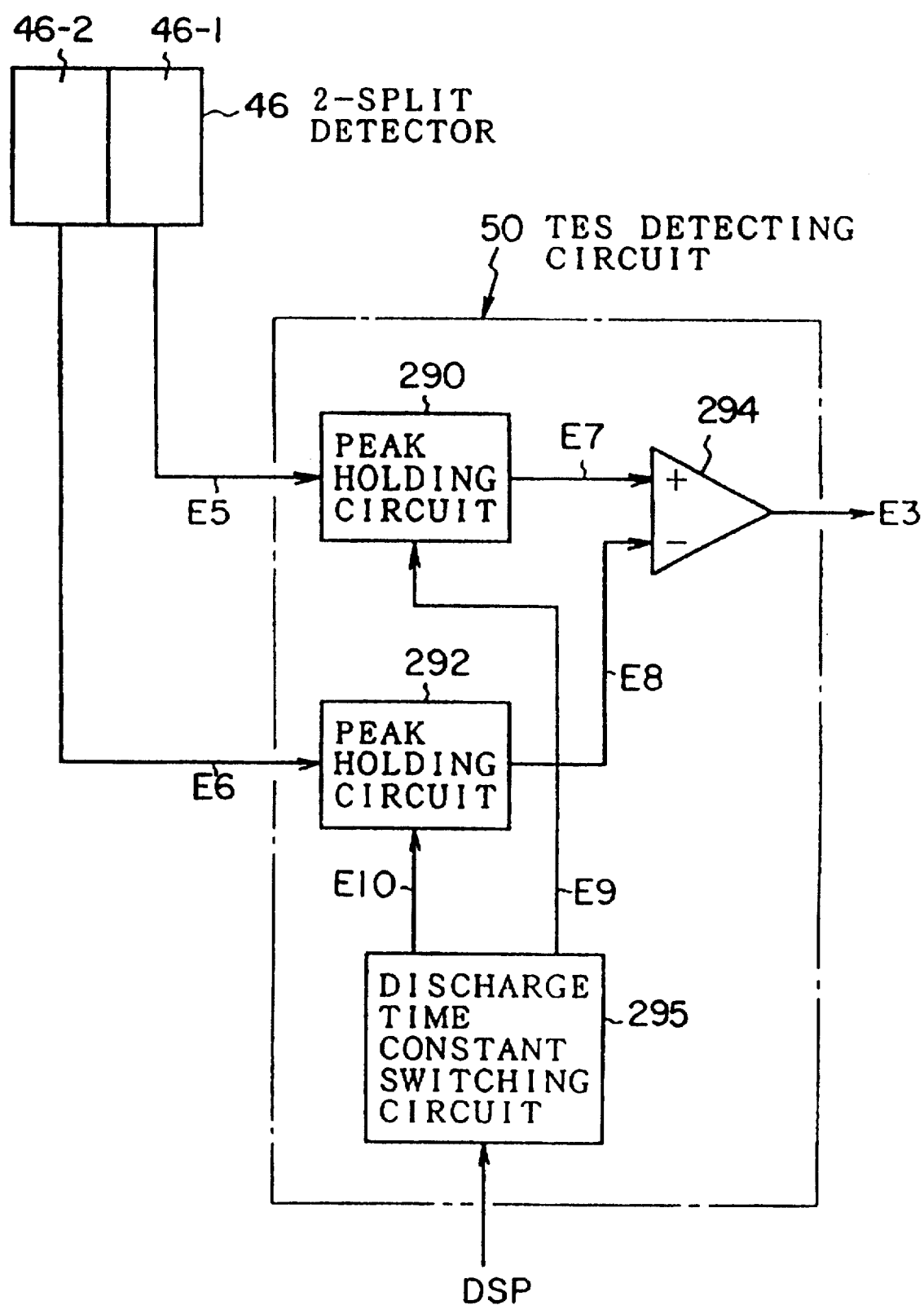
FIG. 24 is a block diagram of a TES detecting circuit in FIG. 1 which is used for an envelope servo.

FIG. 24 is a circuit block diagram of the TES detecting circuit 50 provided for the controller 10 of the optical disk drive in FIG. 1. Photosensitive signals E5 and E6 are inputted to the TES detecting circuit 50 from photosensing units 46-1 and 46-2 of the 2-split detector 46 provided on the optical unit side. The TES detecting circuit 50 is constructed by peak holding circuits 290 and 292, a subtracter 294, and an envelope detection switching circuit 295. The peak holding circuits 290 and 292 have a circuit construction representatively shown in the peak holding circuit 290 in FIG. 25. Subsequent to an input terminal, a capacitor C1 for peak holding is connected in the peak holding circuit 290 of FIG. 25 through a resistor R1 and a diode D. A resistor R2 for discharging is connected in parallel with the capacitor C1. A resistor R3 for discharging is further connected through an analog switch 296. The analog switch 296 is on/off controlled by a switching signal E9 from an envelope detection switching circuit 295 in FIG. 24. In case of setting an ON state of an envelope servo, namely, executing an envelope detection, the analog switch 296 is turned off as shown in the diagram. In this instance, a discharge time constant of the capacitor C1 is determined by the resistor R2. The discharge time constant which is decided by the values of C1 and R2 is set to a time constant such that the envelope detection which suppresses a drop of the tracking error signal due to the return light of the ID portion of the MO cartridge medium of 540 MB or 640 MB can be performed. To turn off the envelope detection, the analog switch 296 is turned on. When the analog switch 296 is turned on, in addition to the discharge resistor R2, the discharge resistor R3 is further connected in parallel with the capacitor C1. Therefore, the discharge resistance decreases to a parallel resistance value of the resistors R2 and R3, so that the envelope detection is set to an almost OFF state. It will be obviously understood that when the user wants to perfectly turn off the envelope detection, the capacitor C1 itself can be also disconnected by the analog switch 296.

In the envelope detection switching circuit 295 in FIG. 24, the envelope detection of the peak holding circuits 290 and 292 is on/off controlled by a switching control signal from the DSP 15 in FIG. 1. The on/off operations of the envelope detection are executed in the following three methods.

I. When the MO cartridge medium of 128 MB having the mirror portion is loaded, the envelope detection is turned off.

II. In a loading state of the MO cartridge medium of 230 MB, when an access command in which the non-user region having the mirror portion out of the user region, namely, what is called a processing area is set to a target track is received, the envelope detection is turned off.

III. In the seek control of the MO cartridge media of 540 MB and 640 MB, when the high speed seek exceeding a predetermined value is detected, the envelope detection is turned off. The turn-off of the envelope detection at the time of the high speed seek is also similarly performed with respect to the user region of the MO cartridge of 230 MB.

Figure 25:
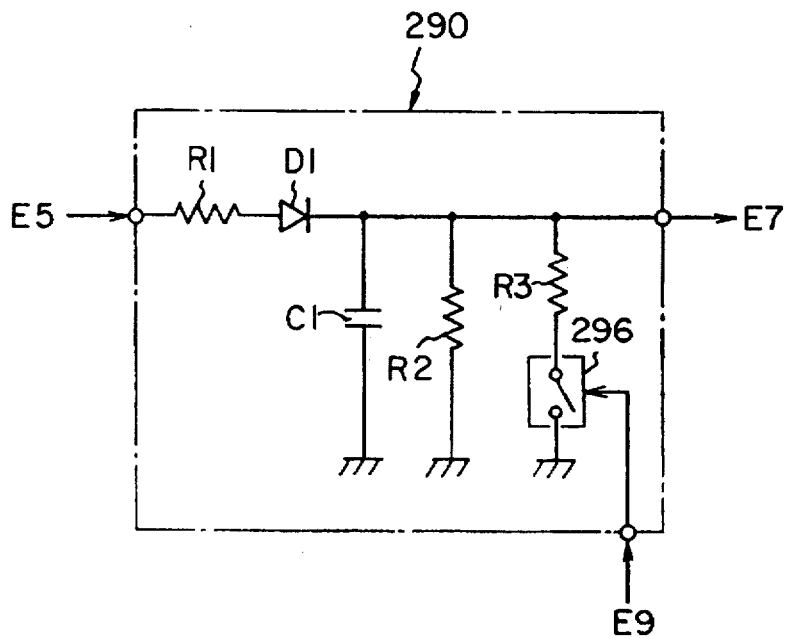
FIG. 25 is a circuit diagram of a peak holding circuit in FIG. 24.

As a predetermined velocity to judge the high speed seek, it is sufficient to execute the high speed seek of a track zero-cross interval that is shorter than the time which is required until the tracking error signal decreases from the peak level to the 0 level which is determined by the capacitor C1 and resistor R2 in FIG. 25 and which is based on the discharge time constant when the envelope detection is turned on.

Figure 26:
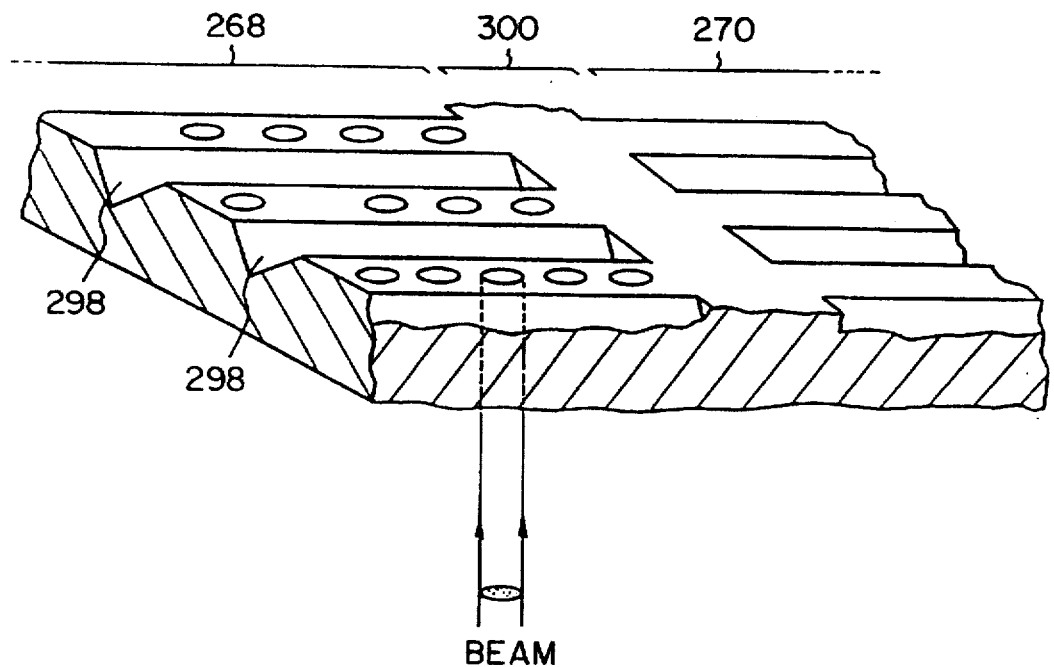
FIG. 26 is an explanatory diagram of a medium mirror portion.
Figure 27A:
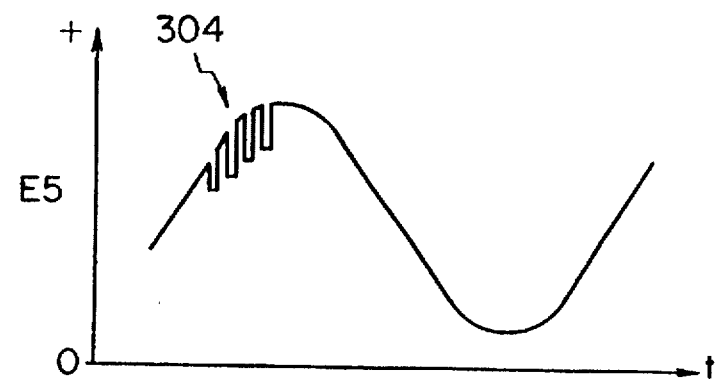
Figure 27B:
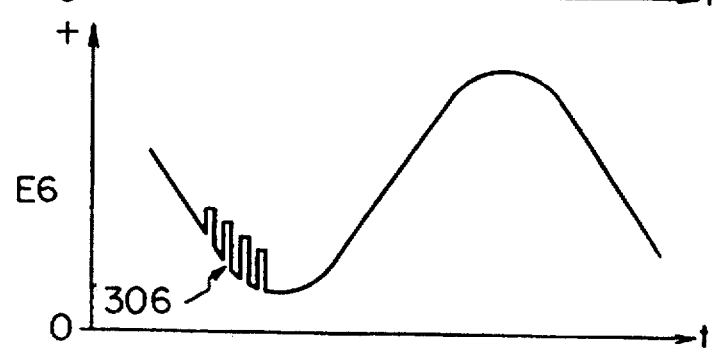
Figure 27C:
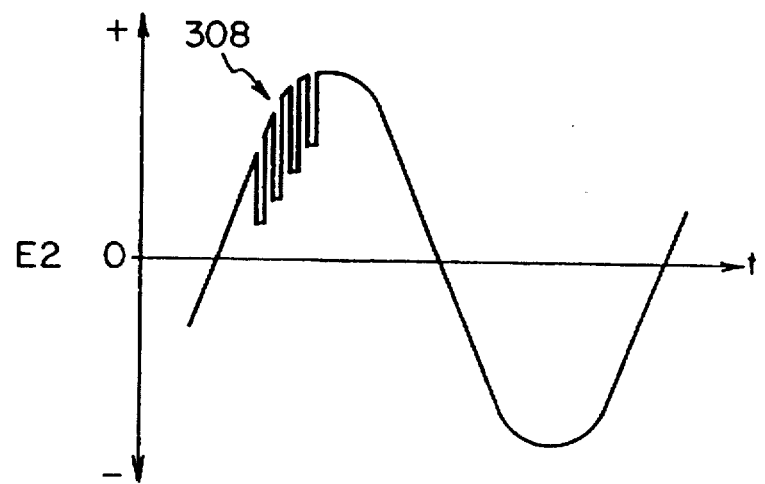
Figure 27D:
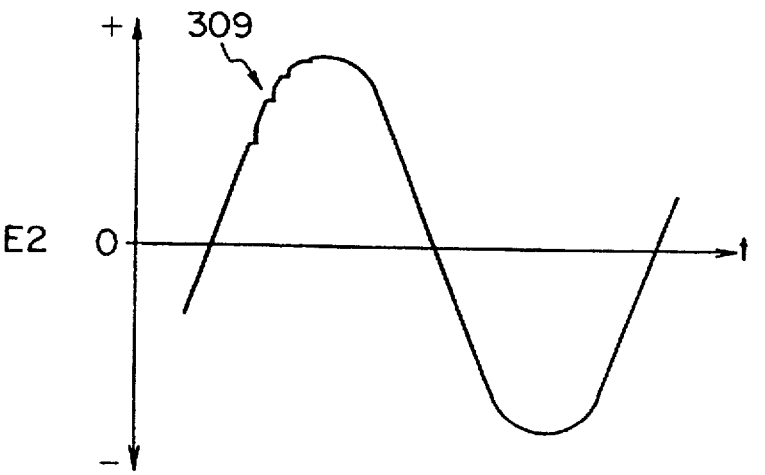

FIG. 26 is an explanatory diagram of the medium surface having a mirror portion. With respect to the ID portion 268 and MO portion 270, a groove 298 is formed every track. With respect to the ID portion 268, a pit 302 comprising an emboss is formed in a region sandwiched by the grooves 298. However, a mirror portion 300 having a flat mirror surface exists between them. In such a medium track, an influence on the tracking error signal by the return light of the beam from the ID portion is as shown in FIGS. 27A to 27D. FIG. 27A shows the photosensitive signal E5 of the 2-split detector 46. FIG. 27B shows the photosensitive signal E6 of the 2-split detector 46. A drop of an amplitude of each of the photosensitive signals E5 and E6 according to concave and convex portions of the pit 302 in the ID portion 268 occurs. FIG. 27C shows the tracking error signal E2 which is obtained by subtracting the photosensitive signal E6 from the photosensitive signal E5. A drop to which the drop of the ID portion in the photosensitive signals was added occurs in the amplitude component. When such an amplitude drop 308 occurs, for example, in the portion of the low amplitude of the tracking error signal E2, a track zero-cross occurs and the track counting operation is erroneously performed. Therefore, by turning on the envelope detection by the peak holding circuits 290 and 292 in FIG. 24, a fluctuation which is caused by the return light from the ID portion can be suppressed to a smooth amplitude fluctuation 310 by the envelope detection as shown in FIG. 29D.

Figure 28A:
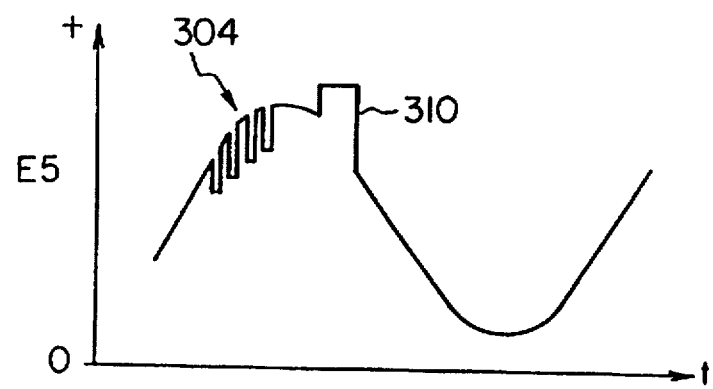
FIGS. 28A to 28C are signal waveform diagrams of the photosensitive signal and TES signal by the mirror portion of FIG. 26 when the envelope servo is turned off.
Figure 28B:
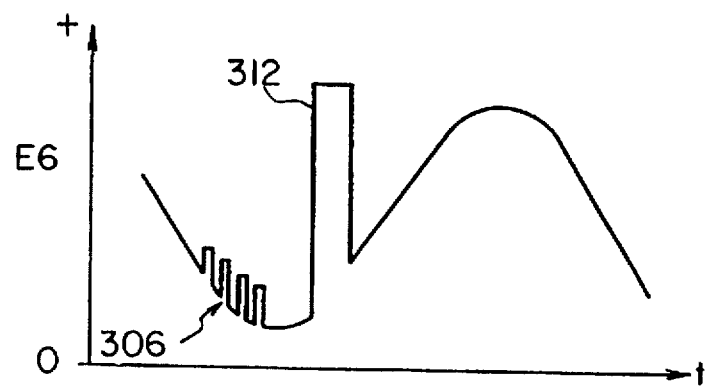
Figure 28C:
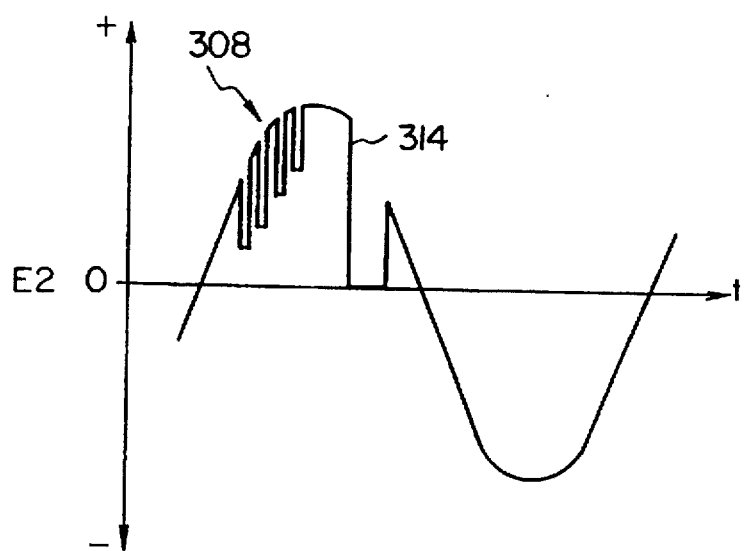
Figure 29A:
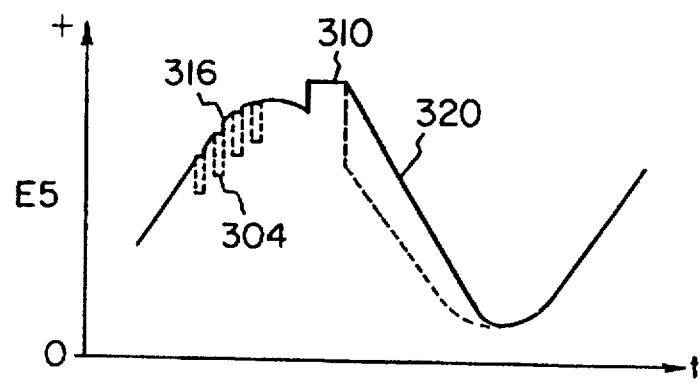
Figure 29B:
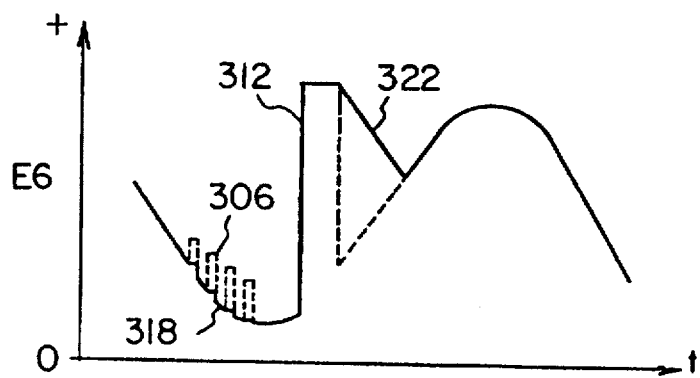
Figure 29C:
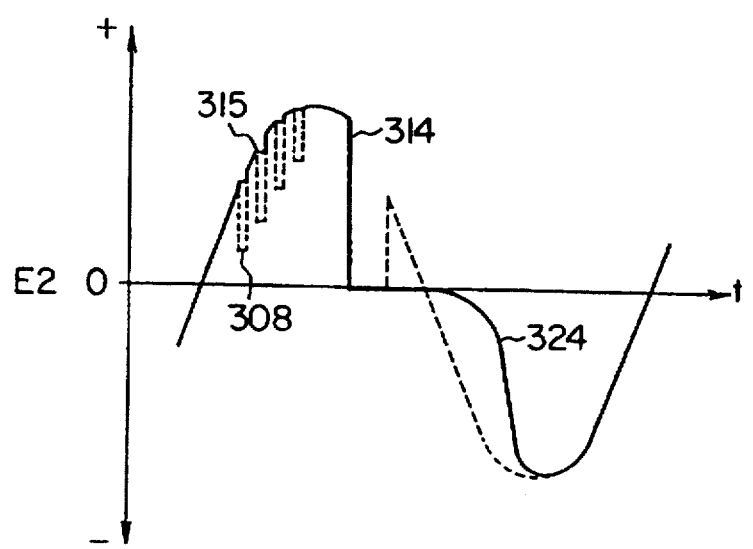

FIGS. 28A to 28C show the photosensitive signals E5 and E6 due to the return light from the mirror portion 300 in FIG. 26 and the tracking error signal E2 and relate to the OFF state of the envelope detection. Since the return light from the mirror portion 300 becomes a signal of the same level and same polarity with respect to the photosensitive signals E5 and E6, the tracking error signal E2 causes a signal dropout corresponding to the mirror portion from the difference between the photosensitive signals E5 and E6 as shown in a drop portion 314. FIGS. 29A to 29C show a signal profile in the case where the envelope detection is further turned on with regard to the detection of the tracking error signal of the medium having the mirror portion in FIGS. 28A to 28C. When the envelope detection is turned on, drops 304 and 306 corresponding to the ID portion of the photosensitive signals E5 and E6 are suppressed as shown by amplitude fluctuations 316 and 318. The amplitude drop 308 in the tracking error signal E2 is also suppressed as shown in the amplitude fluctuation 310. However, with respect to the reflection components 315 and 312 from the mirror portion subsequent to the ID portion, after the reflection components rose, the envelope detection is turned on. Therefore, the amplitude components slowly decrease like waveforms 320 and 322 in accordance with the discharge time constant for envelope detection, so that a signal amplitude 324 of the tracking error signal subsequent to the mirror portion is largely deformed as shown in the tracking error signal E2. To avoid such a distortion of the tracking error signal E2 shown in FIGS. 29A to 29C due to the return light of the mirror portion when the envelope detection is turned on, it is desirable to turn off the envelope detection and to use the tracking error signal E2 as shown in FIGS. 28A to 28C.

FIGS. 30A to 30C show a trailing waveform 330 at the time of turn-on of the envelope detection and a trailing waveform 332 at the time of turn-off thereof when a rectangular wave pulse 326 is inputted to the peak holding circuit 290 in FIG. 25. When the envelope detection is ON, since the trailing waveform 330 after the peak detection trails by a gentle time constant as shown in an output of FIG. 30B, a smooth tracking error signal due to the envelope detection in which the drop or the like of the ID portion is suppressed can be formed. With respect to the medium having the mirror portion, on the other hand, by turning off the envelope detection, the waveform suddenly trails (332) as shown in FIG. 30C, so that the photosensitive component due to the return light of the mirror portion slowly trails, thereby making it possible to prevent a large distortion of the tracking error signal.

FIGS. 31A and 31B show the tracking error signal at the time of the high speed seek with respect to the on/off operations of the envelope detection. FIG. 31A shows the tracking error signal in the high speed seek mode when the envelope detection is turned off. Upper and lower peak amplitudes of the tracking error signal and the zero-cross points between them are accurately reconstructed. On the other hand, when the envelope detection is turned on, the signal shows the gentle trailing waveform 330 as shown in FIG. 31B, so that the zero-cross interval becomes short. In the high speed seek mode, as shown in FIG. 31B, only the amplitude components of the upper and lower peaks are detected and the function as a tracking error signal is completely lost. In the invention, in the high speed seek mode, in order to avoid a loss of tracking error signal as shown in FIG. 31B, the envelope detection is turned off, thereby enabling the tracking error signal to be accurately formed even in the high speed seek as shown in FIG. 31A.

Figure 32:
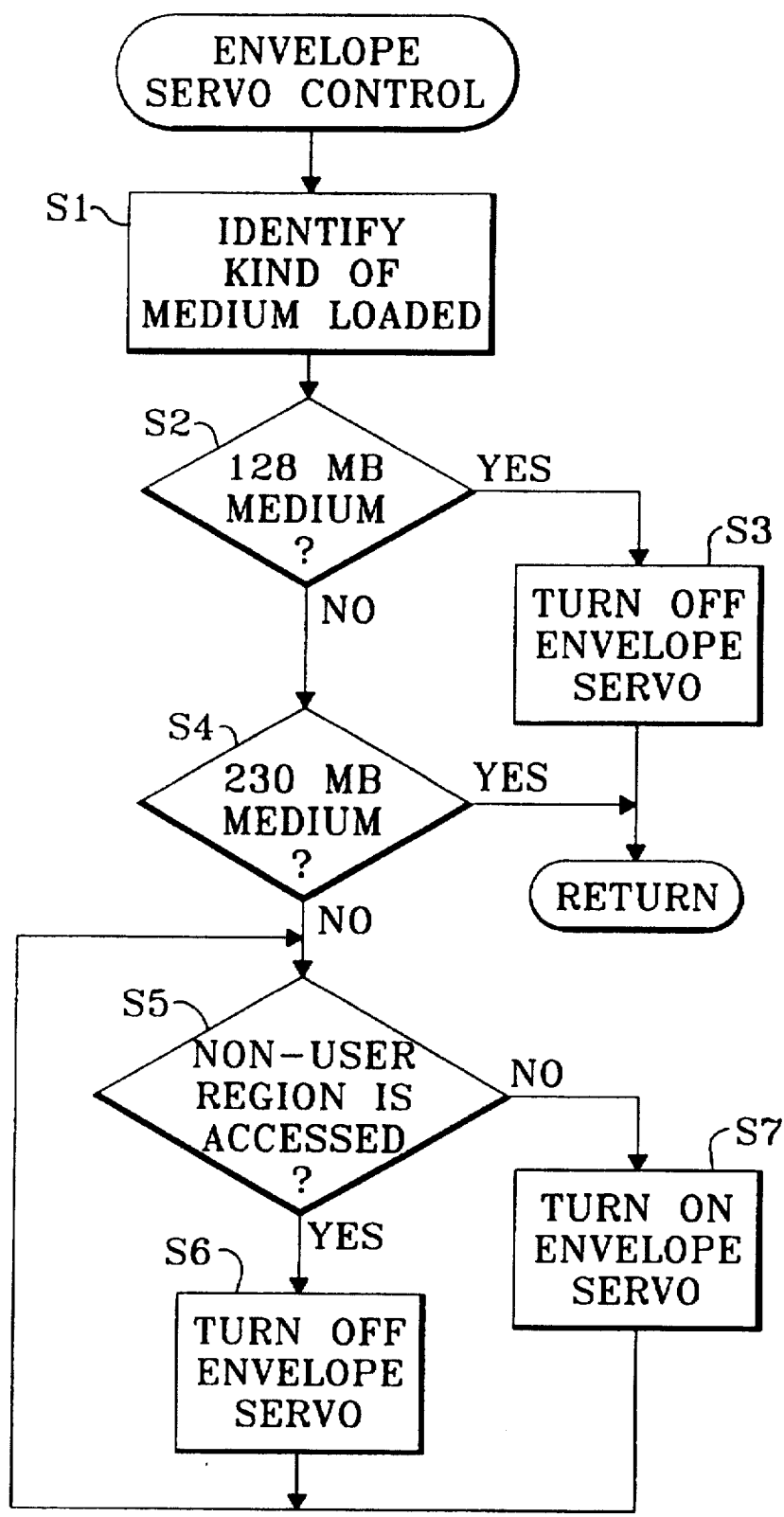
FIG. 32 is a flowchart for the ON/OFF control of the envelope servo according to the invention when a medium is loaded.

FIG. 32 is a flowchart for the envelope servo control process in FIG. 24. First in step S1, when the medium is loaded, the kind of loaded medium is recognized. When it is recognized in step S2 that the loaded medium is an MO cartridge medium of 128 MB, step S3 follows and the envelope servo is turned off. When it is recognized in step S4 that the loaded medium is an MO cartridge medium of 230 MB, a check is made in step S5 to see if a non-user region is accessed. When the access in which the non-user region is set to the target track is received from an upper apparatus, step S6 follows and the envelope servo is turned off. When there is no access of the non-user region, the envelope servo is turned on in step S7.

FIG. 33 shows the on/off control of the envelope servo at the time of the seek control which is executed in the ON state of the envelope servo. In the seek control, in step S1, a check is made to see if the seek velocity which is obtained from the zero-cross time interval of the tracking error signal is equal to or higher than the predetermined threshold velocity Vth or not. When the seek velocity is equal to or higher than the threshold velocity Vth, it is judged that the seek mode is the high speed seek. The envelope servo is turned off in step S2. When the seek velocity is less than the threshold value Vth, the ON state of the envelope servo is maintained in step S3. The above processes are repeated until the end of the seek is discriminated in step S4. When the seek velocity is equal to or less than Vth during the seek, the envelope servo is turned on at that time point in step S3.

Focusing servo

Figure 34:
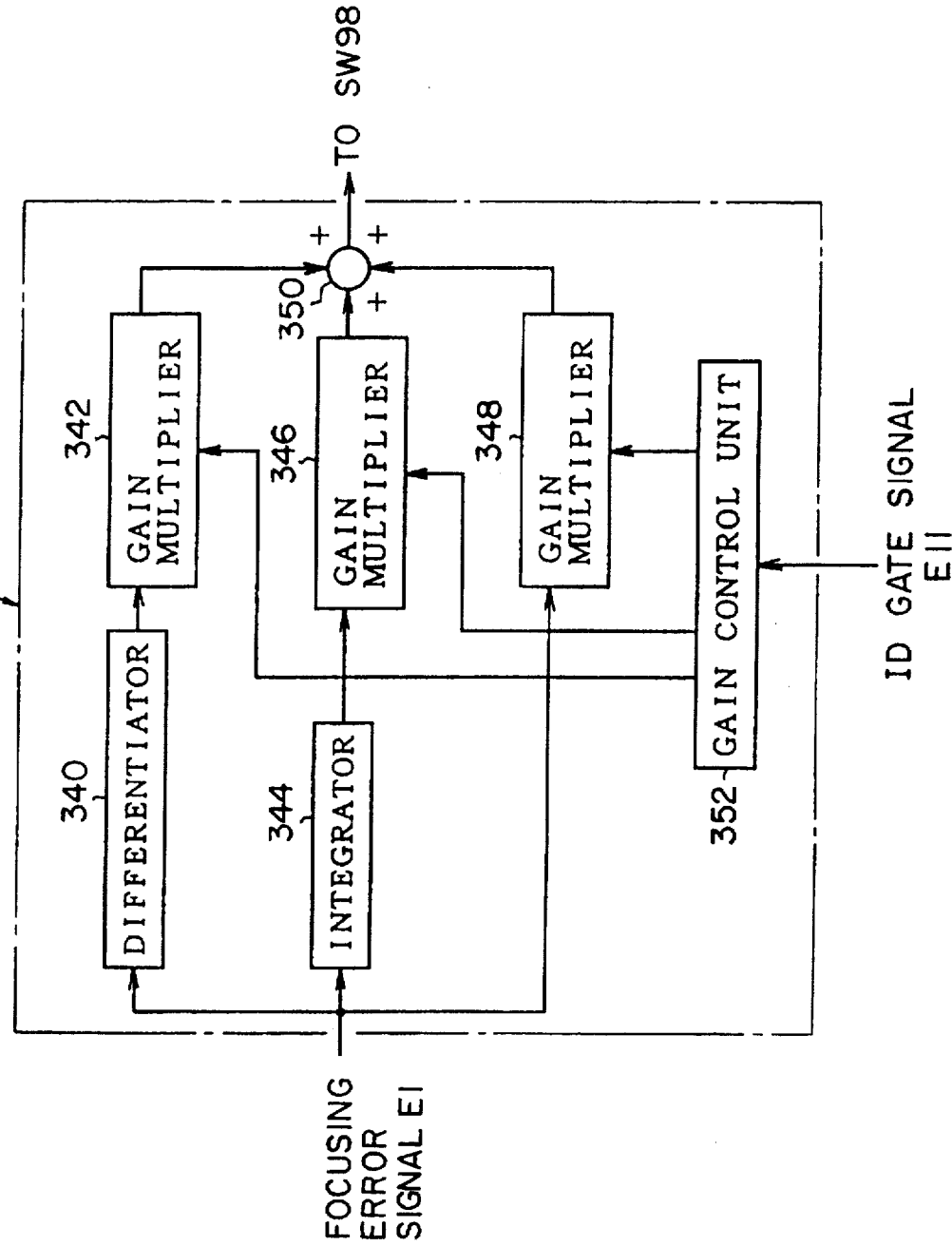
FIG. 34 is a functional block diagram of a PID arithmetic operating unit for focusing in FIG. 4 for preventing an erroneous operation in an ID portion.

FIG. 34 shows a functional block of the PID arithmetic operating unit 96 provided in the focusing servo for the focusing actuator 56 that is realized by the DSP 15 in FIG. 4. The PID arithmetic operating unit 96 comprises: a differential operating unit having a differentiator 340 and a gain multiplier 342; an integral operating unit having an integrator 344 and a gain multiplier 346; and further a proportional operating unit using a gain multiplier 348. The focusing error signal E1 formed on the basis of the photosensitive outputs of the return light of the medium by the FES detecting circuit 48 in FIG. 1 is inputted to each of the differentiator 340, integrator 344, and gain multiplier 348. Outputs of the gain multipliers 342, 346, and 348 are multiplied by an adder 350 and a current is finally supplied as a focusing servo signal by the PID arithmetic operation to the focusing actuator 56 by the D/A converter 108 through the servo switch 98. A response focusing is executed so as to set the focusing error signal E1 to 0. In the invention, a gain control unit 352 is newly provided for the PID arithmetic operating unit 96 of the focusing servo as mentioned above. An ID gate signal E11 is inputted to the gain control unit 352 from the formatter 18 shown in FIG. 1. When the ID gate signal E11 from the formatter 18 is set to be enable, the gain control unit 352 switches a gain of the gain multiplier 342 provided subsequent to the differentiator 340 to 0. Thus, a differentiation component which is outputted from the gain multiplier 342 is set to 0 for a period of time during which the gate signal E11 is enable. The PID arithmetic operating unit 96 operates as a PID operating unit.

FIGS. 35A to 35D show the operation in the case where the gain of the gain multiplier 342 of the differentiator 340 is not set to 0 synchronously with the ID gate signal E11 by the gain control unit 352. In correspondence to the ID portion of the track of FIG. 35A, the focusing error signal E1 fluctuates as shown in FIG. 35B. In this instance, when the PID arithmetic operating function of the PID operating unit 96 in FIG. 34 is valid, the current I1 to the focusing actuator 56 mainly depending on the differentiation component is supplied like a pulse synchronously with the trailing and leading edges of the focusing error signal E1 before and after the ID portion. Namely, when shifting from the MO portion to the ID portion, an automatic focusing for in-focusing the objective lens to the ID portion is performed. When shifting from the ID portion to the MO portion, an automatic focusing for contrarily in-focusing the objective lens to the MO portion is performed. The above operations are repeated every ID portion on the track. Thus, the lens position of the objective lens is alternately controlled to the in-focusing position according to the MO portion and ID portion as shown in FIG. 35D. However, with respect to the ID portion, since the recording state by the physical pits is formed, the precise automatic focusing control for the magnetooptical recording as in the MO portion is unnecessary. Even if the lens is not in-focused to the ID portion, an ID signal having an enough high S/N ratio can be reproduced from the return light of the ID portion. In the invention, therefore, as shown in FIG. 36C, a differentiation gain Gd of the gain multiplier 342 for multiplying a gain of the differentiator 340 is switched to 0 as shown in FIG. 36D at a timing of the ID portion synchronously with the ID gate signal E11 which is obtained from the formatter synchronously with the track ID portion. In the ID portion, the PID arithmetic operating unit 96 operates as a PI operating unit. Even if a step-like change occurs in the focusing error signal E1 in correspondence to the ID portion as shown in FIG. 36B, such a change doesn't appear in the output of the PID arithmetic operating unit 96. Thus, the current I1 to the focusing actuator 56 doesn't change in the ID portion as shown in FIG. 36E and a stable least necessary current can be supplied. With respect to the lens position of the objective lens in FIG. 36F as well, the position is not changed every ID portion and the in-locus state for the MO portion can be stably maintained. In the embodiment of FIG. 34, the gain control unit 352 switches the gain of the gain multiplier 342 of the differentiator 340 to 0 synchronously with the ID gate signal E11. However, a gain of the gain multiplier 348 constructing the gain operating unit can be also set to 0 synchronously with the ID gate signal E11. Therefore, since the PID arithmetic operating unit 96 executes only the integral arithmetic operation at the timing of the ID portion, the unnecessary operation of the focusing servo by the focusing error signal E1 which changes by the ID portion can be further certainly suppressed. With regard to the gentle fluctuation in the vertical direction due to a warp of the disk medium, the stable automatic focusing state can be obviously maintained so as to follow by an enough long time constant by an integral proportional control or integral control.

In the above embodiment, the optical disk drive in which both of the MO cartridge medium and the CD medium can be loaded and used has been shown and described as an example. In the optical disk drive which can use both of the MO cartridge medium and the CD medium as mentioned above, it is required to commonly use the optical system for the detection of the tracking error signal. Ordinarily, a push-pull method is used with respect to the MO cartridge medium and an ordinary 3-beam method is used with regard to the CD medium. However, if the 3-beam method is used, since the optical system cannot be commonly used for the MO cartridge medium and the CD medium, in the invention, one beam is used even for the CD medium. However, the push-pull method cannot be used in case of a laser diode having a wavelength of 680 nm in terms of the relation of a depth of pit of the CD. In the invention, therefore, a heterodyne method is used with regard to the tracking error detection of the CD medium. Thus, even in case of any of the MO cartridge medium and the CD medium, the tracking error signal is detected by the same optical unit and the control of the positioner can be performed.

The invention is not limited to the optical disk drive which can use both of the MO cartridge medium and the CD medium but can be also realized as an optical disk drive which can use all of the MO cartridge media of, for example, 128 MB, 230 MB, and 540 MB or 640 MB.

According to the invention as described above, the following effects can be obtained. First, with respect to the 1-track seek control, even if the velocity at the start of the deceleration after the end of the 0 velocity fluctuates, the decelerating current in the decelerating period is changed to a value according to the actual beam velocity, so that the beam can be stably moved onto the target track. As for the fine seek, the actual velocity just before the target track is detected and the decelerating current is determined in accordance with the velocity, so that even if there is a variation in beam velocity at the start of the deceleration, the decelerating current is always optimally determined. A delay which occurs due to an excessive decelerating current and an overshoot which is caused due to the lack of decelerating current are prevented, thereby enabling the stable on-track to the target track to be guaranteed. With respect to the eccentricity correction, the eccentricity amplitude and eccentricity phase are obtained from the zero-cross points of the tracking error signal of one rotation of the medium. Whether the eccentricity phase is the correct phase or the opposite phase can be soon known from the measurement result at the time of the eccentricity correction by the measured eccentricity information. By measuring the high precise eccentricity information, the eccentricity correction can be optimized. Further, with respect to the envelope servo, even with regard to the presence or absence of the mirror portion of the medium or the high speed seek, by turning on/off the function of the envelope detection, the tracking error signal can be properly formed. Moreover, as for the focusing servo, at least the differentiating function of the PID arithmetic operation of the focusing servo is stopped for a period of time during which the gate signal indicative of the ID portion of the medium is obtained. Therefore, even if there is a change in return light by the micro pit of the ID portion, it is not reflected to the focusing servo control but, contrarily, the integral control strongly functions. Even if the focusing error signal fluctuates due to the ID portion, the focusing control in which the objective lens is stably set into the in-focus state of the MO portion can be performed. Thus, the seek performance for the target cylinder is remarkably improved as a whole apparatus. Even in case of the optical disk drive using the changeable medium, a memory capacity and an accessing performance which are similar to those of the hard disk drive can be accomplished.

What is claimed is:

1. An optical storage apparatus comprising:

an objective lens for irradiating a light beam to a medium;

a positioner for moving said objective lens in a direction which transverses tracks of the medium;

an access control unit for moving the light beam from an optical unit to a target track so as to enter an on-track state by a drive control of said positioner;

a tracking error signal forming unit for forming a tracking error signal according to a position of said light beam in the direction which transverses the tracks on the basis of photosensitive outputs of a return light from the medium obtained by said optical unit;

an eccentricity measuring unit for measuring an eccentricity amplitude Eamp and an eccentricity phase TΦ for a start position of one rotation as eccentricity information on the basis of a detection of zero-cross points of said tracking error signal in a state in which the driving of said carriage and lens is stopped;

an eccentricity memory in which sine values whose amplitudes were normalized to specified values corresponding to one rotation has been stored in correspondence to a rotating position of said medium; and an eccentricity correcting unit for obtaining a medium eccentricity amount from the sine value read out from said memory and eccentricity information measured by said measuring unit and controlling said positioner so as to set off said eccentricity amount.

2. An apparatus according to claim 1, wherein said eccentricity measuring unit obtains said eccentricity amplitude Eamp by multiplying a track pitch to the half of the number of zero-cross points of said tracking error signal corresponding to one rotation of the medium obtained synchronously with a medium detection signal indicative of one rotation of said medium, and obtains a time from a start position of one rotation of said rotation detection signal to a middle point of a maximum zero-cross time interval of said tracking error signal as said eccentricity phase T$\Phi$.

3. An apparatus according to claim 1, wherein said eccentricity measuring unit measures an elapsed time tx between a present rotating position and a rotation start position, and determines a difference (tx−T$\Phi$), wherein if said difference (tx−T$\Phi$) is negative said eccentricity measuring unit determines a sum (tx−T$\Phi$+Trot) by adding a rotating time (Trot) for one-revolution to said difference (tx−T$\Phi$) stores a sine value sin $2\pi f$(tx−T$\Phi$+Trot) into said eccentricity memory, and wherein if said difference (tx−T$\Phi$) is greater than or equal to zero said eccentricity measuring unit stores a sine value sin $2\pi f$(tx−T$\Phi$) into said eccentricity memory.

4. An apparatus according to claim 1, wherein in an eccentricity correction state said eccentricity measuring unit measures the number of zero-cross points per rotation by said eccentricity correction unit based on the measured eccentricity information, and if the number of zero-cross points by said eccentricity correction exceeds the number of zero-cross points at the time of measurement, said eccentricity measuring unit corrects the eccentricity phase T$\Phi$ obtained by the measuring process to an opposite phase.

5. An apparatus according to claim 4, wherein said eccentricity measuring unit corrects the eccentricity phase T$\Phi$ to an eccentricity opposite phase (T$\Phi$+Trot/2) in which the half time of a rotation time (Trot) for one-revolution is added to the measured phase T$\Phi$.

6. An apparatus according to claim 1, wherein said eccentricity measuring unit and said eccentricity correction unit twice execute, respectively, measurement and correction of the eccentricity information unit and compares the numbers of zero-cross points corresponding to one rotation after completion of the eccentricity corrections of two times, and when a difference between comparison results exceeds a predetermined threshold value, said eccentricity measuring unit repeats the measurement and correction of the eccentricity until said difference is equal to or less than said threshold value.

7. An apparatus according to claim 1, wherein number of said sine values stored in said eccentricity memory are determined by a predetermined reading period and a medium rotational speed.

8. An apparatus according to claim 7, wherein said sine values stored in said eccentricity memory are updated in correspondence with changes in the medium rotational speed and updated said sine values corresponding to the medium rotational speed after the change are stored in said eccentricity memory.

* * * * *

UNITED STATES PATENT AND TRADEMARK OFFICE
CERTIFICATE OF CORRECTION

PATENT NO. : 5,901,121
DATED : May 4, 1999
INVENTOR(S) : Yamashita et al.

It is certified that error appears in the above-identified patent and that said Letters Patent is hereby corrected as shown below:

Column 2,
Line 24, delete "accelerating" and insert -- the accelerating --/decelerating -- therefor
Line 26, delete "are" and delete "variable every" and insert -- vary between -- and delete "drive" and insert -- drives -- therefor
Line 28, delete "lacks" and insert -- is too small -- therefor
Line 35, after "differs" insert -- for --
Line 42, delete "an" and insert -- a -- therefor
Line 59, delete "since" and insert -- However, since -- therefor
Line 59, delete ", however" (comma)

Column 3,
Line 4, delete "in an ID portion of the medium"
Line 6, after "recorded" insert -- in an ID portion of the medium --
Line 6, delete "pits, the" and insert -- pits. The -- therefor
Line 7, delete "a fluctuation which drops" and insert -- causing a noise-like fluctuation to appear -- therefor
Line 8, delete "like noises appears" and delete ", such" and insert -- . Such -- therefor Column 15,
Line 61, delete "in" and insert -- is -- therefor Column 35,
Line 26, after "2Πf(tx-Tϕ" delete ")"

Signed and Sealed this

Eighteenth Day of November, 2003

JAMES E. ROGAN
*Director of the United States Patent and Trademark Office*